US011197308B1

(12) United States Patent
Shattil

(10) Patent No.: US 11,197,308 B1
(45) Date of Patent: Dec. 7, 2021

(54) COOPERATIVE AND PARASITIC RADIO ACCESS NETWORKS

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 142 days.

(21) Appl. No.: 16/701,488

(22) Filed: Dec. 3, 2019

Related U.S. Application Data

(63) Continuation of application No. 15/347,415, filed on Nov. 9, 2016, now Pat. No. 10,499,409, which is a
(Continued)

(51) Int. Cl.
| | |
|---|---|
| *H04W 72/12* | (2009.01) |
| *H04W 76/14* | (2018.01) |
| *H04B 7/0452* | (2017.01) |
| *H04W 12/04* | (2021.01) |
| *H04L 29/06* | (2006.01) |
| *H04W 12/08* | (2021.01) |
| *H04B 7/024* | (2017.01) |
| *H04W 88/06* | (2009.01) |

(Continued)

(52) U.S. Cl.
CPC ........ *H04W 72/1215* (2013.01); *H04B 7/024* (2013.01); *H04B 7/0452* (2013.01); *H04L 63/061* (2013.01); *H04W 12/04* (2013.01); *H04W 12/08* (2013.01); *H04W 76/14* (2018.02); *H04L 5/0037* (2013.01); *H04L 63/0435* (2013.01); *H04W 72/1226* (2013.01); *H04W 76/16* (2018.02); *H04W 88/06* (2013.01)

(58) Field of Classification Search
None
See application file for complete search history.

(56) References Cited

U.S. PATENT DOCUMENTS

| | | |
|---|---|---|
| 6,031,913 A | 2/2000 | Hassan et al. |
| 6,686,879 B2 | 2/2004 | Shattil |
| | (Continued) | |

OTHER PUBLICATIONS

J.L. Brooks, Et al., "Coherence Multiplexing of Fiber-optic Interferometric Sensors," Journal of Lightwave Technology, vol. LT-3, No. 5, Oct. 1985.
(Continued)

*Primary Examiner* — Anh Ngoc M Nguyen
(74) *Attorney, Agent, or Firm* — Steven J Shattil

(57) ABSTRACT

A wireless user equipment (UE) device is configured to communicate with another UE via device-to-device (D2D) communications. The UE transmits a communication to the other UE, wherein the communication indicates scheduling of a shared spectrum resource. The shared spectrum resource is shared by a first network management operator (NMO) and a second NMO, wherein both the UE and the other UE are associated with the first NMO. The first NMO employs a first set of spatial channels in the shared spectrum resource, and a second set of spatial channels in the shared spectrum resource is made available for use by the second NMO, the second set being different from the first set. The UE communicates with the other UE over the first set of spatial channels.

18 Claims, 25 Drawing Sheets

Related U.S. Application Data continuation-in-part of application No. 15/268,992, filed on Sep. 19, 2016, now Pat. No. 10,015,801, which is a continuation of application No. 14/498,499, filed on Sep. 26, 2014, now Pat. No. 9,473,226, which is a continuation-in-part of application No. 13/757,032, filed on Feb. 1, 2013, now Pat. No. 8,929,550.

(60) Provisional application No. 62/252,717, filed on Nov. 9, 2015, provisional application No. 61/594,086, filed on Feb. 2, 2012.

(51) Int. Cl.
*H04W 76/16* (2018.01)
*H04L 5/00* (2006.01)

(56) References Cited

U.S. PATENT DOCUMENTS

| | | | |
|---|---|---|---|
| 7,430,257 B1 | 9/2008 | Shattil | |
| 8,051,181 B2 | 11/2011 | Larson et al. | |
| 8,122,505 B2 | 2/2012 | Verma | |
| 8,180,057 B1 | 5/2012 | Delaney et al. | |
| 8,254,950 B2 * | 8/2012 | De Pasquale | H04W 24/02 455/453 |
| 8,588,803 B2 * | 11/2013 | Hakola | H04W 72/085 455/452.2 |
| 8,594,026 B1 | 11/2013 | Hirschman et al. | |
| 8,670,390 B2 | 3/2014 | Shattil | |
| 10,433,179 B2 | 10/2019 | Zhang et al. | |
| 2002/0067757 A1 | 6/2002 | Philips et al. | |
| 2003/0163697 A1 | 8/2003 | Pabla et al. | |
| 2005/0091399 A1 | 4/2005 | Candan et al. | |
| 2005/0228659 A1 | 10/2005 | Mitlin | |
| 2006/0034177 A1 | 2/2006 | Schrempp | |
| 2006/0146802 A1 | 7/2006 | Baldwin et al. | |
| 2008/0075033 A1 | 3/2008 | Shattil | |
| 2008/0095121 A1 | 4/2008 | Shattil | |
| 2008/0232238 A1 | 9/2008 | Agee | |
| 2009/0003591 A1 | 1/2009 | Murakami et al. | |
| 2009/0005094 A1 | 1/2009 | Lee et al. | |
| 2009/0017829 A1 | 1/2009 | Laroia et al. | |
| 2009/0110033 A1 | 4/2009 | Shattil | |
| 2010/0248739 A1 * | 9/2010 | Westerberg | H04W 72/0486 455/453 |
| 2011/0033044 A1 | 2/2011 | Brits et al. | |
| 2011/0165905 A1 | 7/2011 | Shuman | |
| 2011/0170574 A1 | 7/2011 | Ripple et al. | |
| 2011/0173696 A1 | 7/2011 | Dynes et al. | |
| 2012/0093098 A1 | 4/2012 | Charbit et al. | |
| 2012/0106504 A1 * | 5/2012 | Klatt | H04W 72/04 370/330 |
| 2012/0231739 A1 | 9/2012 | Chen et al. | |
| 2013/0078954 A1 | 3/2013 | Fan et al. | |
| 2013/0095845 A1 | 4/2013 | Lim et al. | |
| 2014/0038657 A1 | 2/2014 | Jo et al. | |
| 2014/0206377 A1 * | 7/2014 | Priotti | H04W 16/14 455/454 |
| 2016/0094318 A1 | 3/2016 | Shattil | |

OTHER PUBLICATIONS

A.O. Hero, "Secure space-time communication," IEEE Transactions on Information Theory, vol. 49, No. 12, pp. 3235-3249, Dec. 2003.

R.M. Narayanan, "Sensing and Communications Using Ultrawideband Random Noise Waveforms," 2005 AFOSR Program Review for Sensing, Imaging and Object Recognition , Raleigh, NC, May 26, 2005.

* cited by examiner

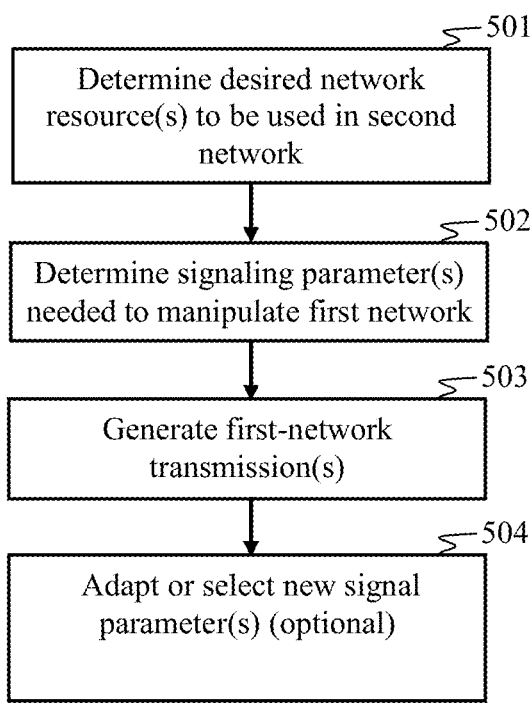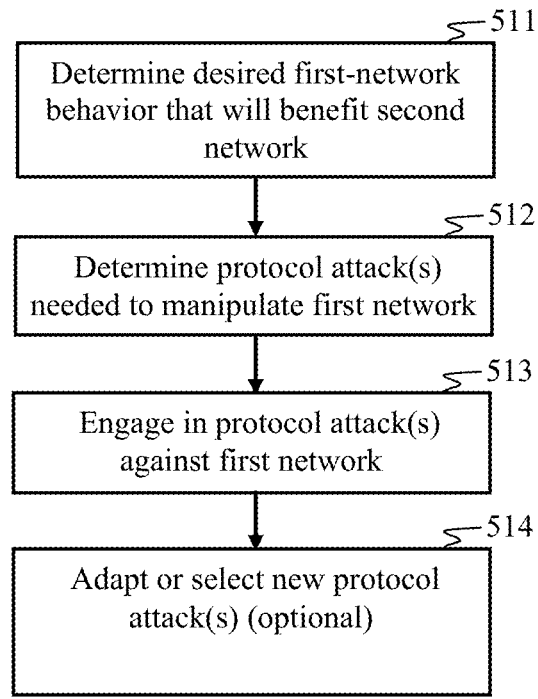
Figure 5A
Figure 5B

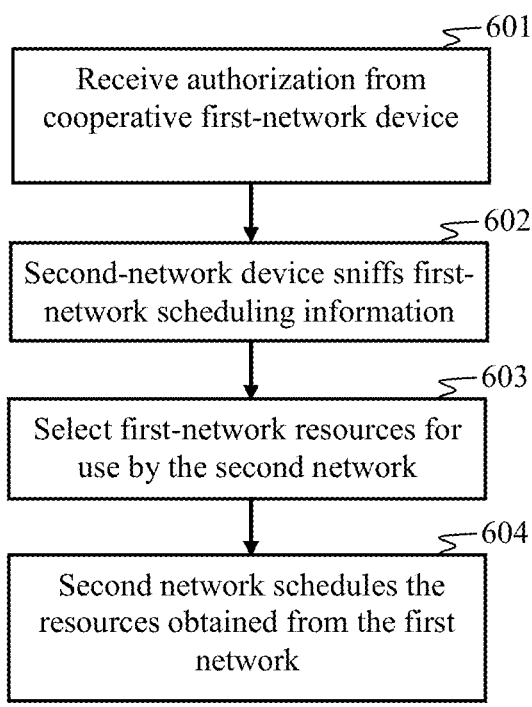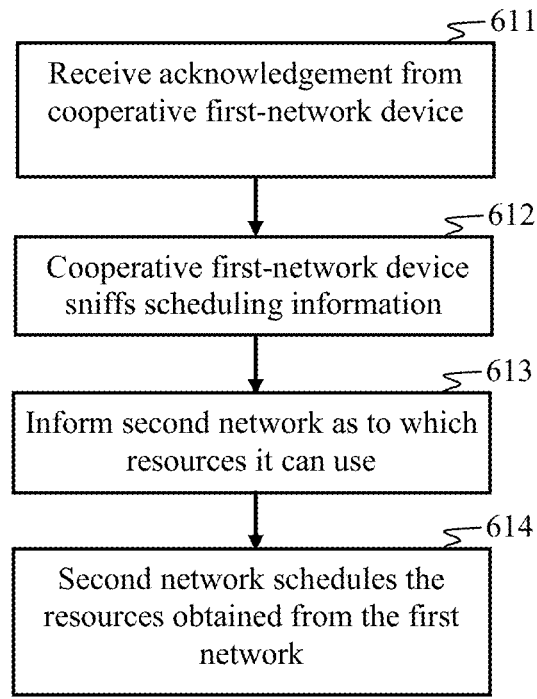
Figure 6A
Figure 6B

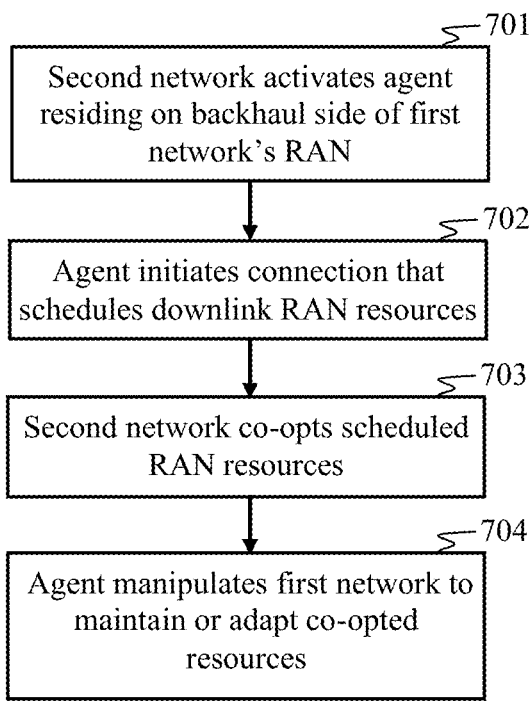
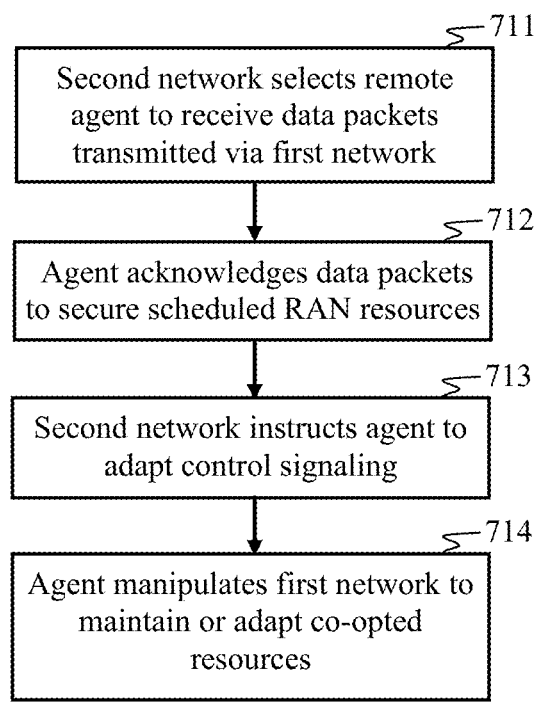
Figure 7A
Figure 7B

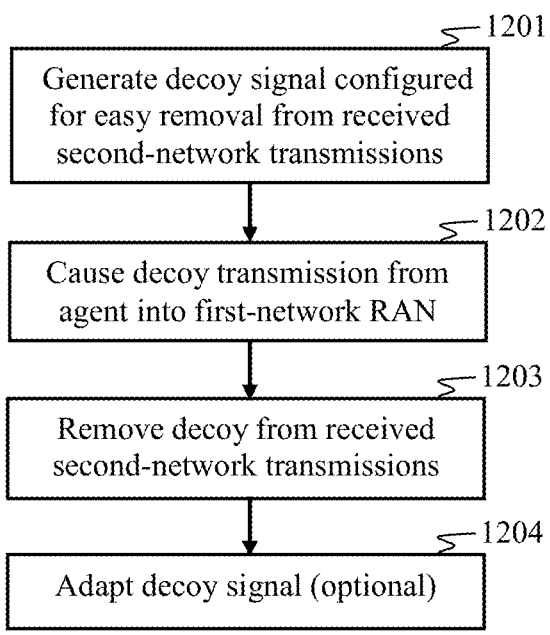 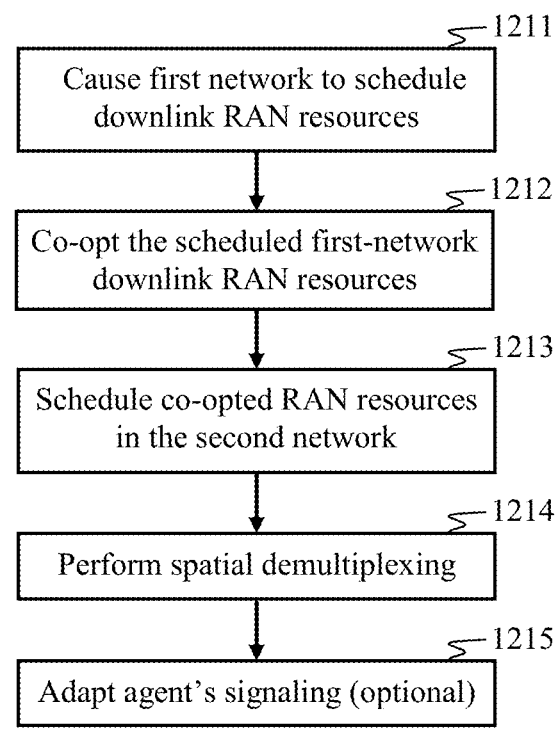
Figure 12A
Figure 12B

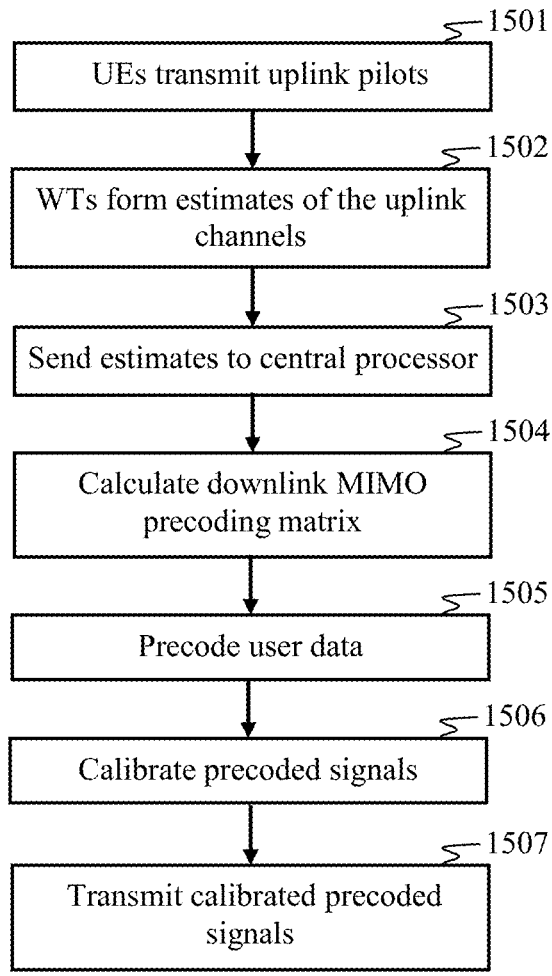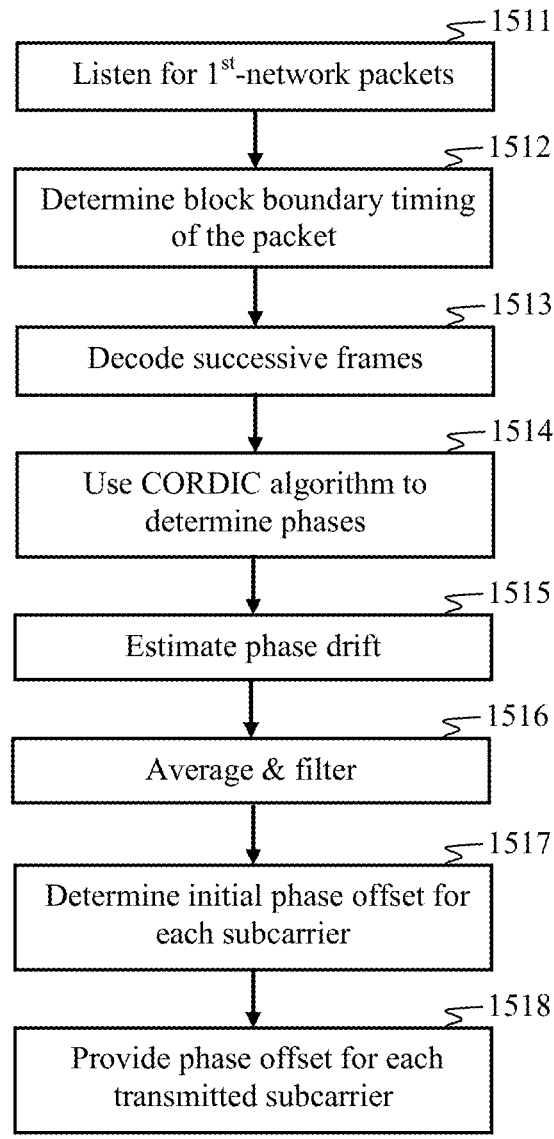
Figure 15A
Figure 15B

COOPERATIVE AND PARASITIC RADIO ACCESS NETWORKS

CROSS-REFERENCE TO RELATED APPLICATIONS

This application is a Continuation of U.S. patent application Ser. No. 15/347,415, filed Nov. 9, 2016, now U.S. Pat. No. 10,499,409, which claims priority under 35 U.S.C. 119(e) to U.S. Provisional Application Ser. No. 62/252,717, filed Nov. 9, 2015, and which is a Continuation in Part of U.S. patent application Ser. No. 15/268,992, filed Sep. 19, 2016, now U.S. Pat. No. 10,015,801, which is Continuation of U.S. patent application Ser. No. 14/498,499, filed Sep. 26, 2014, now U.S. Pat. No. 9,473,226, which is a Continuation in Part of U.S. patent application Ser. No. 13/757,032, filed on Feb. 1, 2013, now U.S. Pat. No. 8,929,550, which claims priority under 35 U.S.C. 119(e) to U.S. Provisional Application Ser. No. 61/594,086, filed Feb. 2, 2012.

BACKGROUND

I. Field

The present invention relates generally to wireless communication networks, and more specifically to provisioning spectrum resources between wireless networks.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Fading and interference are the two key challenges faced by designers of wireless communication systems. While fading limits the coverage and reliability of any point-to-point wireless connection, e.g., between a base station and a mobile terminal, interference in prior-art networks restricts the reusability of the spectral resource (time, frequency slots, multiple-access codes, etc.) in space, thus limiting the overall spectral efficiency.

Two recent research trends in wireless networks offer potential solutions: very dense spatial reuse and multi-user multiple input, multiple output (MU-MIMO). Dense deployment of infrastructure (e.g., more WiFi access points, more cell towers, micro-cells, pico-cells, and femto-cells, etc.) is intended to enable multiple short-range low-power links to co-exist on the same time-frequency channel resource. However, this approach presents its own limitations, as denser infrastructure results in more interference. In cellular systems, increased inter-cell interference establishes a practical upper bound for cell density.

MU-MIMO refers to serving multiple users on the same time-frequency resource, usually by eliminating multi-user interference via spatial precoding. In theory, an access point with a sufficient number of antennas can simultaneously serve an increasing number of clients while maintaining a constant per-client data rate. In practice, such systems suffer from diminishing returns. Specifically, the channel between the clients and the access point requires sufficiently rich scattering in order to realize spatial multiplexing gains, which means the access point's antennas need to be sufficiently separated. Due to the limited space at an access point or cell site, additional antennas cause more correlation between channels, resulting in less capacity benefit for each additional antenna. In such cases, the ratio of cost to spectral efficiency rises exponentially.

In 2001, Distributed MU-MIMO was introduced (S. J. Shattil, Pat. Appl. Ser. No. 60/286,850, filed Apr. 26, 2001), which unifies these two approaches, simultaneously obtaining both multi-user interference suppression via spatial precoding and dense coverage by reducing the average distance between transmitters and receivers. This is achieved by coordinating a large number of access points (e.g., base transceiver terminals) distributed over a certain coverage region via a wired, optical, or wireless backhaul network connected to a central processor in order to form a distributed antenna system. Thus, the multiple access points can function together as a single distributed access point, referred to as a "super array." In subsequent patent filings, Applicant disclosed this idea, termed "cooperative" (also known as collaborative, distributed, or virtual) MIMO, with respect to all types of wireless terminals in a radio access network (RAN), as well as various network configurations, including cellular, ad-hoc peer-to-peer (e.g., device-to-device (D2D)), mesh, and hierarchical network topologies.

In 2002, Software-Defined Radio (SDR) in Distributed MU-MIMO and Cloud Radio Access Networks were introduced (S. J. Shattil, patent application Ser. No. 10/131,163 filed Apr. 24, 2002 (now U.S. Pat. No. 7,430,257) and S. J. Shattil, patent application Ser. No. 10/145,854, filed May 14, 2002). Solutions to synchronization and calibration in Distributed-MIMO are presented in the '257 patent, the '854 application, S. J. Shattil, Pat. Appl. Ser. No. 60/598,187, filed Aug. 2, 2004, and S. J. Shattil, patent application Ser. No. 11/187,107 (now U.S. Pat. No. 8,670,390). All the references mentioned in this disclosure are incorporated by reference in their entireties.

As explained above, a key problem faced by cellular network providers is that legacy infrastructure costs increase exponentially relative to capacity, which means that providers don't benefit from economies of scale. Also, legacy network costs increase exponentially with the data rate per user. Thus, cellular providers have a strong economic incentive to delay network upgrades and new services. In addition to lagging behind the civilized world (such as Mexico and Russia) in cellular network speed and affordability, America's speeds are declining while the rest of the world is improving.

While American cellular providers complain that they no longer have enough spectrum to meet the demand for data, the fact is that any technical advantage one provider might gain over its competitors could be negated by its obligations under cross-licensing agreements with the other providers. This stifles innovation and keeps prices high, leaving consumers stuck with Third-World-quality service. Furthermore, cellular providers are locked into long-term contracts with hardware manufacturers that strongly discourage, if not outright prohibit, third-party improvements to the network infrastructure.

Similarly, Internet service in America lags behind the civilized world because the average market has only one or two ISPs who set their prices at monopoly or duopoly pricing. The slow speeds and lack of competition are due, in part, to the high cost of providing optical fiber to the home (i.e., the last-mile), and deploying such networks takes years. Even though Cooperative-MIMO technologies mentioned above provide an economically compelling alternative to legacy cellular and ISP infrastructure, the main barrier to entry for entrepreneurs is the high cost of licensed spectrum.

Cognitive radio has been proposed to address the inefficient use of licensed spectrum. Portions of the spectrum that are not in active use by licensed users are called white spaces, which cognitive radio seeks to use. Transmission and reception parameters require an efficient medium access control layer to utilize the dynamic white spaces in order to avoid interfering with other devices. However, conventional medium access control employs contention-access mechanisms that lead to poor spectrum efficiency.

SUMMARY

There is a pressing need by users of cellular communications to be able to use licensed spectrum more efficiently such that more users and higher data bandwidth can be supported. Given the onerous political and business climates toward technological innovation and entrepreneurship in this industry, there is a need for a technical solution that enables efficient parallel use of licensed spectrum while avoiding interference with licensed users. To achieve this, it would be useful for the solution to coexist with legacy systems in a collaborative manner that permits client devices to employ licensed spectrum, such as for alternative communication links and other network applications. In some instances, the solution might be adopted by the operator of a legacy system and gradually introduced, and cooperation could occur between the legacy system and a system configured according to aspects of the invention. In another aspect, a system according to certain aspects of the invention might be implemented in a non-cooperative (and undetected) manner relative to the legacy network, such as may be implemented by tactical forces using an enemy network.

In some instances, the inventive system might be implemented in a parasitic manner with respect to the legacy system, whereby the inventive system can exploit the legacy system's control signaling, and possibly obtain RAN resources from the legacy system. For example, the inventive system might be deployed by law enforcement and/or first responders during a state of emergency to provide high-bandwidth data services for emergency personnel while avoiding disruption of the low-quality commercial services "enjoyed" by American civilians.

In an urban battlefield scenario, warfighters might implement a parasitic version of the inventive system under a non-cooperative (or even hostile) native legacy network. In addition to avoiding detection by enemy combatants, it can be desirable to decentralize network control and access to resources, such as to reduce the vulnerability of the warfighter network to attacks and service disruptions. By exploiting control signaling and resource scheduling of a native legacy network under enemy control, the warfighter network might avoid electronic countermeasures.

Aspects of the disclosure describe cooperative-MIMO processing which comprise MIMO processing wherein the multiple input (MI) comprises downlink transmissions from multiple base transceiver stations and the multiple output (MO) comprises uplink transmissions to multiple base transceiver stations. Aspects of the disclosure also indicate that cooperative-MIMO processing can employ user equipment (UEs). In accordance with some aspects, combinations of base transceiver stations and UEs are configured for cooperative-MIMO processing.

The following patent applications are incorporated by reference in their entireties: patent application Ser. No. 15/218,609, filed Jul. 25, 2016; patent application Ser. No. 62/233,982, filed Sep. 28, 2015; patent application Ser. No. 15/279,425, filed Sep. 28, 2016; patent application Ser. No. 13/757,032, filed Feb. 1, 2013; patent application Ser. No. 14/109,928, filed Dec. 18, 2013; patent application Ser. No. 60/286,850, filed Apr. 26, 2001; patent application Ser. No. 10/131,163 filed Apr. 24, 2002; patent application Ser. No. 11/187,107, filed Jul. 22, 2005; and patent application Ser. No. 10/145,854, filed May 14, 2002.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

BRIEF DESCRIPTION OF THE DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIG. 5A is a flow diagram that illustrates a method for manipulating a first network to obtain RAN resources for use by a second network. While such methods can be employed in a parasitic manner wherein the first network is unaware that its allocated resources are being co-opted by the second network, aspects can be employed in a cooperative manner, such as wherein the second network negotiates with the first network to use the first network's RAN resources. The steps shown in the flow diagram and in other flow diagrams can be performed by apparatus components configured to perform each labeled step, or the steps can comprise programming instructions on a non-transitory computer-readable memory, such as may be used to instruct a general-purpose processor to operate in accordance with aspects of the disclosure.

FIG. 5B is a flow diagram of a method for employing a protocol attack on a first network to manipulate the network into allocating RAN resources which can be used by a second network. Such protocol attacks can be configured to provide little or no harm to the first network and may be employed in a manner that is difficult for the first network to detect.

FIG. 6A is a flow diagram of a method in which a device in a first network collaborates with a second network to access first network RAN resources for scheduling by the second network. In a cooperative mode, the first network might explicitly allocate RAN resources for use by the second network. In a parasitic mode, the first-network device might be a subscriber device (e.g., a UE) which is allocated RAN resources by the first network for the sole purpose of communicating in the first network. The second network can co-opt the allocated RAN resources for communication in the second network.

FIG. 6B is a flow diagram of an alternative method of using a cooperative device in a first network to obtain RAN resources for use by the second network. In one aspect, the first network explicitly allocates RAN resources for use by the second network. In another aspect, the first network is unaware that allocated resources are being used by another network. The second network can obtain and employ the RAN resources in a manner that is not detected by the first network.

FIG. 7A is a flow diagram of a method for obtaining downlink RAN resources from a first network (for use by a second network) via an agent that can operate on the backhaul side of the first network. In some aspects, the agent is managed solely by the second network. In other aspects, the agent might be managed by the first network, such as wherein the first network is configured to explicitly allocate RAN resources for use by the second network.

FIG. 7B is a flow diagram of a method for obtaining uplink RAN resources from a first network via an agent that can operate on the backhaul side of the first network. In some aspects, the agent can be operated in a parasitic manner with respect to the first network. In another aspect, the agent might be operated in a cooperative manner, such as wherein the first network employs at least some control over the agent.

FIGS. 12A and 12B depict methods of co-opting a first network's downlink resources for communicating in a second network.

FIGS. 15A and 15B are flow charts that depict methods used in channel-reciprocity based Cooperative-MIMO in accordance with some aspects of the disclosure.

DETAILED DESCRIPTION

Figure 1:
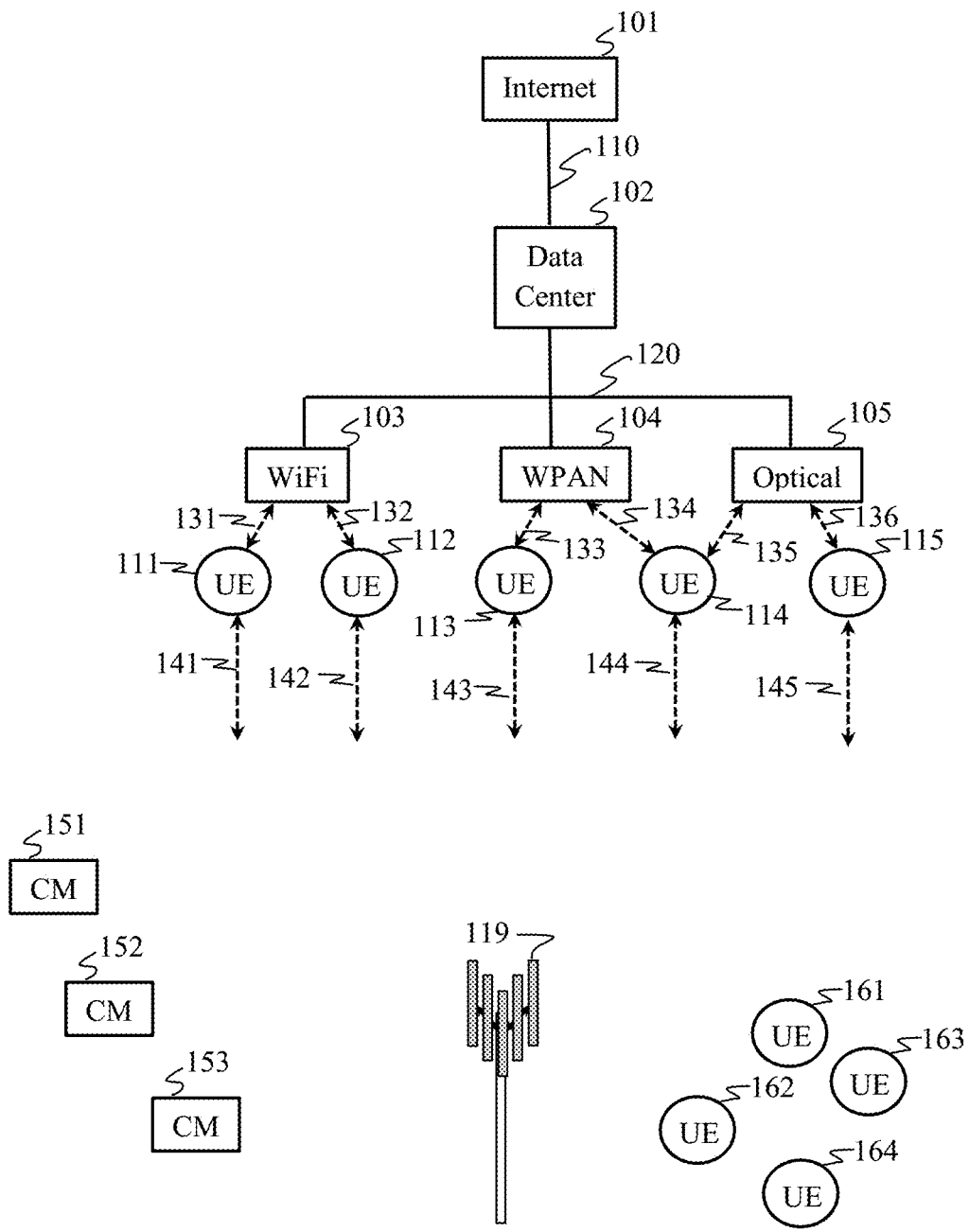
FIG. 1 is a block diagram of a network architecture in accordance with an exemplary aspect of the disclosure.

The detailed description set forth below in connection with the appended drawings is intended as a description of various aspects of the present work and is not intended to represent the only aspects in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

Where each aspect of the disclosure might represent a single combination of elements, the present work is considered to include all possible combinations of the disclosed elements. Thus if one aspect comprises elements A, B, and C, and a second aspect comprises elements B and D, then the present work is also considered to include other remaining combinations of A, B, C, or D, even if not explicitly disclosed.

The word "exemplary" is used herein to mean "serving as an example, instance, or illustration." Any aspect described herein as "exemplary" or as an "example" is not necessarily to be construed as preferred or advantageous over other aspects.

The techniques described herein may be used for various wireless communication networks, such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.15, IEEE 802.16, IEEE 802.20, frequency-hopped OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from the "3rd Generation Partnership Project" (3GPP). These various radio technologies and standards are known in the art. For clarity, certain aspects of the techniques are described below for LTE, and LTE terminology is used in much of the description below.

As used herein, a Wireless Terminal (WT) can be a client device, a server device, and/or an intermediate device (e.g., relay, router, etc.) in a wireless network. A WT can switch between operating as a client device, a server device, and/or an intermediate device. A WT can simultaneously function as multiple ones of the aforementioned devices.

An access point is a type of WT that may be a fixed station used for communicating with other WTs in a wireless network and may also be referred to as an access point, a base transceiver station, a Node B, an eNodeB, a base station, a cell station, a cell site, server, server device, or some other terminology. In some aspects, an access point may be a mobile station.

A user equipment (UE) is a type of WT that may be a client station in a wireless network and may also be referred to as a user device, user terminal, subscriber device, subscriber terminal, customer premises equipment, mobile device, mobile terminal, mobile station, client station, wireless communication device, terminal, access terminal, handset, or some other terminology.

FIG. 1 is a diagram of a network topology according to certain aspects of the disclosure. A first network, such as a legacy network, can comprise one or more access points, such as base transceiver station 119, configured to communicative couple with UEs 161-164. A secondary network can comprise a plurality of UEs 111-115 communicatively coupled to the first network, such as via access point 119 and/or via other access points of the first network. First-network communication links (uplinks and downlinks) between the UEs 111-115 and the first network are denoted by radio links 141-145, for example.

The UEs 111-115 can be communicatively coupled to a data center 102 via one or more tertiary networks (which can comprise a fronthaul network) implemented to support the second network's communications and processing. For example, WiFi controller (e.g., access point) 103 employs WiFi links 131 and 132 to communicate with UEs 111 and 112, WPAN controller (e.g., access point) 104 employs WPAN links 133 and 134 to communicate with UEs 113 and 114, and optical network controller 105 (e.g., access point) employs optical links 135 and 136 to communicate with UEs 114 and 115. The tertiary networks can employ a fronthaul network 120 to communicatively couple the UEs 111-115 to data center 102. The data center 102 can employ a backhaul network 110, for example, to connect to the Internet 101. In some aspects, the data center 102 is configured to communicate with the first network via the Internet 101.

The second network, comprising data center 102, fronthaul 120, tertiary network controllers 103-105, and UEs 111-115, can be implemented to function as a Coordinated Multipoint (CM) system. The second network can comprise additional CMs 151-153. Alternatively, CMs 151-153 may be separate from the second network but operate in a similar manner.

In one mode of operation, the second network is operable to instruct the UEs 111-115 to obtain resource allocations from the first network, such as by requesting service from the first network. In another mode of operation, the second network can cause the first network to allocate resources to particular ones of the UEs 111-115, such as by sending a message to the particular ones of the UEs 111-115 via the first network. By way of example, the data center 102 can employ the Internet 101 to communicate with the particular ones of the UEs 111-115 by way of the first network.

The particular ones of the UEs 111-115 can report the allocated first-network resources (e.g., frequencies, time slots, spreading codes, etc. corresponding to first-network channel assignments) to the data center 102. Upon receiving the information comprising the allocated first-network resources, the data center 102 can schedule those resources for use by specific ones of the UEs 111-115 corresponding to one or more geographical areas where the resources were assigned by the first network. The data center 102 can provide MIMO processing to signals transmitted and/or received by the UEs 111-115, such as to provide MU-MIMO and/or full Cooperative-MIMO operation. By way of example, the UEs 111-115 employ frequency resources that were scheduled by the first network, and subsequently scheduled by the data center 102, to communicate with UEs 161-164. In another aspect, the UEs 111-115 might communicate with one or more of the CMs 151-153.

Figure 2:
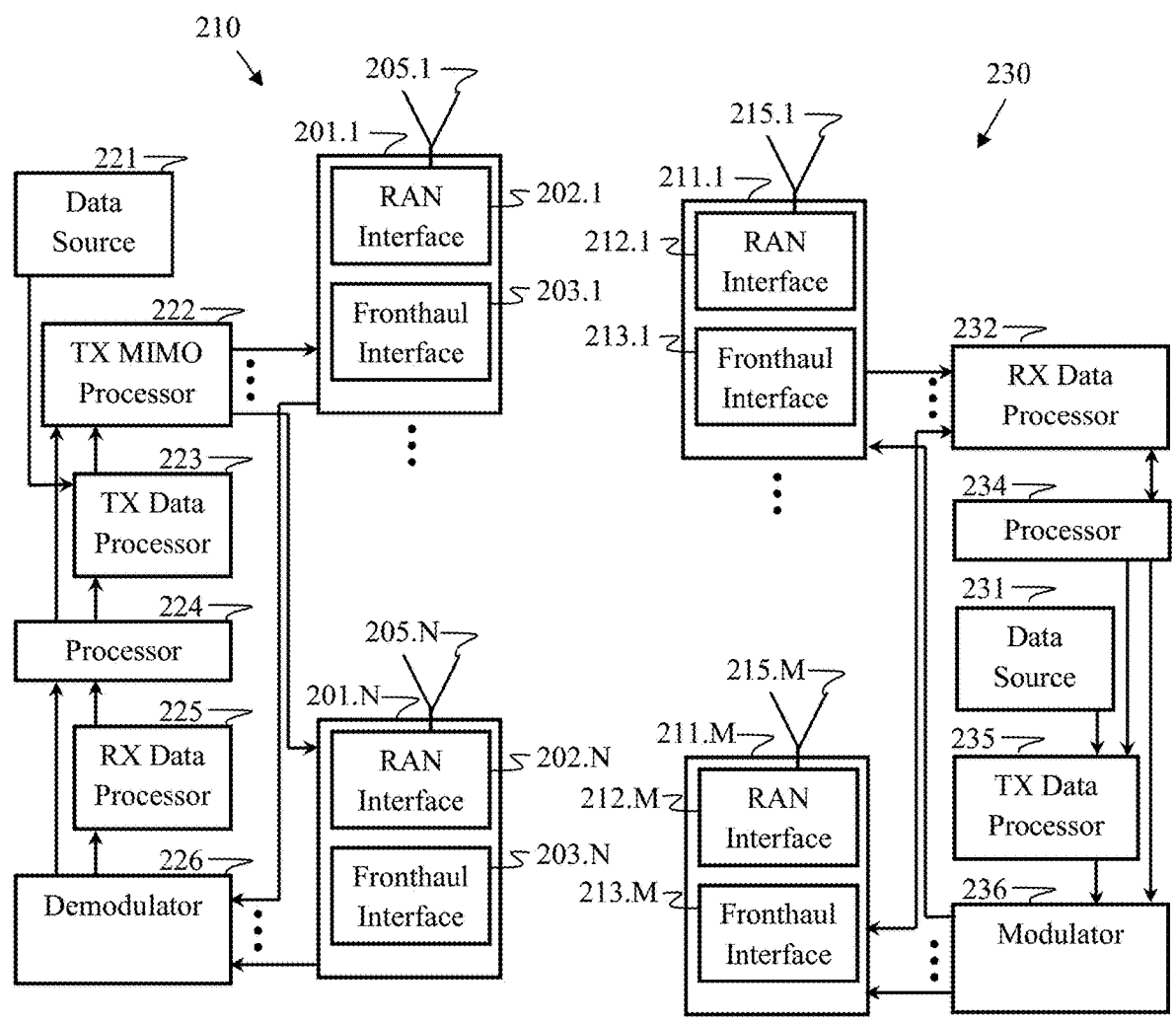
FIG. 2 diagrammatically illustrates a Cooperative-MIMO communication system in which exemplary aspects of the disclosure can be implemented.

FIG. 2 diagrammatically illustrates a Cooperative-MIMO communication system in which exemplary aspects of the disclosure can be implemented. The system includes a transmitter system 210 (e.g., either a set of access points and/or UEs) and a receiver system 230 (e.g., either a set of UEs and/or access points).

In aspects wherein the transmitter system 210 comprises a set of access points, traffic data for a number of data streams is provided from a data source 221 to a transmit (TX) data processor 223. It should be appreciated that the configuration of processing blocks disclosed herein may take many different forms in a Cooperative-MIMO system. For example, more than one data source 221 may be employed. In some aspects, while data might originate from a single data source in a backhaul network, multiple network channels (e.g., backhaul and/or fronthaul channels) can be employed to deliver data to the transmitter system 210. Thus, the different network channels can be regarded as different data sources.

In some aspects of Cooperative-MIMO, processing (such as TX data processing 223, and optionally, other processing blocks shown in the figures) is performed by a central processor (not shown) before being distributed to the WTs 201.1-201.N. The central processor may be a central processing facility, such as a data center with cloud-computing resources programmed to provide SDR processing resources. In some aspects, the central processor may comprise one or more of the WTs 201.1-201.N.

In some aspects of Cooperative-MIMO, processing (such as TX data processing 223, and optionally, other processing blocks shown in the figures) is performed by multiple ones of the WTs 201.1-201.N. In some aspects disclosed herein, processing resources (which may reside in the fronthaul network, the backhaul network, or both) are identified, selected, and then configured to perform cooperative processing. Such identification, selection, and configuration can be adapted based on a combination of conditions, including (but not limited to) availability of processing resources, network configuration, wireless channel conditions, network loads, reliability, trustworthiness, latency, power usage, power efficiency, spectrum efficiency, quality of service, priority, type of data communications, etc.

In some aspects, each data stream is transmitted over a respective transmit antenna system 205.1-205.N of a respective WT 201.1-201.N. Each transmit antenna system 205.1-205.N comprises one or more antennas. TX data processor 223 formats, codes, and interleaves the traffic data for each data stream based on a particular coding scheme selected for that data stream to provide coded data.

The coded data for each data stream may be combined with pilot data, such as via OFDM techniques. The pilot data is typically a known data pattern that is processed in a known manner and may be used at the receiver system to estimate the channel response. The multiplexed pilot and coded data for each data stream is then modulated (i.e., symbol-mapped) based on a particular modulation scheme (e.g., BPSK, QSPK, M-PSK, M-QAM, etc.) selected for that data stream to provide modulation symbols. The data rate, coding, and modulation for each data stream may be determined by instructions performed by processor 224.

The modulation symbols for all data streams are then provided to a TX MIMO processor 222, which may further process the modulation symbols (e.g., for OFDM). The TX MIMO processor 222 then provides a number $N_T$ of modulation symbol streams to a number $N \leq N_T$ of WTs 201.1-201.N. In certain aspects, the TX MIMO processor 222 applies beamforming weights to the symbols of the data streams.

As described throughout the disclosure, processing (such as TX MIMO processor 222) may be implemented in a centralized manner and/or a distributed manner. In distributed processing, processing resources may be identified, selected, and then configured to perform processing tasks to provide for Cooperative-MIMO communications. In some aspects, certain processing tasks are performed in a centralized manner while other processing tasks are performed in a distributed manner. In some aspects, processing tasks that are not sensitive to latency may be performed remotely, such as in a central processor or via remote distributed computing resources. Processing tasks that are sensitive to latency may be provisioned at or near the network edge, such as to reduce communication latency. By way of example, MIMO processing (which needs to be adapted to changing channel conditions) can be performed at or near the network edge, whereas the TX data processor 223 might be performed remotely relative to the network edge, such as closer to the backbone or core of the network.

Each WT 201.1-201.N comprises a Fronthaul interface 203.1-203.N that provides for communication over a fronthaul network communicatively coupled with other WTs and/or processing resources. Each WT 201.1-201.N comprises a Radio Access Network (RAN) interface 202.1-202.N that receives and processes a respective symbol stream to provide one or more digital and/or analog signals, and further conditions (e.g., amplifies, filters, and upconverts) the digital and/or analog signals to produce a modulated signal suitable for transmission over the MIMO channel. $N_T$ modulated signals at WTs 201.1-201.N are then transmitted from $N_T$ antennas of the antenna systems 205.1-205.N, respectively.

In aspects wherein the receiver system 230 comprises a plurality M of WTs 211.1-211.M, the transmitted modulated signals from the transmitter system 210 are received by $N_R$ antennas of M antenna systems 215.1-215.M, and the received signal from each antenna is provided to a respective RAN Interface 212.1-212.M. Each RAN Interface 212.1-212.M conditions (e.g., filters, amplifies, and down-converts) a respective received signal, digitizes the conditioned signal to provide samples, and further processes the samples to provide a corresponding received symbol stream. The received symbol stream may be processed by a fronthaul interface 213.1-213.M communicatively coupled to other WTs and/or other processing resources.

An RX data processor 232 receives and processes the $N_R$ received symbol streams from the M WTs 211.1-211.M based on at least one particular receiver processing technique to provide $N_T$ detected symbol streams. The RX data processor 232 then demodulates, de-interleaves, and decodes each detected symbol stream to recover the traffic data for the data stream. The processing by RX data processor 232 can be complementary to that performed by TX MIMO processor 222 and TX data processor 223 at the transmitter system 210. In a Cooperative-MIMO system, processing resources (such as RX data processor 232, as well as others) can be distributed across multiple devices, such as WTs and/or other processors.

In one aspect, a processor 234 periodically determines which pre-coding matrix to use. The processor 234 may formulate a reverse link message comprising a matrix index portion and a rank value portion. The reverse link message may comprise various types of information regarding the communication link and/or the received data stream. The reverse link message is then processed by a TX data processor 235, which also receives traffic data for a number of data streams from at least one data source 231. The processed data is modulated by a modulator 236, communicated via a fronthaul network to one or more of the WTs 211.1-211.M where it is conditioned by RAN interfaces 212.1-212.M, and transmitted back to transmitter system 210. As should be appreciated with respect to different Cooperative-MIMO configurations, one or more of the processing blocks (e.g., 231, 232, 234, 235, and 236) may reside on one or more of the WTs 211.1-211.M.

In one aspect, at the transmitter system 210, the modulated signals from the receiver system 230 are received by antenna systems 205.1-205.N, conditioned by RAN interfaces 212.1-212.N, communicated over the fronthaul network via one or more of the fronthaul interfaces 203.1-203.N, demodulated by a demodulator 226, and processed by a RX data processor 225 to extract the reserve link message transmitted by the receiver system 230. Processor 224 then determines which pre-coding matrix to use for determining the beamforming weights then processes the extracted message.

Figure 3:
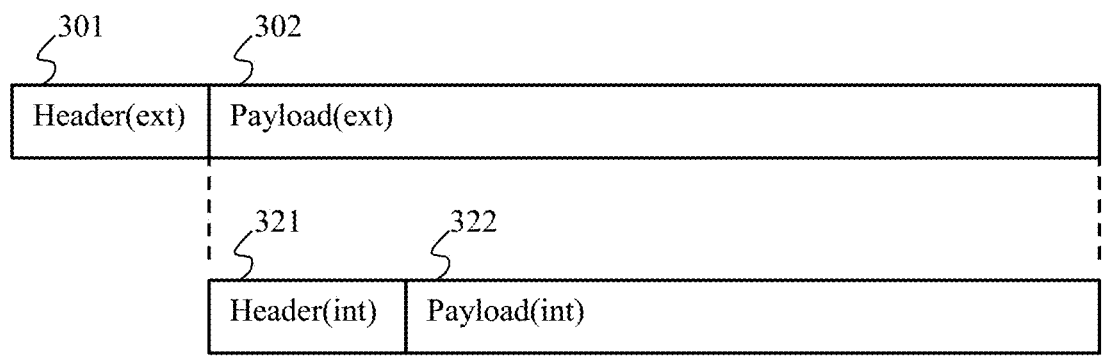
FIG. 3 illustrates a frame-within-a-frame structure that may be implemented in certain aspects of the disclosure. Such frame structures disclosed herein, and the related methods and apparatus aspects configured for processing such signals, can be implemented wherein a first network and a second network cooperate to provide interoperability, as well as in situations wherein the first network may not be aware of the second network.

FIG. 3 illustrates a frame-within-a-frame structure that can be implemented in certain aspects of the disclosure, such as to enable a second network to borrow spectrum resources from a first network via agents that are authorized users of the first network. By way of example, a transmission frame for communication in a first network comprises a header 301 and a payload 302. While the header 301 comprises standardized control information to control operations in the first network, the payload comprises user data which the control mechanisms in the first network typically ignore.

In accordance with some aspects of the disclosure, users in the first network conspire to implement a second network by acquiring communication resources from the first network and then repurposing those resources in a manner that may not be sanctioned by the first network, but also avoids interfering with the first network. One means to achieve such objectives is to embed the second network's control signaling in the payload portions 302 of the first network's transmission frames. For example, the second network employs the payload 302 for its own frames, which comprise second-network headers 321 and payload data 322. In cooperative aspects, the first network determines which spectrum resources can be used for second-network communications and then sends a message to the second network that includes scheduling information that identifies spectrum resources which the second network is authorized to use for purposes other than communicating with the first network.

The data payload 302 in the first network's frames is normally processed by higher layers (of the OSI model) of the first network's implementation (e.g., via the Application Layer) compared to the header's 301 control signals, which are processed at lower layers (e.g., the Physical Layer and the MAC sublayer) of the first network's implementation. The application layer of the first network's user devices typically have substantial (if not complete) control over the payload 302 content in first-network frames (such as via Application-Layer programs), but not the control information. This control over the payload 302 content allows higher-layer applications (such as Application-Layer programs) to format the payload 302 data in a manner that inserts additional control information which a second network can use, but is hidden from the control mechanisms of the first network. Thus, an Application-Layer program implemented via the second network's control mechanism could format the payload 302 to comprise the second network's control information (such as via header 321) which is transparent to the first network. This can enable an authorized user device in the first network to operate in the second network with minimal adaptations to the device's hardware and firmware.

Furthermore, in some aspects, at least some of the control information in the first-network's transmissions can be exploited by the second network for control purposes. As disclosed herein, such control purposes can include synchronization, scheduling, channel sensing, as well as others. This can be done to avoid duplicating control signaling and other information in the second network. In some aspects, the second network exploits the first network's management of resources to guarantee that certain resources are available to be re-provisioned for use by the second network. This avoids the overhead and inefficient use of spectrum due to carrier-sense multiple access and collision avoidance, such as employed by cognitive radio.

While FIG. 3 depicts frame headers 301 and 321 as comprising control information for their respective networks, it should be appreciated that control information can be integrated into frames in different ways, and that aspects of the invention are not limited to the manner in which control information is arranged in a transmission. Management frames, control frames, and frame headers are typically employed to ensure correct receptions of data. Control signaling, such as pilot tones, training signals, spreading codes, and other signaling types, can be integrated and/or partitioned throughout a transmission frame in various formats.

In one aspect of the disclosure, such as described above, a second network exploits control signaling in the first network in order to reduce control overheads. However, the first network may not be aware that the second network even exists. This is referred to as non-cooperative, or parasitic, communications. In other aspects of the disclosure, different networks can cooperate and share control signaling. In some aspects, the different networks may operate in the same band. Some aspects exploit WTs that are equipped with multiple interfaces operating in multiple bands. Cooperation across multiple radio spectrum bands can be an effective way to reduce control overheads. While aspects of the invention disclose that a first band can be employed in the radio access network, and a second (different) band can be employed in the fronthaul (and different bands may be employed within either or both the fronthaul and the radio access network), one band could be utilized to transmit management and control frames, one band could be used for signaling between access points, and at least one other band can be used for high-speed data transmissions. In some aspects, RAN signaling can be used for control operations, such as synchronization, for example, in the wireless fronthaul. In some aspects, fronthaul signals can be used for control operations in the RAN, such as to provide timing and frequency references. It should be appreciated that many different types of control signaling may be exploited across different networks in addition to the aspects mentioned herein, and such exploitations can be cooperative or non-cooperative (i.e., parasitic).

In accordance with certain aspects of the disclosure, the transmissions of the second network are conditioned to abide by the assigned modulation and coding schemes employed by the first network. For example, the second network can communicate in the first network in order to acquire and reserve network resources (e.g., spectrum) from the first network. While in one aspect, the first network processes the second network's frames as just payload data, in another aspect, the second network insert control messages (e.g., into the control portion(s) of the first network's frames) to be processed by the first network. In some cases, such control messages in the first network augments services provided to users in the second network. In some cases, the control messages simply cause the first network to behave in a manner that is advantageous to the second network. Such advantageous behavior might include causing allocation of resources the second network can use, providing control signaling to aid in synchronization, calibration, scheduling, and/or channel estimation, and/or other providing other operating benefits.

In one aspect, a transceiver comprises a first-network network controller configured to receive a spectrum resource allocation from the first network and insert first-network control signals into a control portion of a first-network frame of a transmission that employs the spectrum resource allocation. The first-network controller can comprise a general-purpose processor and non-transitory memory with programming instructions to cause the processor to produce control signaling according to a protocol stack for a first RAN transmission protocol(s). The controller can comprise a signal-processing apparatus, such as a modulator, filter, multiplexer, and/or other radio signal processing hardware.

An application-layer processor is configured to insert user data in a data payload portion of the first-network frame. The application-layer processor can comprise a general-purpose processor and non-transitory memory with programming instructions to cause the processor to produce and/or consume user data. In some aspects, the application-layer processor comprises a user device hardware element, such as an input/output device (e.g., a camera, a keypad, microphone, speaker, touch screen, etc.) and signal processing apparatus that can be configured, for example, to translate data signals into user data signals to be inserted into the data payload portion of the frame of a first network transmission signal.

A second-network network controller is communicatively coupled to the application-layer processor and configured to insert second-network control signals into the data payload portion of the first-network frame to communicate second-network control information to at least one other RAN device concurrently employing the spectrum resource allocation for communicating in the second network. The second-network controller can comprise a general-purpose processor and non-transitory memory with programming instructions to cause the processor to produce control signaling according to a protocol stack for a second RAN transmission protocol(s). The second RAN transmission protocol(s) can be different than the first RAN transmission protocol(s). The controller can comprise a signal-processing apparatus, such as a modulator, filter, multiplexer, and/or other radio signal processing hardware. The second-network controller can comprise one or more hardware elements employed by the first-network controller and/or the application-layer processor.

Figure 4:
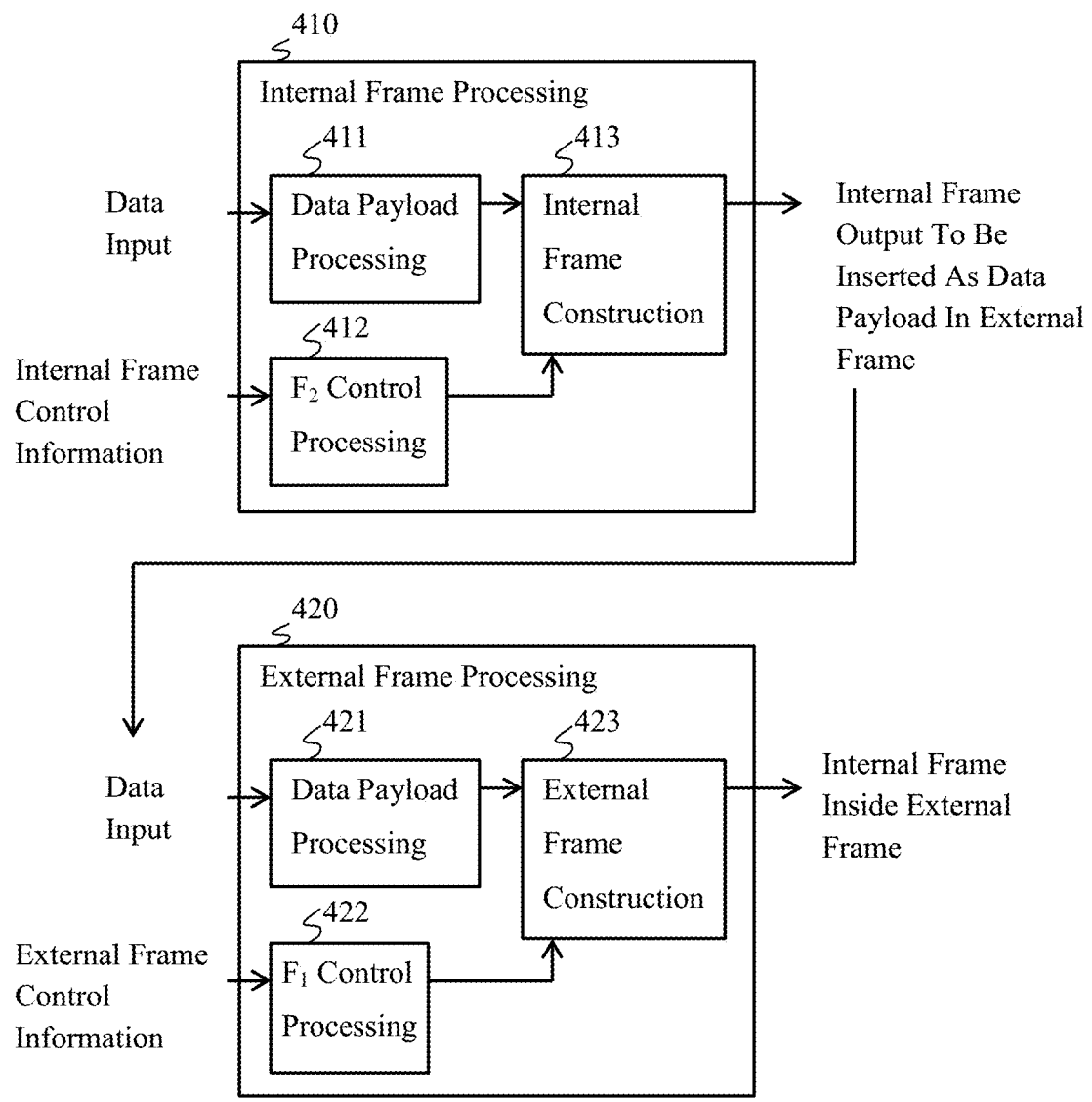
FIG. 4 is a block diagram that depicts components and process flow of frame-inside-frame processing in accordance with aspects of the disclosure. In some aspects, this process can be performed by a device in a second network that is exploiting first-network RAN resources and employing first-network frame structure, such as to avoid interfering with the first network. In such cases, the second network can act parasitically off the first network, wherein the first network may not be aware of the existence of the second network. In other aspects, this process can be performed by a device in a first network configured to support second network services. In such cases, the first and second networks can cooperate with each other and may signal to each other in order to coordinate control, scheduling, and other resource management.

FIG. 4 is a block diagram that depicts components and/or process flow of frame-inside-frame processing in accordance with aspects of the disclosure. Internal frame processing 410 for a second network begins with data signal input and internal frame control signal input. Data payload processing 411 conditions the input data for communication in the second network, such as in accordance with at least the second network's Physical Layer. Control processing 412 provides formatting according to the second network's protocols, and the processed data and the formatted control signals are multiplexed into an internal frame at a frame construction stage 413. The internal frame is then conveyed to an external frame processing stage 420 for formatting communication signals in the first network.

Data payload processing 421 conditions the internal frame as data in the external frame. Control signals for the external frame are formatted 422 according to the first network's protocols and then combined (e.g., multiplexed) with the processed data into an external frame 423.

In some aspects, the first network comprises a cellular network. While cellular operators provide low spectral efficiency via conventional cellular technologies, the second network can simultaneously employ high spectral efficiency Cooperative-MIMO configurations which can provide dramatically higher bandwidth, reliability, coverage, and energy efficiency. For example, close proximity of Cooperative-MIMO access points reduces transmission power and ensures uniform signal levels throughout a coverage area. Server-side Cooperative-MIMO can comprise distributed MU-MIMO, which yields far greater bandwidth efficiency than regular MIMO and MU-MIMO. Client-side Cooperative-MIMO allows sharing of MU-MIMO spatial channels, thus, multiplying the instantaneous data bandwidth of distributed MU-MIMO.

In some aspects of the disclosure, a second network couples to a first network that operates according to a first RAN technology, such as according to the LTE specification. While the second network operates according to a second RAN technology, such as a Cooperative-MIMO Physical-Layer protocol, it can maintain compatibility with the LTE Physical-Layer protocol. The Cooperative-MIMO Physical-Layer protocol can comprise the LTE protocol stack or at least portions thereof. For example, the second network can employ the set of modulation schemes supported by LTE, which are BPSK, QPSK, 16QAM, and 64QAM. The various types of channel coding supported in LTE for different channels are Turbo coding (Rate 1/3), Convolution coding (Rate 1/3 Tail Biting, Rate 1/2), Repetition Code (Rate 1/3), and Block Code (Rate 1/16 or repetition code).

As described herein, control information can reside throughout the frame. Control signaling may be in the first one to three OFDM symbols in each LTE subframe. Synchronization signals can be in subframes 0 and 5 of each 10 ms radio frame. The physical broadcast channel (PBCH) can be in subframe 0 of each radio frame. Reference signals can be interspersed among reference blocks according to various patterns. The second network can listen to such LTE control signals and provide for network control based on the signaling. Devices in the second network can provide for the appropriate LTE control information in the external frames, and, in some aspects, can employ similar control signaling in the internal frames to manage the second network's operations.

In LTE, the eNodeB provides all the necessary signals and mechanisms through which the UE synchronizes with the downlink transmission and acquires the network to receive services. Cell search is a procedure by which the UE acquires time and frequency synchronization with a cell and detects the cell ID. E-UTRA cell search is based on various signals transmitted in the downlink, such as primary and secondary synchronization signals, and downlink reference signals. In some aspects, the second network indexes spectrum resources scheduled by the first network with respect to cell ID. The first network might assign the same spectrum resources to devices in different cells (e.g., adjacent cells) such that those devices can establish a second-network link across the cells.

After power-up and performing memory and peripheral hardware tests, the UE initiates a downlink synchronization and physical cell identity acquisition procedure. In order to perform slot synchronization, the UE attempts to acquire the Primary sync signal (PSCH) transmitted by the eNodeB to help the UE identify the start and the finish of slot transmissions. Next, the UE attempts to perform frame synchronization so as to identify the start and the finish of frame transmission. In order to achieve this, Primary sync signals are used to acquire Secondary sync signals (SSCH).

In some aspects, the second network (e.g., a Cooperative-MIMO system) syncs to the LTE system. This is relevant to frame-inside-frame techniques disclosed herein, since the second network relies upon the transmission formatting (and, thus, the timing) in the first network. Thus, at least some of the LTE command and control procedures can be exploited by the second network, which avoids having to duplicate or implement alternatives to such procedures.

Once the PSCH and SSCH are known, the physical layer cell identity is obtained. The UE is now prepared to download the master information block (MIB) that the eNodeB broadcasts over the Physical Broadcast Channel (PBCH). The MIB (which is scrambled with a cell-id) reception provides the UE with LTE downlink bandwidth (DL BW), number of transmit antennas, system frame number (SFN), PHICH duration, and its gap.

After reading the MIB, the UE acquires system information blocks (SIBs), which are carried in the PDSCH, in order to obtain other system-related information broadcasted by the eNodeB, such as PLMN id, cell barring status, and various receiver thresholds required in cell selection. The Random Access Procedure (RAP) over PRACH is performed to accomplish the uplink synchronization. Normal DL/UL transmission can take place after the RAP.

The eNodeB measures the uplink power and issues power corrections known as transmit power control (TPC) commands through the DCI format to the UE. In some aspects, this can assign Cooperative-MIMO transmissions to power levels which are deemed acceptable by LTE, but which may be much greater than those required by Cooperative-MIMO. Thus, in some aspects, the second network might prefer LTE downlink channels for certain applications wherein it is advantageous for the Cooperative-MIMO system to control transmit power. Alternatively, the second network can manipulate the first network into assigning high transmit power levels, such as to limit spatial reuse between the first network's cells in order to provide the second network with a larger geographical area in which to use the first network's resources.

In accordance with some aspects of the disclosure, the second network's control mechanisms adapt the UE's signaling in the first network to manipulate control mechanisms in the first network to benefit the second network. For example, uplink transmissions in the first network can be adapted by the second network such that the eNodeB issues control instructions (such as TPC commands, etc.) that serve the needs of the second network. In the aspects disclosed herein, the UE is a willing participant in the second network. Therefore, it consents to act as an agent for the second network in order to acquire resources from the first network and/or otherwise manipulate operations of the first network. In alternative aspects, the UE might not be a willing participant, and the second network might manipulate the UE into requesting resources and/or otherwise causing the first network to alter its functions in a manner that might be advantageous to the second network. In some alternative aspects, the second network might engage in a protocol attack upon any of the first network's devices (e.g., UEs, access points, etc.), such as to manipulate the first network into behaving in a manner that is advantageous to the second network. For example, while the first network's operations might be within the system's defined operating parameters, the first network is manipulated such that its operations might not be appropriate for the current operating environment. This can be accomplished by a protocol attack that causes the first system to mischaracterize the current operating environment (such as wireless channel conditions, congestion, etc.). This can cause the first network to allocate more resources which the second network can co-opt. In some aspects, the second network might manipulate the first network into allocating resources to enable the second network to serve a particular geographical area. In some cases, the second network might manipulate the first network into reducing some of its operations in order to prevent interfering with the second network.

In an exemplary aspect of the disclosure, as depicted in FIG. 5A, the second network determines at least one network resource 501 (such as channel bandwidth, signal transmission power, etc.) it needs from the first network. This can include a geographical specification (such as first-network cell IDs, for example) corresponding to the required service area of the second network. The service area of the second network might include geographical locations of its nodes (e.g., UEs, relays, access points, etc.). Furthermore, the geographical specification can account for channel conditions (e.g., channel state information) and/or node power levels, node antenna parameters (e.g., gain, direction, spatial processing capabilities, etc.).

The second network then determines one or more signaling parameters 502 it must provide to an uplink transmission in the first network to manipulate the first network into allocating the desired resource(s). A signaling parameter can be a transmission power, a channel quality indicator (CQI), channel state information, a reference signal, any of various types of control signals (such as an ACK or NACK, a request, a status indicator, etc.), any other type of message, and/or a signal attribute. Determining the signaling parameters 502 can comprise selecting one or more nodes in one or more geographical areas based on the geographical specification. The second network generates the required first-network transmission(s) 503 or otherwise causes the first-network transmission to be generated. For example, the selected nodes transmit signals according to the signaling parameters determined in step 502. Upon receiving a response from the first network, the second network may adapt or select new signaling parameters (and or nodes) 504, such as may be part of an iterative process for manipulating the first network until the desired resource(s) is (are) received.

In another exemplary aspect of the disclosure, as depicted in FIG. 5B, the second network determines at least one behavior of the first network that will benefit the second network 511. Such a behavior might comprise allocating resources (e.g., channels, power, etc.) which the second network can co-opt, rescinding resources allocated to other first-network users, keeping a channel allocation, terminating a channel, selecting signal characteristics (e.g., transmission power, cyclic prefix length, coding, number of antennas, allocated frequencies, allocated time slots, etc.), and/or other behaviors that might be advantageous to the second network. The behavior in step 511 might correspond to a particular geographical specification, such as a geographical area where such behavior is desired. The geographical area might comprise locations where second-network nodes are located.

The second network determines at least one protocol attack that can manipulate the first network into behaving in the desired manner 512. The nature of the attack is based on the desired behavior, but may be based on other factors, such as the number and type of resources (e.g., devices, processing ability, etc.) the second network has available, the number and type of devices in the first network, proximity between devices in either or both networks, channel conditions, current operating mode(s) of one or more of the first-network devices, etc. Determining the protocol attack can comprise selecting nodes to engage in the attack and/or selecting targets based at least on the geographical specification.

The second network engages in the at least one protocol attack 513 or otherwise causes the at least one protocol attack to occur. In one aspect, the second network comprises one or more devices authorized to communicate in the first network. For example, the second network might comprise or otherwise employ a UE in an LTE network (i.e., the first network). The protocol attack can be performed by nodes selected based on the geographical specification. In one aspect, the second network transmits signals that cause the first network to behave in a manner that is within its normal operating limits but may be inappropriate for the current conditions. The at least one protocol attack 513 might include a physical-layer manipulation attack, a denial-of-service attack, a man-in-the-middle attack, and or other attacks and/or exploits.

In accordance with some aspects of the disclosure, the at least one protocol attack 513 is difficult for the first network to detect. The at least one protocol attack 513 could be performed in a distributed manner, and in some aspects, intermittently by different distributed devices such as to evade detection. The at least one protocol attack 513 could be performed in a manner that the resulting effects on the first network result in little to no impairment of the services the first network provides to its authorized users. In such aspects, the goal might be to co-opt spectrum resources tied up by licensed spectrum owners for use by first responders. Thus, aspects of the invention can provide a secondary network operating parasitically with respect to the first network, and possibly in a manner that provides far greater spectrum efficiency.

In some aspects of the disclosure, the protocol attack can be adapted or a new protocol attack(s) may be selected 514 based on how the first network responds to a previous attack, such as attack 513. Adaptations 514 may be based on the geographical specification. Other criteria may be used to adapt or select a new attack 514, including (but not limited to) changing network conditions, changing loads, changing channel conditions, and/or a changing number of available first-network devices.

It is well known that a centralized infrastructure is more vulnerable to disruption from terrorist attacks, natural disasters, and system failures. For example, when a cell tower goes down, service is disrupted throughout the cell. However, a de-centralized infrastructure is far less vulnerable to such disruptions because it avoids (or at least greatly reduces) critical failure points. In a Distributed-MIMO system, access point coverage areas overlap, so the effects of an access point outage are minimal. Aspects of the disclosure can configure the spectrum resource scheduling from the first network according to a geographical specification, such as to provide overlapping coverage areas in the second network.

The continued expansion of anti-piracy enforcement has pushed illegal file sharing from centralized servers (like Napster), which were easily shut down, to anonymous decentralized file-sharing technologies (like Tribler and Retroshare). As content owners step up enforcement of their intellectual property rights, new advances are emerging in anonymous decentralized communications, many of which are synergistic with the security and anonymity features of the distributed systems disclosed herein.

In LTE, the shared channel transmission is controlled by scheduling at the MAC layer, which manages the resource assignments in the uplink and downlink directions. Schedulers can assign resources based on instantaneous radio-link conditions (e.g., channel quality) at the UE, which are determined through measurements made at the eNodeB and/or reported by the UE. This is known as channel-dependent scheduling. Schedulers can include downlink (DL-SCH) and uplink (UL-SCH) schedulers. Information about downlink channel conditions required for channel-dependent scheduling (in order to determine coding and modulation schemes dynamically) is fed back from the UE to the eNodeB via the CQI. In some aspects of the disclosure, the second network can manipulate the first network by adapting the information the UE reports to the eNodeB. Such manipulations can control the scheduling of resources which the second network can co-opt.

In the downlink, E-UTRAN dynamically allocates resources to UEs at each TTI via C-RNTI on PDCCH(s). A UE monitors the PDCCH(s) to find possible allocations. Each UE scans through the contents of PDCCH for Downlink Control Information (DCI) Format 1 associated to C-RNTI. DCI Format 1 provides information such as resource allocation type, bitmap for allocation, modulation and coding scheme (MCS), and index to HARQ process and transmit power control. Resource allocation information provides information to the UE about how and which Physical Downlink Shared Channel (PDSCH) to be accessed.

In some aspects of the disclosure, the second network "sniffs" the scheduling information from the first network to determine which resources it can re-provision for use in the second network. For example, as depicted in FIG. 6A, the second network receives authorization 601 from a first-network device (such as a UE or an access point) to use its first-network resources. This authorization may include a first-network identifier for the first-network device. The first-network device (which may also comprise a second-network device) or another device in the second network listens to the scheduling information from the first network 602 so it can select the resources allocated to the first-network device 603. Either or both uplink and downlink resources can be re-provisioned by the second network. The second network may then schedule 604 those resources for use by second-network servers and/or client devices. Scheduling 604 can be based on a geographical specification. The second network can instruct the first-network device to request and/or adapt its requests for first-network resources, such as based on bandwidth needs of the second network and/or the geographical specification.

As depicted in FIG. 6B, a first-network device (e.g., a UE) agrees to cooperate with the second network. The second network receives an acknowledgement from the cooperative first-network device 611. The first-network device (which may also be a second-network device) sniffs the first-network scheduling information 612 and informs the second network as to which resources it may use 613. The resources can include spectrum resources indexed by one or more cell IDs. The second network schedules 614 those resources for use by second-network servers and/or client devices. Scheduling can be based on a geographical specification corresponding to first-network cell IDs and second-network node locations. The second network can instruct the first-network device to request and/or adapt its requests for first-network resources, such as based on bandwidth needs of the second network. These requests and/or adaptions can be based on the geographical specification.

The LTE eNodeB uplink scheduler is similar to that of the downlink scheduler. It dynamically identifies the mobile terminals that are ready to transmit data on UL-SCH. Various inputs to the uplink scheduler can include a scheduling request (SR) from the UE, buffer status report (BSR) for logical channels, QoS requirements, logical channel priority, power requirement, conditions, etc. These inputs can be selected by the second network. The uplink scheduler associates each service with a priority and a resource type (GBR or non-GBR) based on the CQI provided for the service. As described previously, the CQI can be adapted by the second network to achieve a particular priority and/or resource type. The Buffer Status Report (BSR) from the UE reports buffer sizes of the Logical Channel Groups (LCGs), and the uplink scheduler performs allocations per LCG.

In semi-persistent resource allocation, UL grants are requested at the start of a session period by the UE via a scheduling request. The eNodeB assigns a semi-persistent UL grant indicated by a semi-persistent C-RNTI. The resource allocation is persistent with a periodicity configured by RRC, and it continues with periodic transmission on the allocated resource as long as an ACK is received. In case of NACK, the eNodeB selects dynamic scheduling for retransmission. Once there is no transmission of packets, resources are allocated to other UEs. In aspects of the disclosure, the second network can manipulate the first network into allocating resources and reserving the allocating resources. This can be done based on a geographical specification. For example, the second network can instruct each first-network devices to request an UL grant. The instructions and/or requests can provide a set of UL grants corresponding to different first-network cells such that the same spectrum resources are allocated (or at least available for use) in multiple adjacent ones of the cells corresponding to a service area employed in the second network. The second network might provide for transmitting ACKs and NACKs in the first network to achieve and/or maintain desired resource allocations.

The Evolved Packet Core (EPC) in LTE separates the user data (also known as the user plane) from the signaling (also known as the control plane) to make the scaling independent. The Serving GW is the point of interconnect between the radio-side (RAN) and the EPC, and it serves the UE by routing the incoming and outgoing IP packets. It is the anchor point for the intra-LTE mobility (i.e. in case of handover between eNodeBs) and between LTE and other 3GPP accesses.

While the user plane is separate from the control plane, control mechanisms involving the processing of user data can directly or indirectly affect control parameters. For example, verifying the receipt of data at the transport layer can affect the control of data rates, the effects of which can cascade down to the provisioning of physical-layer resources, such as RAN channels. Accordingly, in some aspects of the disclosure, since the data payload in the first-network frame is configured to include control data for the second network (and possibly differently formatted user data), it can be useful to provide a service (e.g., an agent) that receives and acknowledges the data payload in a manner that at least mimics how other data payloads in the first-network frames are processed. For example, the service might automatically respond with an ACK for each data portion received in order to avoid impeding or interrupting the connection at the transport layer, which in turn can preserve the allocation of corresponding physical channels. In other aspects, the service can be configured by the second network to induce the RAN portion of the first network to behave in a manner that is advantageous to the second network. The service can be configured to acquire, maintain, and/or adapt scheduling of the first network's spectrum resources based on the aforementioned geographical specification.

In some cases, a network device functions as a surrogate endpoint for the UE. For example, in the case of a flat network, access points, or base stations, might be directly connected to the Internet. Thus, the access point or base station might be an IP endpoint. Upon receiving packet data addressed to a UE, the access point invokes the downlink scheduler to allocate RAN resources for transmitting a downlink signal to the UE. Transport control mechanisms at the access point (when it acts as a surrogate endpoint) and the remote service can control the scheduling of downlink and uplink RAN resources. Similarly, if the UE is the IP endpoint, the UE can adapt its transport control mechanisms, such as to keep a downlink channel open, increase or decrease allocated resources, and/or serve other objectives.

In one aspect, as depicted in FIG. 7A, the second network employs one or more agents 701, which can reside on the backhaul side of the first network's RAN, such as on a server on the Internet, on a computing device connected to the first network's RAN, and/or on a computing device that is part of a network which is communicatively coupled to the Internet. Each agent can be configured (such as by the second network) to employ a call set-up (or some other type of service that generates an incoming message addressed to a UE) that leads to establishing a RAN connection with the UE 702. For example, since an incoming call or incoming data addressed to the UE causes the first network to schedule a downlink channel with the UE, the second network can employ an agent residing on the Internet to manipulate the first network into allocating RAN resources. The selection of which UE(s) to connect to can be based on the aforementioned geographical specification. Each agent can be configured to receive and acknowledge data packets, such as part of a procedure to schedule and maintain uplink resources in the first network. In some aspects, a service residing on a device on a different network (or even in another part of the same first network) can establish a connection with a UE in a particular geographical location in order to manipulate the first network into allocating RAN resources in the corresponding geographical location. In some aspects, this can be useful when there are no UEs cooperating with the second network in a geographical area where RAN resources are needed.

When another device serves as a TCP or IP endpoint on behalf of the UE, then the second network can employ a service on the backhaul side of the endpoint that causes a request for a connection with the UE, thereby establishing (and optionally maintaining) a connection with the endpoint, which in turn causes a downlink in the RAN to be established with the UE 702. The resulting RAN resource allocation can then be co-opted by the second network 703. Those RAN resources can be reserved for as long as the second network needs them via activities of the service which keep the connection active 704.

By way of example, and without limitation, a service controlled by the second network (such as the aforementioned backhaul-side service) is configured to manipulate the first network via one or more layers (e.g., the transport layer, the internet layer, link layer), such as to establish 702 and/or maintain 704 a connection with a UE and causes the first network to allocated RAN resources, wherein the second network can then co-opt those RAN resources 703. In accordance with some aspects of the disclosure, the service can perform various actions, such as establishing a connection, terminating a connection, and/or adapting, selecting, or otherwise controlling resource usage. The service can manipulate the first network, such as via mechanisms employed in TCP used to ensure reliable transmission, error detection, flow control, congestion control, window scaling, priority, time-stamping and ordering, as well as other functions.

Some aspects of the invention can repurpose exploits traditionally used to harm a network in a manner that simply causes the targeted network to behave in a manner that serves the needs of the second network without compromising the service provided to legitimate first-network users.

Some of these exploits include address spoofing, synthesizing bogus connections, and acknowledgment flooding.

FIG. 7B is a block diagram that depicts methods and systems in accordance with some aspects of the disclosure. A second network employs at least one agent 711, which can reside on the backhaul side of the first network's RAN (such as on a server on the Internet, on a computing device connected to the first network's RAN, and/or on a computing device that is part of a network which is communicatively coupled to the Internet). Each agent can be configured by the second network to receive and acknowledge data packets 712, such as to provide for scheduling uplink RAN resources in the first network. Acknowledgements can include sending data, such as to initiate scheduling and maintain downlink resources in the first network.

The second network can co-opt the RAN resources in the first network to provide RAN resources for devices to employ in the second network. In accordance with needs of the second network, the second network instructs each agent to adapt control signaling (and/or data transmissions) 713 in the first network. In response to the instructions, each agent manipulates the first network via the control signaling (and/or data transmissions) to maintain or adapt the first network's resources 714 that are co-opted by the second network.

In one aspect, procurement of first-network spectrum resources comprises determining a geographical service area in the second network where spectrum resources are needed. A set of first-network cells which overlap the geographical service area can be determined. First-network nodes in the corresponding first-network cells can be determined, and from the determined nodes, at least a subset can be selected. Node IDs and cell IDs can be part of a geographic specification. As disclosed herein, the selected nodes and/or the at least one agent can cause the scheduling of first-network resources to serve the second network's geographical service area.

Figure 8A:
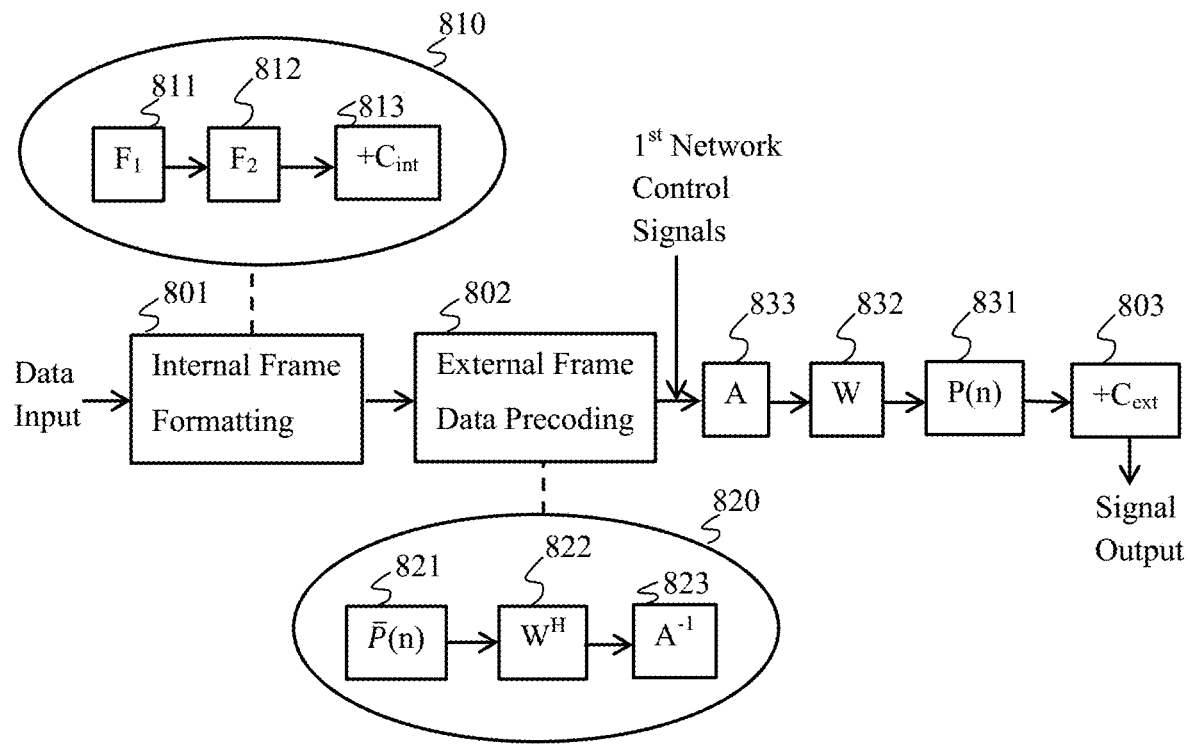
FIG. 8A is a block diagram of a transmitter configured in accordance with some aspects of the disclosure. The blocks can also indicate functional aspects, which can be implemented as methods and/or can comprise programming instructions residing on a non-transitory computer-readable memory.

FIG. 8A is a block diagram of a transmitter in accordance with some aspects of the disclosure. In a typical transmitter, user data is input to a set of Physical Layer processing components 833, 832, 831, and 803, which produces a baseband signal output to be coupled to a radio front-end (not shown) for transmission into a first network. As is known in the art, the components 833, 832, 831, and 803 can be in a different order, can possibly include additional components, or one or more of the components 833, 832, 831, and 803 may not be present.

By way of example, component 833 represents an invertible transform operation "A," which can comprises scaling, mapping, and/or any of various invertible transforms. Component 832 represents a coding operation "W," which can comprise any of various types of encoding. Component 831 represents a scrambling operation "P(n)," which can represent various types of scrambling, spreading, and/or interleaving. Component 803 adds control information to the data and can comprise one or more operations disposed anywhere in the sequence of operations 833, 832, and 831, such as preceding and/or following the sequence 833-831. Addition of control information 803 can comprise embedding signals into the resources, such as inserting training sequences or other control information into subcarrier frequencies, time slots, and/or code spaces. Control information 803 can include CRCs, parity bits, and/or other symbols inserted ahead of, behind, and/or inside a data sequence. Control information 803 can include guard intervals, prefixes, postfixes, and or other control and/or management signals.

In a typical receiver (not shown), received baseband data is processed in a manner that reverses the baseband processes in the transmitter (e.g., the processes represented by components 833, 832, and 831). Such reversal can comprise an adjugate (e.g., the product of a receiver's operator on its corresponding transmitter operator results in a diagonal matrix), an inverse (e.g., the product of a receiver's operator with its corresponding transmitter operator produces an Identity matrix), and/or complementary operations which return post-processed data to its pre-processed state. By way of example, a receiver might remove the control information inserted by component 803, followed by a despreading operation $\bar{P}(n)$ that reverses the operation of component 831, followed by a decoding operation $W^H$ that reverses the operation of component 832, followed by an invertible transform $A^{-1}$ that reverses the operation of component 831.

The transmitter depicted in FIG. 8A can perform internal frame formatting 801 on input user data, followed by external frame data precoding 802. The processed data is then input (optionally, along with control signals) into the baseband processing chain (comprising components 833, 832, 831, and 803) of a typical transmitter.

In one aspect, the components 833, 832, 831, and 803 are typical baseband processing components of a transmitter configured to operate in a first network. These components 833, 832, 831, and 803, even when implemented in an SDR, may not be accessible by an Application-Layer program or any other user-input mechanism. Thus, the external frame data precoding 802 can comprise necessary reversal operations 820, which includes $\overline{P}(n)$ 821, $W^H$ 822, and $A^{-1}$ 823 to reverse the operations of transmitter components 833, 832, and 831, respectively. This external frame data precoding 802 can be performed at the Application Layer, such as by a software application residing on a user device configured to operate in the first network.

The internal frame formatting 801 processes user data for communication in a second network in a manner that can be transparent to the first network. For example, second-network processing 810 can comprise a first processing function $F_1$ 811 followed by a second processing function $F_2$ to provide for Physical-Layer formatting of the user data according to a second Physical Layer format employed by transmissions in the second network. In some aspects, some Physical-Layer properties can be shared between the first and second network while the second network employs at least one different Physical-Layer property. For example, the second network might adopt the OFDM features of the first network, yet perform a different MIMO processing. In some aspects, processing function $F_1$ and/or $F_2$ may comprise MIMO precoding, such as cooperative MIMO precoding.

Control signals exclusively for use in the second network can be added to user data 813. These control signals can include any of the types disclosed herein and can be inserted at any location(s) within the user data and/or embedded in the Physical-Layer resources. In some aspects, the internal frame formatting 801 can be performed at the Application Layer, such as by application software residing on a user device configured to operate in the first network. Alternative aspects might provide for better access to signal-processing components in the transceiver, and, thus enable certain first-network transceiver components to be bypassed, at least for certain signals. This can avoid at least some of the external frame precoding 802.

As used herein, the user plane carries the network user traffic, and the control plane (which includes the management plane) carries signaling traffic. Software-defined networking (SDN) decouples the data and control planes and removes the control plane from network hardware and implements it in software instead, which enables programmatic access.

In accordance with some aspects of the disclosure, the second network processing operations 810 produce signals for the second network's user plane and, optionally, the second network's control plane. These second-network signals are then processed into the first network's user plane. In some aspects, first network control signals might be added to the user plane signals. For example, a CRC can be appended to the data sequence (or otherwise inserted) before processing blocks 833, 832, 831, and 803. These first network control signals may need to be processed based on the formatting 810 in order to function in the first network in a desirable way. In some aspects, second-network precoding is provided to at least some of the second-network control signals, such as to provide control signals to specific UEs. In some aspects, at least some second-network control signals might not be precoded, such that those control signals are broadcast to multiple UEs.

In some aspects, certain control signals embedded in the user data are used by the first network. Such signals, including TCP, UDP, IP, PDCP, and/or RLC headers, can be inserted as first-network control signals before processing blocks 833, 832, 831, and 803, such as to ensure that first-network processing of this control-plane data proceeds normally. Second network control signals are embedded in the first network's user plane, such as to ensure that only the second network's control plane operates on those signals.

Figure 8B:
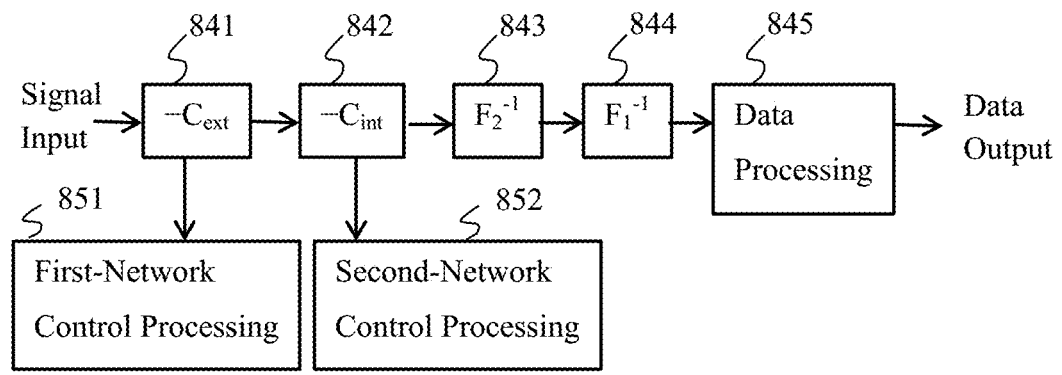
FIG. 8B is a block diagram of a second-network receiver configured to operate in accordance with certain aspects of the disclosure. The blocks can also indicate functional aspects, which can be implemented as methods and/or can comprise programming instructions residing on a non-transitory computer-readable memory.

FIG. 8B is a block diagram of a second-network receiver configured to operate in accordance with certain aspects of the disclosure. Received signals are formatted with respect to a first network's Physical-Layer format, and the first-network data-plane portions of the received signals comprise signals formatted with respect to a second network's Physical-Layer format, and may optionally comprise second-network control-plane signaling.

After RF front-end processing (not shown), a received baseband signal is processed by an external frame control signal removal block 841, which removes first-network control-plane signals from the baseband signal. Some of the first-network control-plane signals may be discarded, while other first-network control-plane signals are processed by a first-network control processing block 851. For example, certain control signaling employed in the first network can be used for control operations by the second network, such as to avoid redundant signaling.

The received baseband signal is also processed by an external frame control signal removal block 842, which removes second-network control-plane signals from the baseband signal for processing in the second-network control processing block 852. It should be appreciated that the order in which first-network control processing 851 and second-network control processing 852 can vary, and such operations can be interleaved within the baseband processing functions of the receiver. Also, at least some of the control-plane processing represented by block 852 could be performed following any of the processing blocks 843, 844, and 845.

In one aspect, the second network's user data (and, optionally, at least some of the control signals) is (are) processed by Physical-Layer processing blocks 843 and 844, which reverses corresponding second-network Physical-Layer processing (e.g., blocks 812 and 811 in FIG. 8A) performed on the transmitter-side of the link and/or distortion due to propagation in the second network's channel. In another aspect, the channel reverses second-network precoding performed by the transmitter(s). In some aspects, the Physical-Layer processing blocks 843 and 844 may comprise similar processing functionality performed in the first network, but configured specifically for the second network's Physical Layer. By way of example, Physical-Layer processing 843 and/or 844 may comprise acquisition of second-network CSI that employs different training sequences than those used in the first network and/or may comprise spatial demultiplexing that employs a different technique (e.g., Cooperative-MIMO, maximum ratio combining, zero forcing, etc.) than used in the first network. In other aspects, the Physical-Layer processing blocks 843 and/or 844 can differ in other ways with respect to processing functions employed by first-network transceivers. Additional processing denoted by "data processing 845" can be performed anywhere with respect to the sequence of processing blocks 841-844.

Figure 9A:
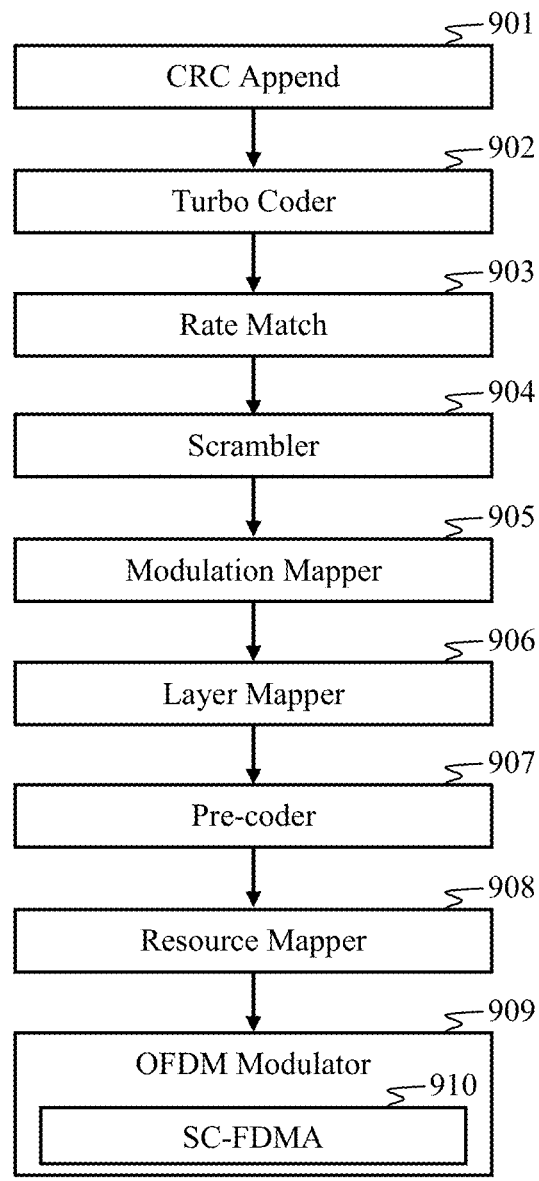
FIGS. 9A and 9B are block diagrams that illustrate method and apparatus aspects configured in accordance with examples in the disclosure.
Figure 9B:
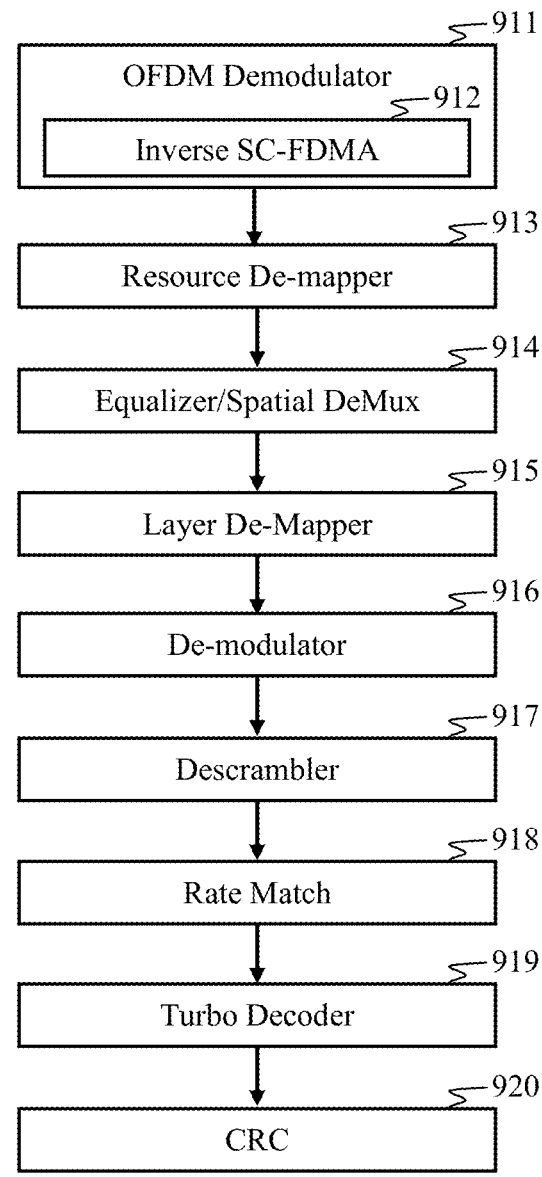

FIGS. 9A and 9B are block diagrams that illustrate method and apparatus aspects configured in accordance with examples in the disclosure.

A cyclic redundancy check (CRC) 901 is used for error detection in transport blocks. Each transport block is divided by a cyclic generator polynomial to generate a number of parity bits, which are then appended to the end of the transport block. Also, filler bits can be added so the code block sizes match a set of valid block sizes input to turbo code. This allows the receiver to detect bit errors in block 920 and to forward only error-free packets to the IP layer (not shown).

In one aspect, a first set of CRCs is used for the first network's transport blocks, and a second set of CRCs is used for the second network's transport blocks.

A channel coder, such as a turbo coding block 902, can be used for channel coding. In one example, an input sequence is input to a first convolutional coder, and a permuted version of the input sequence is input to a second convolutional coder. Turbo decoding 919 reverses the coding 902 and helps correct for errors resulting from transmission. Other types of coding can be used, including low-density party check coding. In some aspects, the second network can provide different and/or additional channel coding to that provided by the first network.

A rate matching block 903 produces an output bit stream with a desired code rate. Any of various rates may be produced. In one aspect, the bit streams from the turbo encoder 902 are interleaved, followed by bit collection to create a circular buffer. Bits are selected and pruned from the buffer to produce an output bit stream with the desired code rate. Rate matching block 918 reverses the operations of block 903.

Scrambling 904 produces a block of scrambled bits from input bits. Modulation 905 maps bit values to complex modulation symbols according to at least one predetermined modulation scheme. Layer mapping 906 splits the data sequence into a number of layers. Corresponding blocks 917, 916, and 915 reverse the operations of the aforementioned blocks 904, 905, and 906.

It should be appreciated that different scrambling 904, modulation 905, and/or layer mapping 906 may be provided to the second-network data.

Precoding 907 is used for transmission in multi-antenna wireless communications. For example, a signal intended for each of a plurality of receivers is emitted from each transmit antenna with appropriate weighting (phase and gain) such that the signal power is maximized at that receiver.

In one aspect, the precoding 907 is configured for the second network. Second precoded transmissions are received by the second network, wherein they enable spatial multiplexing, such as to provide superior spectrum efficiency. Ideally, the effects of precoding 907 are completely reversed by the channel, resulting in the receiver seeing the original data stream before precoding 907. But when received at the first network, the effects of second precoding may not be undone by the propagation channel or equalizers at the receiver. Thus, the received signals at the first network are likely to fail the cyclic redundancy check 920. This can trigger a retransmission event. However, persistent failures might cause the first network to rescind the allocated resources for the link.

In some aspects, precoding 907 is also configured for the first network in a manner that enables the first network to received error-free first-precoded transmissions. In one aspect, selection of first-network and second-network precoding can be toggled, such as to maintain a link in the first network in order to retain the resources allocated for that link. The transmission of first-precoded signals can be scheduled periodically or intermittently. The second network can ignore the first precoded transmissions.

In one aspect, precoding 907 is configured to cancel out second-network transmissions at a first-network receiver such that the first network is not affected by the signals transmitted in the second network. For example, the second network might employ a number of transmit antennas that is at least equal to the number of spatial subchannels employed by the second network for a given resource allocation, plus the number of first-network antennas connected to a receiver that is listening to the resource.

The resource-mapping block 908 maps the actual data symbols, reference signal symbols, and control information symbols into resource elements in a resource grid. Each physical channel corresponds to a set of resource elements in the time-frequency grid that carry information from higher layers. The basic entities that make a physical channel are resource elements and resource blocks. A resource element is a single subcarrier over one OFDM symbol, which typically carries one modulated symbol. However, in aspects of the disclosure, the second network employs Cooperative-MIMO, which enables each resource element to carry multiple modulated symbols. Thus, there is a compelling need for aspects of the disclosure that co-opt resources from poorly implemented wireless (e.g., cellular) networks and employ far more efficient use of those resources. A resource block is a collection of resource elements, which, in the frequency domain, represents the smallest quanta of resources that can be allocated. Resource de-mapping 913 essentially performs the inverse of resource mapping 908.

In the OFDM modulator 909, the LTE uplink employs a discrete Fourier transform (DFT)-spread OFDM (also denoted as single-carrier frequency division multiple access [SC-FDMA] 910). SC-FDMA, also known as "the poor man's Carrier Interferometry (CI)" was "discovered" nearly a decade after CI coding was first published. SC-FDMA is a sub-optimal implementation of the larger class of CI coding. SC-FDMA employs the same polyphase codes as basic CI, but with the limitation that the code length is constrained to powers of two, whereas CI codes can be any length. Also, DFT spreading produces a sinc-shaped pulse, which has poor peak-to-average power (PAPR) compared to other pulse shapes, such as raised-cosine and Gaussian shapes, whereas CI with frequency-domain shaping achieves much lower PAPR by synthesizing the better-performing pulse shapes. In the OFDM demodulator 911, an inverse SC-FDMA block 912 reverses the poorly conceived SC-FDMA processing 910. Some aspects of the invention can employ CI coding and decoding instead.

Figure 10:
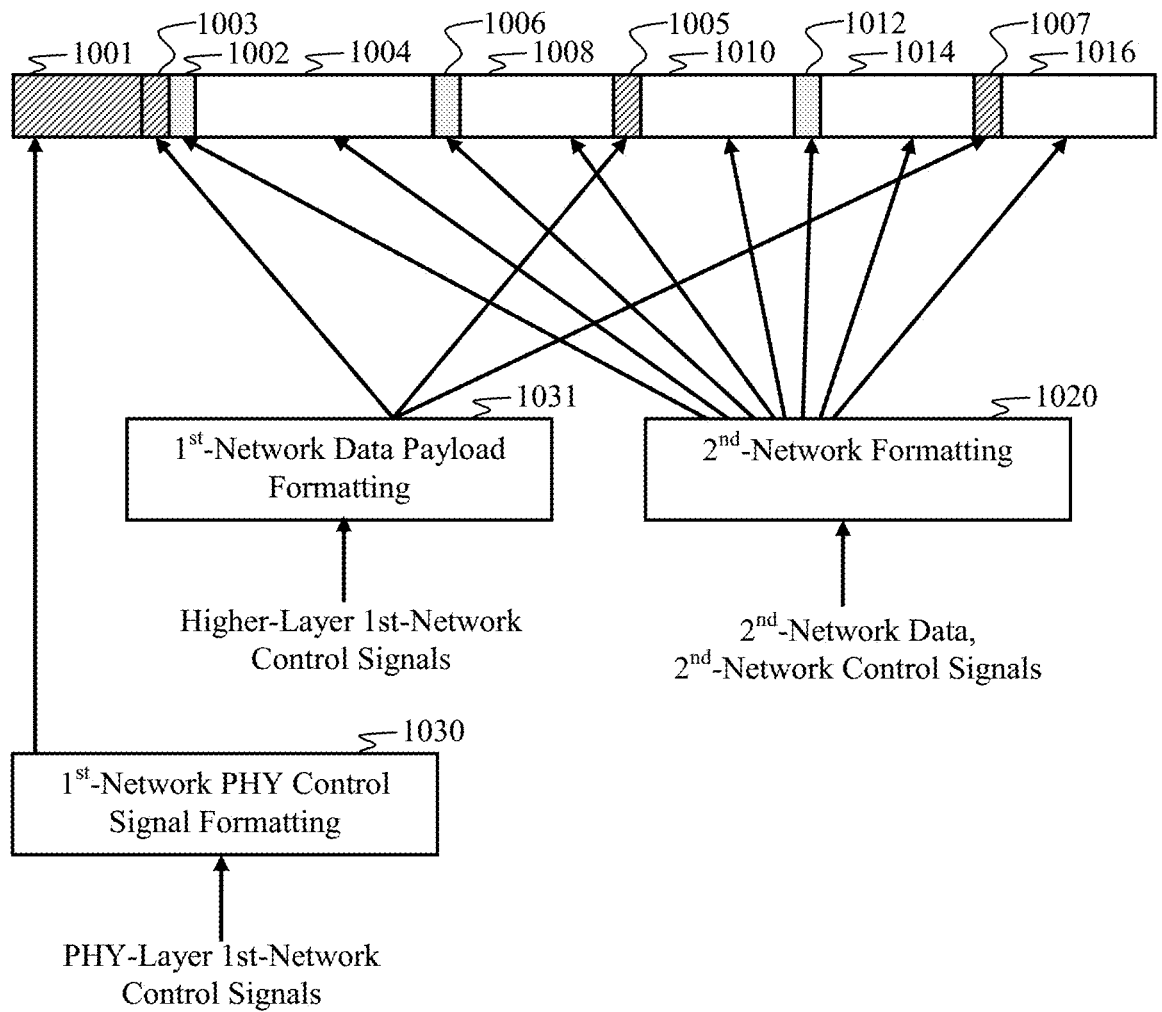
FIG. 10 depicts a frame-inside-a-frame signal structure that can be employed in accordance with aspects of the disclosure. Aspects disclosed herein include method and apparatus embodiments configured for processing such signals. In some aspects, the disclosed signal structure is configured to enable a second network to operate surreptitiously with respect to a first network. In other aspects, the disclosed signal structure facilitates interoperability between at least two cooperating networks.

FIG. 10 depicts a frame-inside-a-frame signal structure that can be employed in accordance with aspects of the disclosure. A first-network frame, such as a transport block (TB) in an LTE system, comprises first-network control portions (such as control signals 1001, 1003, 1005, and 1007) and first-network user-data portions (such as signals 1002, 1004, 1006, 1008, 1010, 1012, 1014, and 1016).

By way of example, first-network control portions can include PHY-Layer headers, TCP headers, UDP headers, PDCP headers, RLC headers, IP headers, MAC-Layer control signals (e.g., other types of MAC headers, ARQ signaling, etc.), and/or the like. While not shown in the Figure, control portions can include subcarriers, code spaces, and/or other resource elements.

In one aspect, the PHY-Layer supports forward error detection by appending a TB with a CRC sequence computed from all bits in the TB using the 24-bit CRC generator polynomial $g_A(D)$. In some cases, a large block is segmented and another CRC may be added to each segment. This allows the receiver to detect bit errors and to forward only error-free packets to the IP layer. For example, when a coded TB is received, the receiver first decodes the error-correction code. If the channel quality is good enough, all transmission errors should be correctable, and the receiver can obtain the correct data block. If the channel quality is poor and not all transmission errors can be corrected, the receiver might detect this situation using the error-detection code, then the received TB is rejected and a re-transmission is requested by the receiver, similar to ARQ.

In one aspect, PHY-Layer control signals for the first network are processed by first-network PHY control signal formatting 1030. For example, all the bits in the TB may be input to the control signal formatting 1030, which then uses the CRC generator polynomial to generate the CRC. Other first-network control signals may be processed by the control signal formatting 1030.

In aspects in which the first network cooperates with the second network, control signals can be provided for communicating and coordinating control between the first and second networks. In one aspect, the second network can add a control signal to a frame to inform the first network that the frame is being used for communicating in the second network. The control signal can instruct the first network to suspend certain processing operations for the frame (and possibly for a number of following frames). For example, the first network might suspend CRC operations for second-network TBs.

Formatting 1030 can be more complex when the first-network user-data portions comprise user data and control signals for a second network, such as when precoder mismatch occurs. Thus, aspects of the invention can comprise various techniques to account for what signals a first-network receives, and provide for techniques to cause the first-network receiver to respond in a manner that is advantageous for the second network. By way of example, the control signal formatting 1030 might use CSI derived for the channel between the second-network transmitter(s) and the first network receiver(s) to estimate the CRC that the first network receiver(s) will calculate from the TB. Then the second-network transmitter system generates a CRC for the TB that, when received by the first network receiver(s), will match the estimated CRC. The CRC can comprise precoding derived from the CSI.

Other features of the radio frame, such as other control signals, guard intervals, cyclic prefixes (and/or postfixes), reference signals, etc., can be handled by the control signal formatting 1030.

In some aspects, the control signal formatting 1030 can handle received signals as part of a receiver's functionality. In one aspect, the control signal formatting 1030 my process a first-network CSC in a received TB and then return a response to the first network based on results of the processing. In another aspect, the control signal formatting 1030 may simply return a predetermined response to the first network regardless of the results or even whether or not processing is performed. In other aspects, the control signal formatting 1030 might handle other control signals.

Higher-Layer (e.g., above the PHY-Layer) control signals in the first network can be inside the PHY-Layer data payload of the first network's frame. For example, inside a PHY-Layer frame (e.g., a transport block), each MAC-Layer protocol data unit (PDU) can have a MAC header and padding. Inside a MAC service data unit (SDU), an RLC PDU can have an RLC header. Inside an RLC SDU, each PDCP PDU can have a PDCP header. Inside each PDCP SDU, IP packets might contain control bits. In some aspects one or more of these control signals (e.g., any of the headers and/or other control signals) can be processed in a first-network data payload formatting block 1031. For example, it can be useful for a radio signal transmitted by a second-network transmitter to be correctly processed by the first network such that data packets (e.g., IP packets) reach their intended destination on an IP network. The destination might be an agent that is part of (or working on behalf of) the second network. While the data packets might comprise decoy user data or user data that is not formatted in a manner that directly conveys information to the agent, receipt of the packets by the agent (or at least acknowledgement of receipt) can serve the second network by providing first-network radio resource allocations that the second network can co-opt.

In some aspects, the first-network data payload formatting block 1031 can process the corresponding higher-layer control signals in a received first-network transmission. For example, the first-network data payload formatting block 1031 may reside on the agent and/or on at least one second-network transceiver in the RAN and be configured to respond to control messaging in the higher-layer protocols. For example, block 1031 can be configured to participate in ARQ, calculate checksums, detect errors, or simply respond according to predetermined criteria, such as automatically acknowledging receipt of data, requesting retransmission, and the like.

Second-network user-data portions comprise segments 1004, 1008, 1010, 1014, and 1016, and second-network control portions comprise segments 1002, 1006, and 1012. Since the user-data portions 1004, 1008, 1010, 1014, and 1016 and the control portions 1002, 1006, and 1012 are inside the first network's user-data portions, these second-network portions can be coded according to an alternative (i.e., second-network) PHY-Level format in a manner that does not impede the operation of the first network. The second network's user data and control signals are input to a second-network formatting block 1020. In some aspects, block 1020 can provide for second-network PHY-Level formatting. In some aspects, second-network PHY-Level formatting can include MIMO precoding (such as Cooperative-MIMO precoding) which is particular to the second network. The second-network formatting block 1020 can provide other PHY-Level processing, such as providing for CRC (and, optionally, other control parameters) used exclusively by the second network. The second-network formatting block 1020 can provide higher-layer control functions, such as processing MAC, RLC, PDCP, and/or IP control functions.

In one aspect of the disclosure, after error correction coding (e.g., CRC, turbo coding, rate matching) and other data processing (e.g., scrambling, modulation mapping, layer mapping, etc.), precoding (such as performed by block 1020) can apply a pseudo-inverse of the channel matrix, H, to data x (which can comprise the second-network user data and control data). In the case of zero-forcing, the pseudo-inverse is expressed as $H^+=H^*(HH^*)^{-1}$, which effectively removes the mutual interference at the receiver, which receives $y=HH^+x \approx x$.

Although zero-forcing (ZF) is described here, other types of precoding can be employed. In any of the aspects disclosed herein, minimum mean square error (MMSE) processing can be employed. In some aspects, maximum ratio processing (e.g., maximum ratio combining (MRC)) can be employed. In some aspects, a combination of techniques can be performed. For example, ZF can be performed at high SNR, and MRC can be performed at low SNR. Any of various processing techniques can be employed based on other criteria, such as (but not limited to) availability of processing resources, number of antennas, number of subspace channels, CSI, CQI, etc. Precoding can be directed to what is known as the multi-user interference cancellation problem, wherein precoding nulls interference among concurrent spatial streams of the transmitted signals. Precoding can employ linear or non-linear techniques, including ZF, Block Diagonalization (BD), Dirty Paper Coding (DPC), etc. Received signal processing can pertain to solving the multi-user detection problem, which can employ techniques, such as MMSE, maximum likelihood (ML), Sphere Decoding, Successive Interference Cancellation (SIC), etc.

On the receive side of the link, the second-network formatting block 1020 can perform corresponding functions related to transmit-side second-network formatting. The block 1020 can reside on the agent and/or on one or more second-network transceivers. The block 1020 can discard or otherwise ignore first-network control signals and/or process first-network control signals that enable control of signals in the second network. The block 1020 can provide operations that reverse the second-network formatting of the user data (and, optionally, the second-network control data). In one aspect, the second-network formatting block 1020 can process second-network CSI to provide for spatial demultiplexing of received second-network signals. In some aspects, block 1020 provides for assigning co-opted first-network RAN resources for reference-signal transmissions, such as part of a process for determining CSI in the second network. Block 1020 may also provide mechanisms for feeding back CSI measurements from remote receivers. In some aspects, block 1020 provides the corresponding receive-side processing of transmit-side control functions, including PHY, MAC, RLC, PDCP, and/or IP control functions.

As disclosed herein, some aspects can provide for processing in the data payload portion of a first-network frame in a manner that negates the normal first-network PHY-layer operations (such as blocks 833, 832, and 831 in FIG. 8). By way of example, a second-network control signal might comprise a single-carrier signal, whereas the user-data portion of the first-network frame is a multicarrier (e.g., OFDM) signal. Thus, block 1020 can be configured to condition the control signal in a manner that counteracts OFDM modulation in the first-network transmitter. In one aspect, the block 1020 performs DFT spreading of the single-carrier signal such that the IFFT operation performed by OFDM maps the DFT-spread signal into a single-carrier signal.

In a related aspect, the block 1020 may comprise a subcarrier mapping module that maps the DFT output to a subset of the subcarriers. The subcarrier mapping assigns the DFT output complex values as amplitudes of some of the selected subcarriers. In one aspect, subcarrier mapping can comprise localized mapping wherein the DFT outputs are mapped to a subset of consecutive subcarriers, thereby confining them to a fraction of the total system bandwidth. In another aspect, subcarrier mapping can comprise distributed mapping wherein the DFT outputs are assigned to subcarriers over the entire bandwidth non-continuously (e.g., interleaved), resulting in zero amplitude for the non-assigned subcarriers. If the subcarriers are interleaved, the occupied subcarriers are equally spaced over the entire bandwidth. As viewed in the time domain, this interleaving results in a repetition of the signal. Thus, interleaving may be provisioned for repetitive signals used for control in the second network, such as signals employed for acquisition and/or synchronization.

Figure 11A:
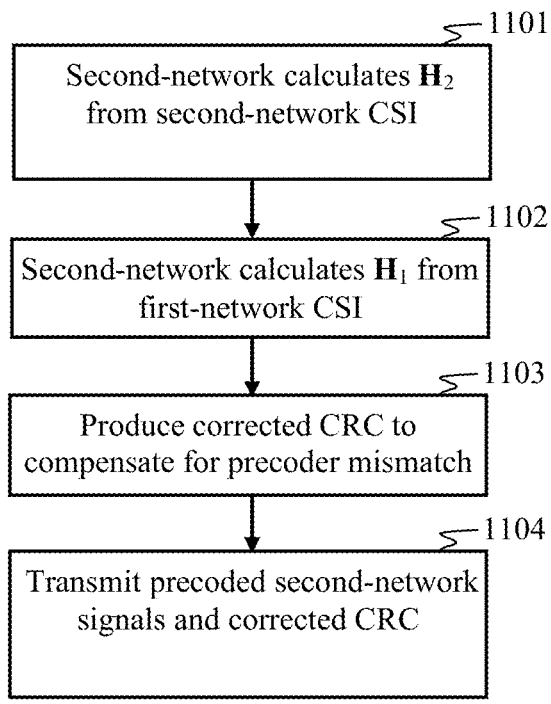
FIG. 11A depicts a method of co-opting a first network's uplink resources for communicating in a second network in accordance with certain aspects of the disclosure. Such aspects can be configured to enable a second network to operate surreptitiously with respect to a first network.

FIG. 11A depicts a method of co-opting a first network's uplink resources for communicating in a second network. In one aspect, an LTE network is assumed. Since at least one eNodeB in the first network listens to the uplink channel, transmissions produced by the second network can be formatted to be compatible with at least some of the first network's processing of uplink signals. In one aspect of the invention, a precoder in a second network calculates a pseudo-inverse of a channel matrix $H_2$ for a MIMO channel in the second network (e.g., between multiple devices in the second network). The pseudo-inverse can be expressed as $H_2^+=H_2^*(H_2H_2^*)^{-1}$. This results in canceling out the effects of the channel $H_2$ for data $x_2$ that is precoded and then received at the second network's receiver(s). Receiver processing can comprise complementary (e.g., inverse) processing of corresponding transmitter processes performed prior to precoding. Accordingly, error detection will determine that no bit errors occurred. However, the signal received at a first network's receiver is $y_2=H_1H_2^+x_2=H_1H_2^*(H_2H_2^*)^{-1}x_2$, since the precoding fails to cancel out the channel $H_1$ effects. This can cause CRC error detection in the first network's receiver(s) to fail, and is called precoding mismatch. Thus, in one aspect of the invention, the second-network transmitter(s) produces a CRC sequence (such as via process 1030) that compensates for any precoding mismatch.

In one aspect, the second-network precoding matrix (e.g., pseudo-inverse matrix $H_2^+$) is calculated 1101. For example, the precoding matrix can be calculated from channel state information measured from known training sequences transmitted in the second network using techniques that are known in the art. The first-network channel $H_1$ is also calculated by the second network 1102. For example, channel state information can be calculated from a known training sequence(s) transmitted by the first network's eNodeB(s) that are received by the second network's WT(s) which will transmit the precoded data.

As described herein, the WT(s) can comprise UEs, base transceiver stations, relays, etc. In some aspects, the WT(s) directly measure the channel state information. Then the channel state information is routed to a processor (e.g., a central processor, one of the WTs, a distributed computing platform, etc.) for additional processing. In some aspects, channel state information may be calculated at a central processor, which may comprise a cloud data center or a manager of any of various types of distributed computing resources. In some aspects, any of the various processing tasks, including (but not limited to) channel estimation, precoding, and CRC processing can be assigned to any of multiple devices in the second network. Aspects of the invention can provide for allocating distributed computing resources to perform processing tasks disclosed herein.

The second network produces a corrected CRC sequence that compensates for the precoding mismatch 1103. For example, in one aspect, the second network calculates the data that the first network will perform its check on. This data includes the distorted data due to the precoding mismatch, as well as any data that does not undergo second-network precoding before it is transmitted. For example, certain control signals may not be precoded by the second network. The calculation may take into account various processes performed by the first-network receiver(s), including equalization. The corrected CRC for the estimated data is calculated and then transmitted 1104 along with precoded second-network signals to the first network. In one aspect, the corrected CRC is precoded to compensate for the channel $H_1$ effects. In another aspect, the corrected CRC is compensated for precoding mismatch before being precoded by $H_2^+$. In an alternative aspect, the corrected CRC is not precoded. In some aspects, first-network reference signals transmitted by the second network may be precoded.

In accordance with some aspects of the invention, other first-network control signals may be precoded, such as to compensate for the channel $H_1$ effects or precoding mismatch prior to transmission by the second network. In some aspects, reference signal transmissions can be precoded such as to induce a predetermined equalization result at a remote receiver.

Figure 11B:
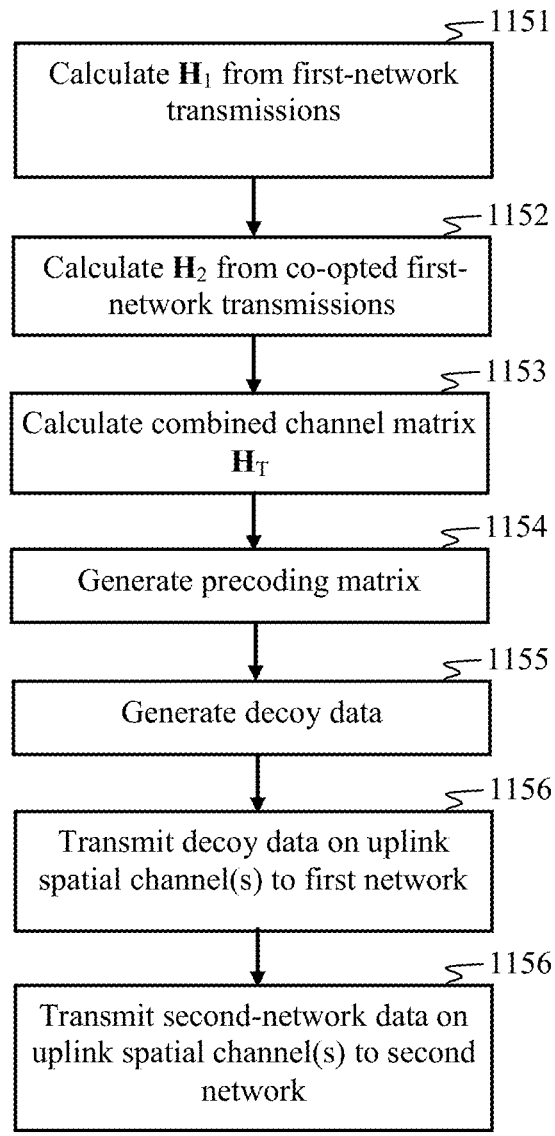
FIG. 11B depicts a method of co-opting a first network's uplink resources for communicating in a second network in accordance with aspects of the disclosure.

FIG. 11B depicts another method of co-opting a first network's uplink resources for communicating in a second network. An LTE network is assumed as the first network. However, other types of networks may be employed. In one aspect, since the eNodeB(s) in the first network listen to the uplink channel, transmissions produced by the second network can be precoded to avoid being detected by the first network. At the same time, a decoy signal can be precoded to be received by the first network, formatted to be compatible with the first network's uplink signal processing, and configured to preserve the first network's resource allocation for as long as needed by the second network.

In another aspect of the invention, the second network determines channel state information corresponding to allocated uplink channel resources in the first network 1151. For example, a plurality of transceivers in the second network can listen to training sequences transmitted by the eNodeB(s) in the first network to determine corresponding first-network CSI. The transceivers in the second network co-opt the allocated channel resources for use in the second network, so the second network also determines channel state information for the same allocated channels, but for use in the second network 1152. For example, a plurality of transceivers in the second network can listen to training sequences transmitted by other transceivers in the second network, such as after the first network's channel resources have been co-opted.

The manner of determining CSI in the second network may mimic the techniques employed in the first network. In some aspects, the second network can employ feedback in which a receiver's CSI is reported back to the transmitter(s), and/or exploit channel reciprocity following calibration to infer uplink (downlink) channel characterizations from downlink (uplink) channel measurements. Based on measurements of both $H_1$ and $H_2$, the second network can calculate a combined channel matrix $H_T$ 1153 from which to produce a precoding matrix 1154. For example, in the zero-forcing case, the pseudo-inverse of the combined channel matrix $H_T$ can be expressed as $H_T^+ = H_T^*(H_T H_T^*)^{-1}$. In some aspects, other types of precoding may be used instead. The precoding prevents co-channel interference, not only between the first and second network, but also between multiple spatial channels employed by either or both networks.

Decoy data is generated 1155 to occupy the first network's data channels, such as to preserve the first network's resource allocation which is being co-opted by the second network. This data may be properly formatted with respect to first-network data-processing requirements. In some aspects, the data is addressed to an IP address where an agent resides and operates on behalf of the second network. The decoy data is allocated to the uplink spatial channel(s) to the first network's eNodeB(s) 1156, while data for transmission in the second network is allocated to corresponding second-network spatial channels 1157.

FIG. 12A depicts a method of co-opting a first network's downlink resources for communicating in a second network. In one aspect, since the eNodeB(s) in the first network are transmitting in the downlink channel, a decoy signal is formatted 1201 and transmitted 1202 in the first network in a manner that facilitates its removal 1203 from received second-network transmissions that use the same downlink resources.

The decoy signal can originate from an agent residing on a remote host controlled by (or otherwise acting on behalf of) the second network, and it may be configured to keep the downlink channel occupied such as to reserve those resources. In some aspects, the decoy signal may be intermittent, which may allow for resources to be reserved, even during short intervals in which they are not being used. The second network may advantageously use such so-called "white spaces" for its transmissions.

In one aspect, the decoy signal is coded, filtered, or otherwise designed with a predetermined structure 1201 that allows it to be easily removed from desired signals received by the second-network receiver(s). The decoy signal may be coded to occupy a particular multiple-access code space such that decoding can separate the decoy from desired signals occupying at least one other code space. For example, a decoy signal may occupy code-space "zero" of a 64-bit Walsh code, whereas the second-network transmissions occupy code spaces one to 63. In other aspects, CI codes or other types of multiple access codes may be used. In some aspects, coding can map the decoy signal to a particular sub-band of the baseband signal such that filtering can remove the decoy from desired signals. In one aspect, the decoy signal provides a dc bias to signals received in the second network, which can be easy to remove. In other aspects, the decoy signal may be provided with some other predetermined structure that facilitates a multi-user detection process at the receiver to remove the effects of the decoy. In some aspects, the decoy signal can convey useful information for the second network, such as control signals.

In step 1202, the decoy signal is transmitted by the first network. For example, the agent can cause the decoy signal to be transmitted in the RAN by causing a downlink to be initiated with a first-network UE and/or responding to uplink data in the first-network UE's transmission.

In step 1203, second-network receivers can employ any of various types of filters (e.g., frequency filters, time filters, matched filters, decoding filters, MUD filters, etc.) to remove the decoy signal from signals received from second-network transmitters. In some aspects, the second network may communicate with the agent in order to adapt the decoy signal 1204.

FIG. 12B depicts another method of co-opting a first network's downlink resources for communicating in a second network in accordance with aspects of the disclosure. An agent (such as an agent working on behalf of the second network) can request a communication session with a UE in the first network in order to cause the first-network RAN to schedule first-network downlink RAN resources to the UE 1211. The allocated first-network RAN resources are then co-opted by the second network 1212 to be scheduled for second-network RAN communications 1213. For example, the first-network identity of the UE can be conveyed to a second-network device that listens to a first network's broadcast channel (e.g., the PDCCH in LTE) that provides control information for the UE (and/or a group of UEs). Upon receiving scheduling information for the UE(s), the second network performs a scheduling procedure to schedule the first-network RAN resources for use by devices in the second network.

If the eNodeB's are not listening to the user downlink channels in the PDSCH, and multiple first-network UEs are not sharing the same resource, then devices in the second network can co-opt the downlink RAN resources without interfering with the first network. However, the second network must deal with potentially interfering first-network transmissions in the downlink resource scheduled for the UE. As disclosed herein, any of various types of filtering can be employed. In one aspect, the filtering can comprise spatial demultiplexing 1214 to separate the interfering first-network transmissions from the desired second-network transmissions. In one aspect, spatial demultiplexing 1214 takes the form of multi-user detection for receive-side processing. In another aspect, spatial demultiplexing 1214 can take the form of transmitting a cancellation signal to cancel the first-network transmissions at one or more second-network receivers. Other types and various combinations of spatial demultiplexing 1214 can be performed.

The signal originating from the agent can comprise a decoy signal and/or useful information (such as user data and/or control messages). By way of example, the agent can comprise an application program residing on at least one remote server configured to serve data files (e.g., media) requested by the UE. In one aspect, the at least one remote server arranges for delivery of the requested data via multiple backhaul paths, including one backhaul path from the server(s) to the first-network RAN and at least one backhaul path from the server(s) to the second-network RAN. Cooperative subspace coding, such as disclosed in applications incorporated by reference herein, can be useful for ensuring highly efficient data communications over multiple concurrent network paths.

Optionally, the agent can be configured to adapt its signaling 1215, such as to provide signaling for second-network operations, influence the scheduling of first-network resources, or control other operations in the first and/or second network that can enhance second-network performance.

In some aspects of the invention, Cooperative-MIMO can be performed when a Random Access (RA)-based MAC is employed, such as Distributed Coordination Function (DCF), which relies on CSMA/CA to detect and share the wireless channel. MIMO transmissions can occur in a DCF MAC as long as the back-off time is substantially less than the channel coherence time, which is typically related to Doppler.

In LTE, to keep transmissions from different UEs orthogonal, uplink transmissions are aligned with the frame timing at the eNodeB. When timing is not aligned yet, or when alignment was lost due to a period of inactivity during which time alignment was not maintained by the eNodeB, an RA procedure is performed to acquire time alignment.

Figure 13:
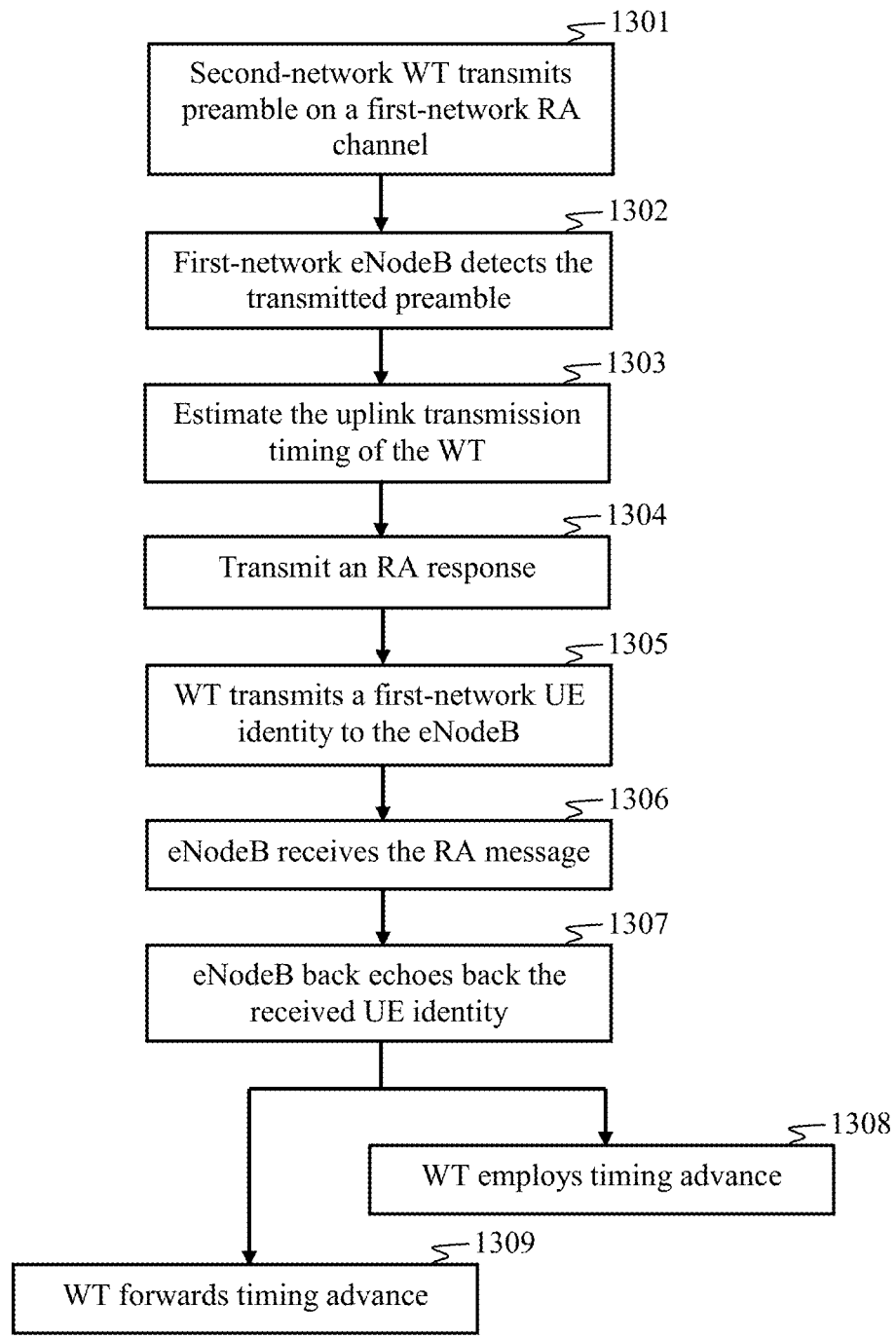
FIG. 13 is a flow diagram that depicts a method that employs a Random Access procedure in accordance with some aspects of the disclosure.

As depicted in FIG. 13, an RA procedure establishes time alignment in a second network by means of a contention-based procedure employed by a first network. A WT randomly selects an RA preamble sequence from a set of sequences available in a first network's cell and transmits it on a first-network RA channel 1301. A guard period is typically applied to the RA preamble transmission to avoid creating interference in adjacent subframes. To minimize non-orthogonal transmissions and thereby improve resource efficiency, unsynchronized and unscheduled transmissions, such as in step 1301, do not carry data.

The first-network eNodeB detects the preamble transmission 1302, estimates the uplink transmission timing of the WT 1303, and transmits an RA response 1304, which provides the WT with the correct timing-advance value to be used for subsequent transmissions and with a first grant for an uplink transmission. For efficiency, RA responses pertaining to different RA preamble sequences can be multiplexed.

Since the randomly selected RA preamble does not enable unique identification of the WT, and it is possible that multiple WTs attempted RA with the same RA preamble sequence on the same RA channel, the WT provides a first-network UE identity to the eNodeB with the first scheduled uplink transmission 1305. In one aspect, the WT is also a UE in the first network. In another aspect, a second-network WT employs at least one first-network UE identity from another device. Space remaining in the transport block after the first-network UE identification can be used for data.

The eNodeB receives the RA message transmitted by the WT 1306. The eNodeB resolves any potential contention by echoing back the received UE identity 1307. Upon seeing the UE identity echoed back, the WT concludes that the RA was successful and employs the timing advance 1308 and/or forwards the timing advance to a second-network transceiver 1309 for time-aligned operation of second-network transmissions with the first network.

In some aspects of the disclosure, the second network comprises a distributed MIMO system wherein multiple second-network WTs are coordinated by a central processor to operate as a large distributed multi-antenna access point, ensuring that all transmitted signal power serves the purpose of data transmission rather than creating interference. If full CSI is available, some aspects can implement Zero-Forcing Beamforming and Tomlinson Harashima Precoding (THP), which is near-optimal in high SNR conditions. Other types of precoding can be employed. For example, there has been extensive research on precoding schemes that can achieve a large fraction of theoretical capacity with low complexity. In the case of no CSI, a Blind Interference Alignment (BIA) scheme, a distributed space-time coding through Alamouti encoding, or other schemes might be used.

Figure 14A:
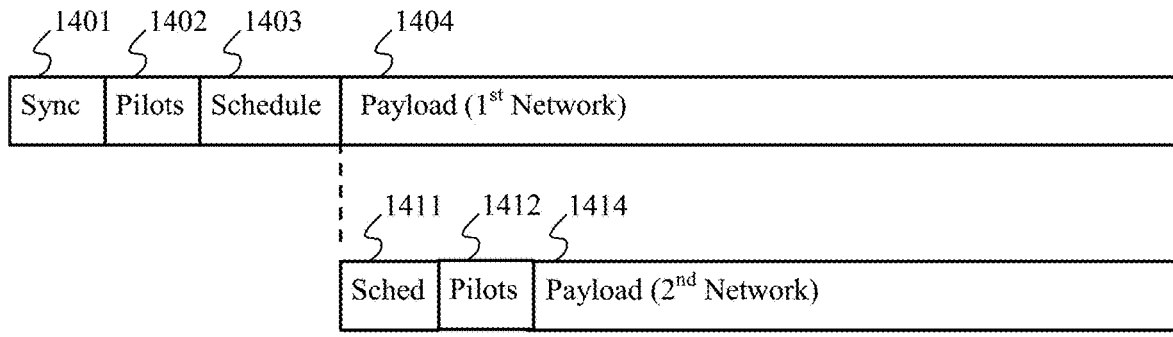
FIGS. 14A and 14B are diagrams of frame formats in accordance with method and apparatus aspects disclosed herein. Such frame formats, or at least portions thereof, can be employed simultaneously by a first network and a second network. In some aspects, the frame formats and associated methods and apparatuses can be employed in cooperating networks. In some aspects, the associated methods and apparatuses disclosed herein can be employed by a second network configured to operate surreptitiously with respect to the first network.

FIG. 14A is a diagram of a downlink frame format that can be employed simultaneously by a first network and a second network. The frame formats shown herein are disclosed in a manner that explains method and apparatus aspects of the invention. A downlink packet transmitted by the first network begins with a synchronization sequence 1401, which transmitters in the second network can use to achieve frame alignment, and receivers in the second network can use for block boundary detection. In some aspects, the sync 1401 can comprise a pseudo-noise sequence, a set of pilot signals orthogonal in time, or some other synchronization signal. Pilot transmissions 1402 in the first network can be used by second-network transceivers to determine initial phases of subcarrier tones. The pilots 1402 can also be used for channel estimation. The packet header usually comprises some sort of scheduling information 1403, which first-network UEs listen to. The second network also listens to the scheduling information 1403, and it can identify at least some of the first network's scheduled uplink and/or downlink resources for scheduling in the second network.

In one aspect, second-network transmissions are embedded in the data payload 1404 of the first network frame. The data payload 1404, which can be under control of a second-network agent, can comprise either or both user data and control information for the second network. For example, the data payload 1404 can comprise second-network scheduling 1411, pilots 1412 for second-network channel estimation, synchronization (not shown), and/or other control information (not shown). The scheduling 1411 can comprise an allocation map similar to those used in LTE, which assigns carriers to clients and specifies the constellations used in broadcasting to them. Second-network user data 1414 may be included.

In another aspect, the second-network transmissions are embedded in the data payload 1404 of the first network frame.

Figure 14B:
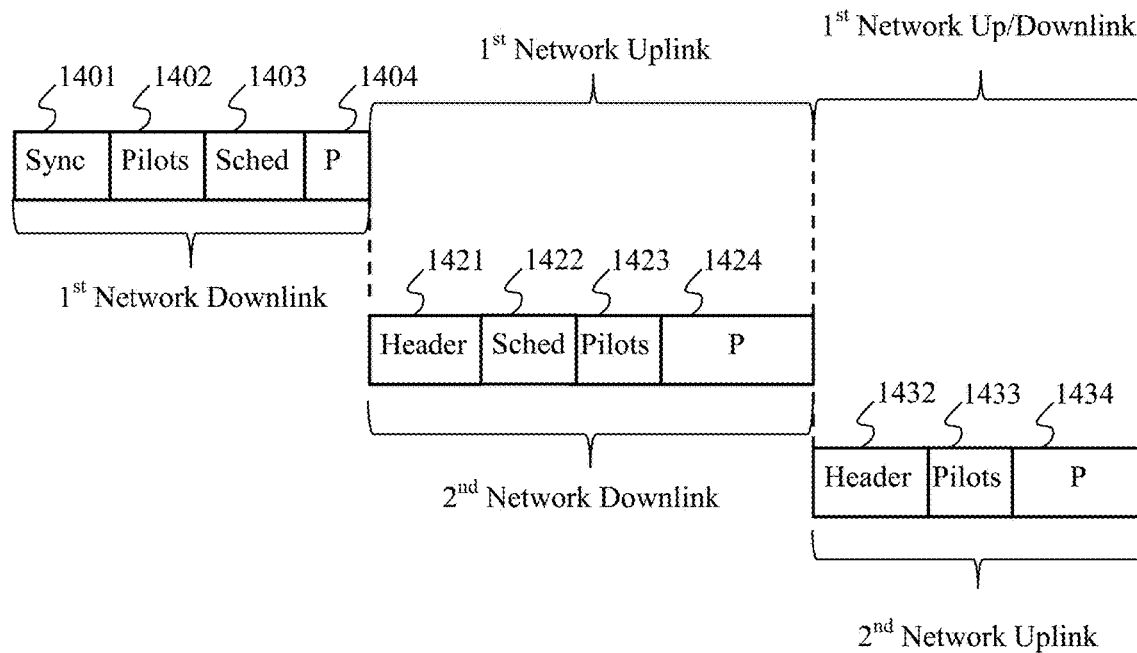

FIG. 14B is a diagram of a frame format employed by a second network that can operate parasitically with a first network. Apparatus and method aspects can be inferred from the following disclosure of the frame format. A downlink packet transmitted by the first network can begin with a synchronization sequence 1401, which transmitters in the second network can use to achieve frame alignment and receivers in the second network can use for block boundary detection. In some aspects, the sync 1401 can comprise a pseudo-noise sequence, a set of pilot signals orthogonal in time, or some other synchronization signal. Pilot signals 1402 can be used by second-network transceivers to determine initial phases of subcarrier tones. The pilots 1402 can also be used to estimate first-network channels, such as to be used for spatial filtering by the second network, as well as for other purposes. The packet header can also comprise first-network scheduling 1403, such as for UE uplink and/or downlink scheduling. The second network listens to the first-network scheduling 1403 so it can identify at least some of the first network's scheduled uplink and/or downlink resources to co-opt for use by the second network. For example, a first network UE cooperating with the second network can provide the second network with its first-network identity. In some aspects, the UE may simply inform the second network as to which first-network resources to co-opt.

In some aspects, channel-dependent scheduling can be performed. OFDM supports multi-user access because within a transmission interval, subcarriers can be allocated to different users. The channel conditions in a wideband system vary not only over time, but also can differ in the frequency domain. In the time domain, an LTE resource block has a subframe duration of only 1 ms. Such a short subframe enables the exploitation of channel variations by scheduling users depending on their current channel quality. If the UE provides its CSI measurements or sufficiently detailed channel-quality information to the eNodeB, the scheduler can perform channel-dependent scheduling in the time and frequency domain and thereby improve the cell and system capacity.

For the purposes of improving second-network communications, the UE can measure its second-network CSI and/or CQI, and then return those measurements to the first-network scheduler. The first-network scheduler then schedules resources to the UE that are advantageous for use in the second network. In one aspect, the UE comprises channel measurement apparatus, such as for measuring second-network CSI and/or CQI. The UE also comprises first-network RAN communication apparatus for communicating with the first network. The UE also comprises second-network RAN communication apparatus for communicating with the second network. The UE may further comprise Cooperative-MIMO processing hardware configured for cooperatively processing second-network RAN signals with other WTs in order to perform Cooperative-MIMO processing described throughout the disclosure. The aforementioned UE apparatus can also be configured to perform methods disclosed herein.

In one aspect, a second-network broadcast transmitted by each WT operating as an access point comprises a header 1421, which includes second-network addresses for WTs (such as WTs configured to function as clients in the second network) to be configured to return channel estimates to the access point(s). The positions of the addresses in the header fields 1421 can indicate an ordering of the uplink signaling from the client WTs. In some aspects, the header can include timing information from the first network corresponding to each resource. The header includes a schedule (e.g., an allocation map) 1422, which assigns the co-opted first-network resources to the WTs and can specify modulation and coding. The header can comprise channel-estimation pilots 1423 which are used by each client WT to estimate its downlink channel. The client-WTs use the downlink estimates and the sync 1401 and/or pilots 1402 to lock on to the subcarriers. Although not shown, the header can comprise a sync portion, such as a pseudo-noise sequence used to achieve frame alignment by the transmitters and for block boundary detection by the receivers. The broadcast can comprise a user-data payload transmission 1424.

The second-network's uplink can occur in either or both of the first network's uplink and downlink time slots. The uplink can comprise a header 1432, which can be used to send control information, including channel estimates, to the access points. One or more pilots 1433 may be transmitted, such as to allow the access points to measure the uplink channel. Also, a user data payload 1434 is transmitted. Although not shown, the header can comprise other sections, such as a sync, a schedule, etc. It should be appreciated that the pilots described herein (such as pilots 1433) can comprise resources (e.g., subcarriers, time slots, etc.) in the data payload 1434.

In one aspect, a Cooperative-MIMO configuration employs a central server coupled to a plurality of the access points. The central server is provided with timely estimates of the channel state information for all clients to which it is about to transmit or which are considered for the next round of transmissions. Thus, downlink transmissions can be scheduled to closely follow uplink acknowledgments and require the clients to provide the server with channel estimates during the uplink period or require the access points to measure the uplink channel, from which the downlink CSI can be determined. The central server can use the uplink estimates to select a set of clients for the following transmission slots according to scheduling algorithms.

The central server also uses the downlink CSI to calculate a Cooperative-MIMO precoding matrix. Then packets of OFDM-encoded symbols destined to the clients are precoded using the precoding matrix. The precoded signal at each access point is calibrated to compensate for non-reciprocal amplitude scaling and phase rotations introduced by the transmitter and receiver hardware in the WT. In one aspect, the access points both transmit and receive pilots (e.g., pilots 1412 and/or 1423) such that each access point can calibrate itself with other access points within its range. If the network is formed by isolated clusters, calibration can be organized in a hierarchical way such that all clusters calibrate in parallel, and then a second round of calibration is run between the clusters in order to calibrate the whole network. The precoded and calibrated data packets 1424 are then sent simultaneously on the same time-frequency slot by each WT comprising the Cooperative-MIMO network with sufficiently accurate timing and carrier frequency coherence.

In one aspect, the second-network downlink packet could start with a sync signal (not shown), such as to enhance frame alignment and/or block boundary detection. Header 1421, schedule 1422, and pilots 1423 can be transmitted as before. In the aspects disclosed herein in which second-network WTs are described as functioning as access points, it should be appreciated that similar method and apparatus aspects can be employed wherein the WTs function together as a cooperative group of client devices, a cooperative group of relays, or a hybrid group comprising WTs functioning as access points, relays, and/or clients.

FIG. 15A is a flow chart that depicts a method used in channel-reciprocity based Cooperative-MIMO in accordance with some aspects of the disclosure. The method includes uplink channel training, downlink distributed MIMO transmission, and synchronization and calibration employed to produce coherent downlink MIMO transmission.

Uplink pilots are transmitted 1501 by UEs. In one aspect, the pilots are transmitted as part of a normal first-network uplink channel training process. In another aspect, the pilots are part of a second-network uplink channel training process. However, second-network WTs (such as WTs operating as access points) listen for the uplink pilots. After receiving the uplink pilots, each WT individually processes its observations through an OFDM front-end coupled with a synchronization block. Each WT forms estimates of the uplink channels 1502 between each WT and the UEs. The channel estimates are then sent to a central processor 1503 via a fronthaul network where they are jointly used to calculate a downlink MIMO precoding matrix 1504.

Packets of OFDM-encoded symbols destined to the UEs are precoded 1505 using the downlink precoding matrix. Then, the precoded signal at each WT is calibrated 1506 to compensate for the non-reciprocal amplitude scaling and phase rotations introduced by its transmitter and receiver hardware. Finally, all the WTs functioning as access points in the second network and forming the distributed-MIMO network simultaneously send (in the same time-frequency slot) the precoded and calibrated data packets 1507.

Synchronization at the UE side (both transmitter and receiver) and at the AP receiver accomplishes frame and carrier frequency synchronization in order to transmit and receive on the assigned time slots and demodulate the OFDM signals with negligible inter-carrier interference (ICI). While this can be implemented using techniques known in the art, synchronization at the access-point transmitters needs to compensate for timing misalignment and the relative phase rotation of the downlink data blocks transmitted simultaneously by the jointly precoded access points. Aspects of the invention provide for compensating the channel amplitude and phase rotations incurred by uplink channel estimation at the access-point side (such as via TDD calibration), and enabling the jointly transmitting access points to send their precoded data slots with sufficiently accurate timing and carrier frequency coherence.

FIG. 15B illustrates a method of producing a phase-synchronous signal at each of a set of second-network WTs in a manner that functions parasitically off a first network. Each second-network WT listens for a packet sent by the first network 1511 and uses an initial PN sequence (or some other transmitted sync signal in the first network) to determine the block boundary timing of the packet 1512. Using a DFT, each second-network WT decodes the successive frames of the incoming packet 1513 and employs a CORDIC (or equivalent) algorithm 1514 on the complex-valued received soft symbols in order to obtain their phases. The phases of the out-of-band pilot signals are tracked throughout the entire packet transmission in order to estimate the phase drift from the first network 1515. The measurements from the different pilots are averaged and passed through a Kalman filter 1516 which maintains an accurate estimate and predicts, based on the current estimate, the phase drift after the passage of a few additional frames. In addition, the header sent by the first network contains a number of channel estimation symbols, which can be used to obtain an initial phase offset estimate for each subcarrier 1517. Since the phase drift is almost identical for all carriers, these two measurements suffice in order to predict the phase rotation induced by the first-network transmitter on any subcarrier tone for the entire period of a packet.

The phase estimates are used in synthesizing a synchronized signal. The second-network WTs use an inverse discrete Fourier transform, whose output frames can be timed such that they align with the frames of the first-network signal or have some other predetermined fixed alignment. For each subcarrier, the second-network transmitters rotate 1518 the soft symbol to be sent by an angle corresponding to the subcarrier's estimated phase offset. The result is a tone that, while not having the same phase as the corresponding tone from the first-network transmitter, follows that tone at a fixed and known phase difference. Since the subcarrier tones of all the second-network transmitters are now synchronized, the transmitters act together as a commonly hosted set of MIMO radio-frequency front-ends.

By transmitting phase-synchronous signals from multiple WTs, the cooperative system constitutes the equivalent of a distributed MIMO transmitter, capable of employing multi-user MIMO precoding strategies in order to transmit to multiple WTs at the same time.

While in one aspect, joint encoding can be duplicated at each source WT (and/or relay WT), given the binary information destined to each destination WT (which can include relay WTs), another aspect performs the encoding only once, such as at a central server (or a WT functioning as a central processor, which can include a WT coordinating a distributed computing pre-coding operation) and sends the resulting waveforms to each WT for transmission.

Figure 16:
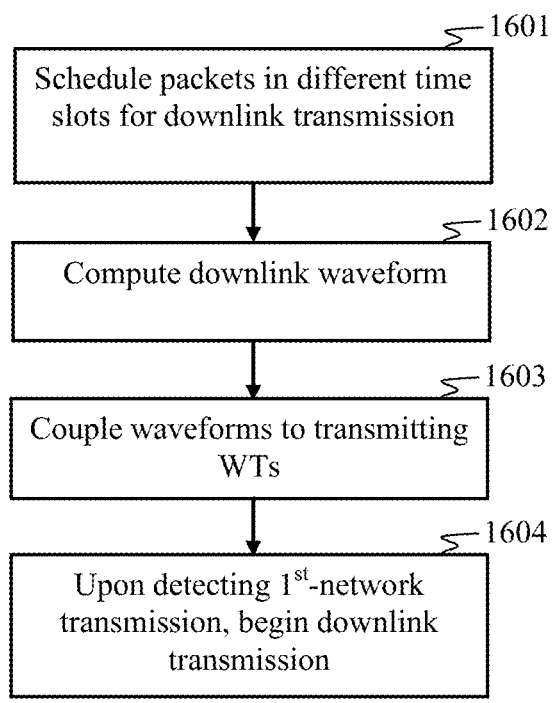
FIG. 16 is a flow diagram that illustrates a method of performing Cooperative-MIMO by a second network according to some aspects of the disclosure.

FIG. 16 is a flow diagram that illustrates a method of performing Cooperative-MIMO by a second network according to some aspects of the disclosure. The second network (such as a central processor coordinating operations in the second network) divides the downlink time into slots, and in each slot schedules for transmission a number of packets destined to various users 1601. For each transmitting WT (e.g., access point, relay, client, or combination thereof) in the second network, the central processor computes the waveform of the signal to be transmitted in the next downlink slot 1602, or otherwise coordinates the waveform computations.

In some aspects, the central processor does not perform phase correction at this point. For example, the only information used in the precoding is the data to be transmitted and the CSI between each transmitting WT antenna and each receiving WT antenna. The central processor can function as if all the transmitting WTs are phase synchronous. The central processor then couples the corresponding waveforms to the transmitting WTs 1603. Upon detecting a predetermined first-network transmission (e.g., a synchronization signal or some other predetermined signal), the transmitting WTs begin transmitting after a predetermined time interval 1604.

In one aspect, the second- and first-network transmissions are in the same frequency band. In another aspect, the second network transmits in a different frequency band. The design of this phase alignment method ensures its scalability. There is no added overhead for synchronizing a larger number of second-network transmitters.

In the case when CSIT cannot be reliably acquired, when tight phase synchronization cannot be achieved, or when channel reciprocity does not hold due to hardware limitations, blind approaches for precoding can be employed. One technique for differentiating users is by inducing unique signatures in their channel temporal variations. This can be achieved using various techniques, such as by allocating to each user an antenna switching sequence, according to which they demodulate the signal from one of their antennas. If only one antenna in every given slot is used, then only a single RF front-end and demodulation chain are needed.

Most precoding schemes designed for MU-MIMO transmission assume that multiple transmit antennas are hosted on the same access point and share the baseband circuitry and the clocking circuitry which produces the passband signals. In fact, for schemes exploiting full CSI, it is essential that the signal amplitudes and the relative phase and timing offsets of the signals received from different antennas remain unchanged between channel estimation and the actual transmission. In some aspects, since the second-network WTs are geographically separated from each other and can have autonomous clocks and RF oscillators, there is no obvious way to transmit from them in a time and phase synchronous manner, which is a requirement for MU-MIMO.

Figure 17:
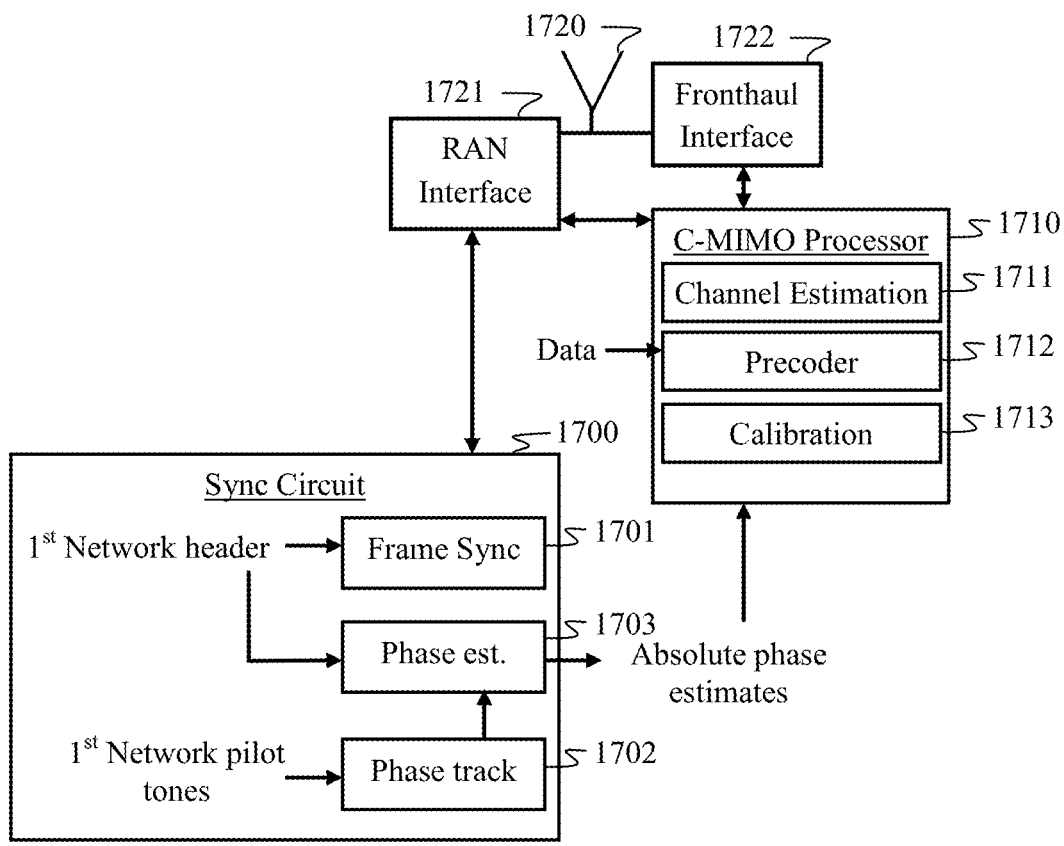
FIG. 17 is a block diagram that depicts a transceiver configured in accordance with certain aspects of the disclosure. The blocks can indicate apparatus components, functional blocks, and/or operations performed by a processor.

FIG. 17 depicts a second-network transceiver in accordance with certain aspects of the disclosure. An antenna system 1720 comprising one or more antennas is coupled to a RAN interface 1721 and a fronthaul interface 1722. Information can flow to and/or from the interfaces 1721 and 1722 and a Cooperative-MIMO processor 1710. Information can flow to and/or from the RAN interface 1721 and a synchronization circuit 1700. In some aspects, messages to and/or from the synchronization circuit 1700 can be routed through the fronthaul interface 1722.

In a channel-reciprocity aspect, uplink pilots transmitted by other WTs (such as WTs in the second network, which may include WTs in the first network) are received and processed through an OFDM front-end (not shown) in the RAN interface 1721, which can provide for synchronization. Estimates of the uplink channel are then formed, such as by a channel estimation block 1711, which may be part of the Cooperative-MIMO processor 1710.

In a feedback aspect, downlink pilots received by the other WTs are processed by those WTs to produce downlink channel estimates, which are then fed back to the second-network WT shown in FIG. 17. The channel estimates may be stored in the channel estimation block 1711.

The channel estimates are then sent to a central processor (not shown) via a fronthaul network coupled to the fronthaul interface 1722. Channel estimates collected from at least one other second-network WT (such as the WT shown in FIG. 17) are jointly processed by the central processor (not shown) to calculate the Cooperative-MIMO precoding matrix. In some aspects, the WT shown in FIG. 17 may be a central processor. Thus, a precoder 1712 in the processor 1710 may calculate the precoding matrix from channel estimates collected from other WTs.

Packets of OFDM-encoded symbols to be sent in the downlink (e.g., labeled as "data") are precoded using the downlink precoding matrix in the precoder 1712. In the reciprocity aspect, wherein downlink CSI is determined from uplink pilots by operating the system in TDD and exploiting the reciprocity of the radio channels, the WT's RAN transmitter and receiver hardware are generally not reciprocal. In such aspects, the precoded signal can be calibrated by a calibration block 1713, which can compensate for non-reciprocal amplitude scaling and phase rotations introduced by the RAN transmitter and receiver hardware. Finally, all the second-network WTs in a group of Cooperative-MIMO transmitters (including the WT shown in FIG. 17) transmit their precoded and calibrated downlink signals. The synchronization circuit 1700 in each WT compensates for timing misalignment and relative phase rotation of the downlink signals transmitted simultaneously by the group.

In a distributed-MIMO system wherein transmitting WTs do not share a common clock, small residual frequency errors due to non-ideal synchronization can cause slow relative drift among the different WT phasors. As these uncompensated phase rotations accumulate over time, and since they affect the extent of end-to-end reciprocity in the channel, some aspects of the invention provide for performing calibration at or near the same rate as synchronization. For example, the second network can use a frame structure comprising synchronization, calibration, and downlink data slots, wherein synchronization and calibration take place back to back.

In one aspect of invention, the synchronization circuit 1700 exploits signaling employed in a first network to achieve phase synchronization among other second-network transmitters. In order to avoid leakage between OFDM subcarriers during decoding, frame alignment requires arranging frame starting points at the receivers within an interval shorter than a CP length. In one aspect, frame synchronization is achieved in a frame sync circuit 1701 via block boundary detection from the first-network transmissions, such as PN sequences in the packet header used to provide a time reference.

A phase-drift tracking circuit 1702 can provide for phase-drift tracking and compensation in the second network based on pilot tones broadcast by the first network. In one aspect, the circuit 1702 is configured to track these phase shifts in real-time and compensate them separately for every frame. To prevent self-interference at the second-network transceivers, spatial nulling, preventing the second-network transmitters from using the pilot subcarriers, and/or other techniques can be employed.

In addition to tracking the common drift, an initial-phase estimate module 1703 in the synchronization circuit can measure the initial phase of each tone transmitted by the first-network access point in order to obtain absolute estimates. For example, the module 1703 can measure the first-network's transmitted initial synchronization header, which can contain a set of known channel estimation symbols. The initial phase estimate, combined with the phase drift measured using the pilot signals, suffices to predict the absolute phase of any particular tone. In some aspects of the invention, the first network comprises an LTE network, and the circuit is configured to process standard LTE control signals, including primary and secondary synchronization signals, reference signals, and/or other control signals.

Once a second network has acquired RAN resources, it can be useful to employ any of various strategies for allocating resources between uplink and downlink channels. For example, time division duplex and/or frequency division duplex can be used. Other aspects of the invention may employ code division duplexing, cancellation division duplexing (e.g., full-duplex operations via self-interference cancellation, such as may be employed with multiple antennas and signal processing operations configured to provide space division duplexing), polarization division duplexing, and/or other types of duplexing. One advantage of using TDD is the ability to exploit channel reciprocity. For example, the access point can measure uplink channel by using pilots transmitted from the UEs to infer the downlink channel. In FDD, the uplink and downlink channels are usually different. Thus, there is no reciprocity, and the transmitter has to rely on other techniques, such as channel estimation via interpolation and/or extrapolation, or employing feedback from the UEs, which requires extra overhead.

The system model consists of M antennas forming a distributed MIMO system as described in the previous sections and U single-antenna users waiting to be serviced. However, when U>M we can only serve K≤M out of the U users, otherwise the nulling of multiuser interference is not possible. User selection is a combinatorial problem, consisting of selecting, for each subcarrier n, a subset S(n) of users (where |S(n)|=M) by maximizing a target utility function under the transmit power constraint. Therefore, there exists a significant coupling between the decisions made at the MAC layer for the scheduling of the users and the precoding at the PHY layer.

Conceptually, this optimization problem can be solved by exhaustively searching over all feasible subsets of users S. In practice, greedy algorithms that add one stream at a time, where a stream is defined by a pair (k, n) of user and subcarrier index, have proven to provide excellent results at moderate complexity. In accordance with some aspects of the disclosure that recognize that certain applications might be sensitive to latency (e.g., TCP is subject to timeouts when users go unserved for long periods), scheduling can be adapted to ensure that users are served regularly to prevent timeouts. To accomplish this, various techniques, such as round robin scheduling, can be integrated into the scheduling scheme to ensure that all users are served at least once during a predetermined time interval.

Figure 18:
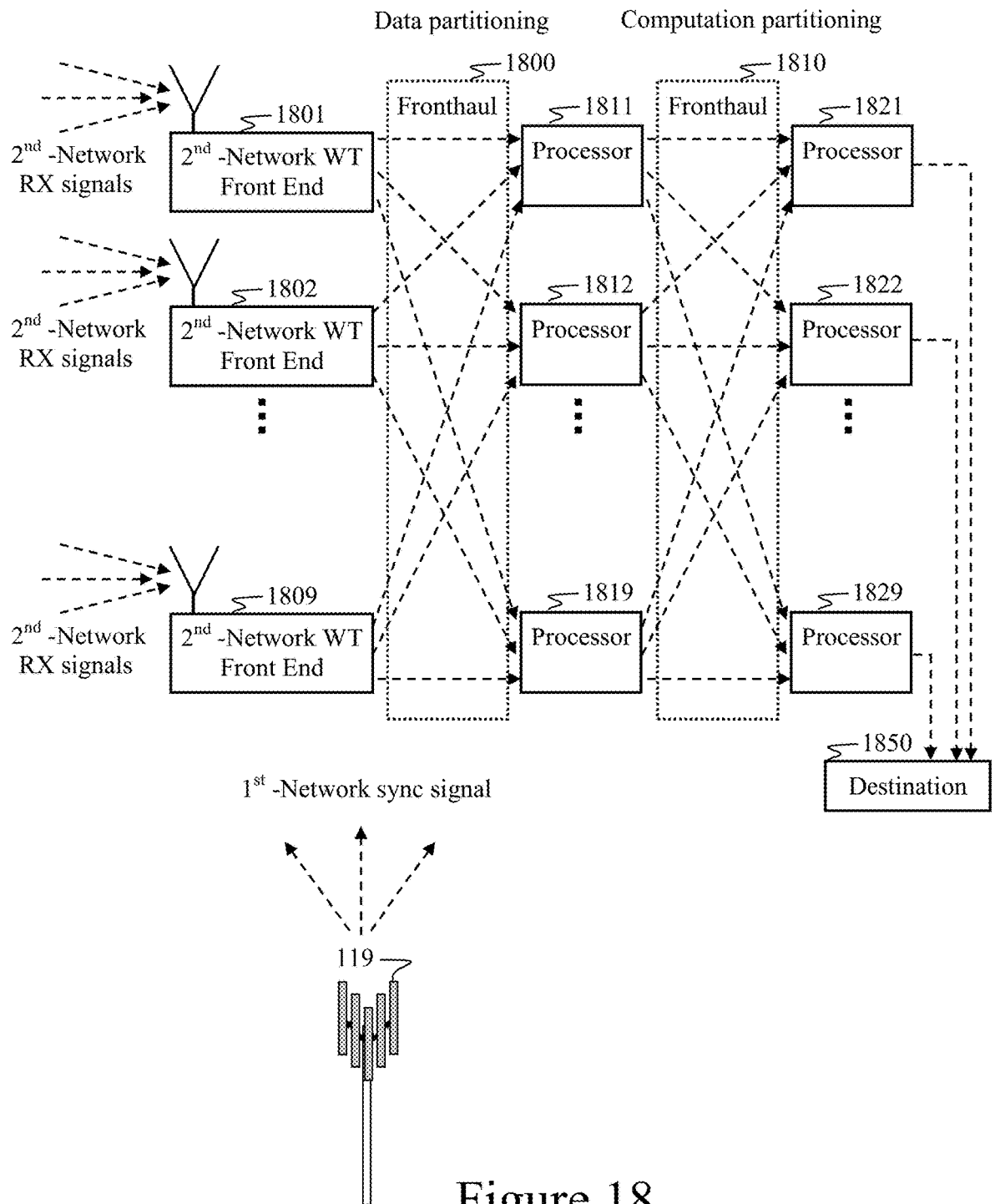
FIG. 18 is a block diagram that depicts a pipelined distributed processing system in accordance with some aspects of the disclosure.

FIG. 18 is a block diagram that depicts systems and methods configured in accordance with aspects of the disclosure. While a receiver implementation is shown, it should be appreciated that analogous and corresponding transmitter implementations can be provided that employ the same aspects and/or features, even if not explicitly shown.

In some instances, a distributed computing system is used to solve a problem. The term "problem" as used herein refers generally to a given type of computation, task, routine, or other processing that can be performed by a computer and that takes input data and processes such data. A distributed system can consist of autonomous computing nodes that communicate through a network. The computing nodes interact with each other in order to achieve a common goal. In distributed computing, a problem can be divided into many tasks, each of which is solved by one or more computers which communicate with each other by message passing. The term "solution" refers to the results, whether numerical or otherwise, of such computations, tasks, routines, or other processing.

By way of example, multiple second-network WTs 1801-1809 are configured to receive transmitted signals in a second network. The WTs 1801-1809 can be configured to synchronize to signals transmitted by one or more first-network transmitters (such as transmitter 119). In some aspects of the disclosure, the second-network is configured to operate parasitically with respect to the first network, such as wherein the second network and the first network operate in a non-cooperative manner. In one aspect, the first network is not aware that its RAN resources are co-opted for use by the second network, and the second network avoids interfering with first-network communications in any manner that would alert the first network that its RAN resources are being used for unauthorized purposes. In some aspects, it is advantageous for the second network to exploit network management operations of the first network, such as MAC-Layer control (and possibly other control aspects), in order to reduce overhead. As disclosed herein, employing first-network synchronization signals to sync second-network signal processing can be especially advantageous. Thus, the first-network synchronization signals can be employed by the second network to manage its distributed-computing operations.

After front-end processing by WTs 1801-1809, the digital baseband signals are routed through a fronthaul network 1800 to a set of computer processors 1811-1819. By way of example, the processors 1811-1819 can comprise the WTs 1801-1809, other WTs (not shown), and/or other computing devices communicatively coupled to the fronthaul network 1800. The processors disclosed herein can comprise general-purpose processors programmed to perform the specific processes described in accordance with aspects of the invention.

In some aspects, the fronthaul network 1800 comprises short-range wireless links between computing devices in a wireless local area network (WLAN), such as a WiFi, WPAN, infrared, optical, UWB, wireless-USB, or some other broadband wireless network. In one advantageous design aspect, the short-range broadband nature of such a WLAN can support very high bandwidth requirements for message passing between cooperating nodes, not only enabling massive frequency reuse of the RAN resources via Cooperative-MIMO subspace processing, but also enabling distributed computing.

By way of example, a distributed computing problem can be partitioned by a combination of processes, including (but not limited to) data partitioning and computation partitioning. For example, data partitioning can comprise separating a computational problem by RAN resource components, such as subcarriers in an OFDM signal. Thus, in one aspect, digital signals corresponding to a first subcarrier frequency at each WT 1801-1809 is processed in a first processor 1811, digital signals corresponding to a second subcarrier frequency at each WT 1801-1809 is processed in a second processor 1812, etc.

In another aspect, computational partitioning can be performed. For example, a spatial-multiplexing problem might be separated into component problems, each of which can be processed independently. This is illustrated by message passing in fronthaul network 1810 between processors 1811-1819 and processors 1821-1829. It should be appreciated that processors 1821-1829 can comprise processors 1811-1819, other processors not shown, the WTs 1801-1809, other WTs not shown, or any combination thereof. It should also be appreciated that the processors 1811-1819 and 1821-1829 can comprise any of various nearby processors, wherein "nearby" constitutes a maximum latency which can include network latency, processing latency, and/or any combination thereof. The results of processing in nodes 1821-1829 are then passed to at least one destination 1850 node, which may perform additional processing.

When certain methods (e.g., a Poisson solver) are used in distributed computing, data exchange between nodes (e.g., message passing) can cause delay. More specifically, as the number of processes on different nodes increases, idle processor time that occurs during processing and/or during data exchange between nodes can also increase. Thus, some aspects of the invention can exploit this idle time to perform processing for other operations. Various types of pipelined structures can be employed. For example, when a processor becomes idle, it may examine the next pipeline buffer block to determine if there is another goal to be executed. In some aspects, a combination of data partitioning and computational partitioning can be performed to exploit the idle time to process a related problem. For example, the overlap length of different processes can be determined, and then partitioning (data and/or computational) can be adapted to give each idle processor another goal that can be executed in parallel.

In one aspect, when first spatial processing is completed for a first subcarrier, and a first processor waits for a second processor to receive its results, the first processor can begin processing a second subcarrier. In another aspect, when first spatial processing is completed for a given subcarrier set, idle time can be used to begin second spatial processing of the subcarrier set. When the second processor becomes available, intermediate results of the second spatial processing might be passed to the second processor, which then completes the second spatial processing. In other aspects, a processor is configured to perform processing for multiple instantiations of an SDR. Thus, idle time associated with processing a first SDR instantiation can be used to process a second SDR instantiation. By way of example, an SDR instantiation can be provisioned as a virtual base station (which comprises allocated hardware and processing resources) configured to serve a particular user device or set of user devices. In other aspects, alternative types of SDR instantiations can be employed. The processing associated with an SDR instantiation can comprise a variety of processing objectives, including (but not limited to) spatial multiplexing (which as used herein, can comprise spatial multiplexing and/or demultiplexing, channel estimation, and/or related processing objectives), network control signaling, and implementation of up to the full SDR protocol stack. Processing associated with a SDR instantiation can comprise different spatial multiplexing modes, such as ZF, MRC, MMSE, etc. In each of the parallel processing aspects disclosed herein, the clocking of the pipeline can be synchronized to the first-network's transmitted synchronization references.

By way of example, zero-forcing involves calculating a channel-matrix inverse. In a distributed-computing implementation, each WT receives a sub-matrix (e.g., vector) of a matrix system to be solved. For example, the sub-matrix may comprise channel measurements and received unknown signals. WTs in a group can exchange their submatrices and perform Gauss-Jordan row operations toward solving the matrix system even though none of the WTs has a sufficient number of sub-matrices to solve the system by itself. After each processing stage, the WTs exchange their results, which constitute intermediate steps toward the solution. Exchanges occur between a sufficient number of the WTs to ensure a solution. For example, groups of WTs may comprise a hierarchical structure, such as wherein each of a plurality of subgroups has insufficient rank exchanges its results with at least one other subgroup in order to provide sufficient rank. In some aspects, redundancy is provided to ensure against channel correlations, WT failures, local communication link failures, and the like by providing a number of cooperating WTs that exceeds the rank of the total channel matrix. In some aspects of the invention, the idle time in each processor is exploited to provide this redundancy.

Figure 19:
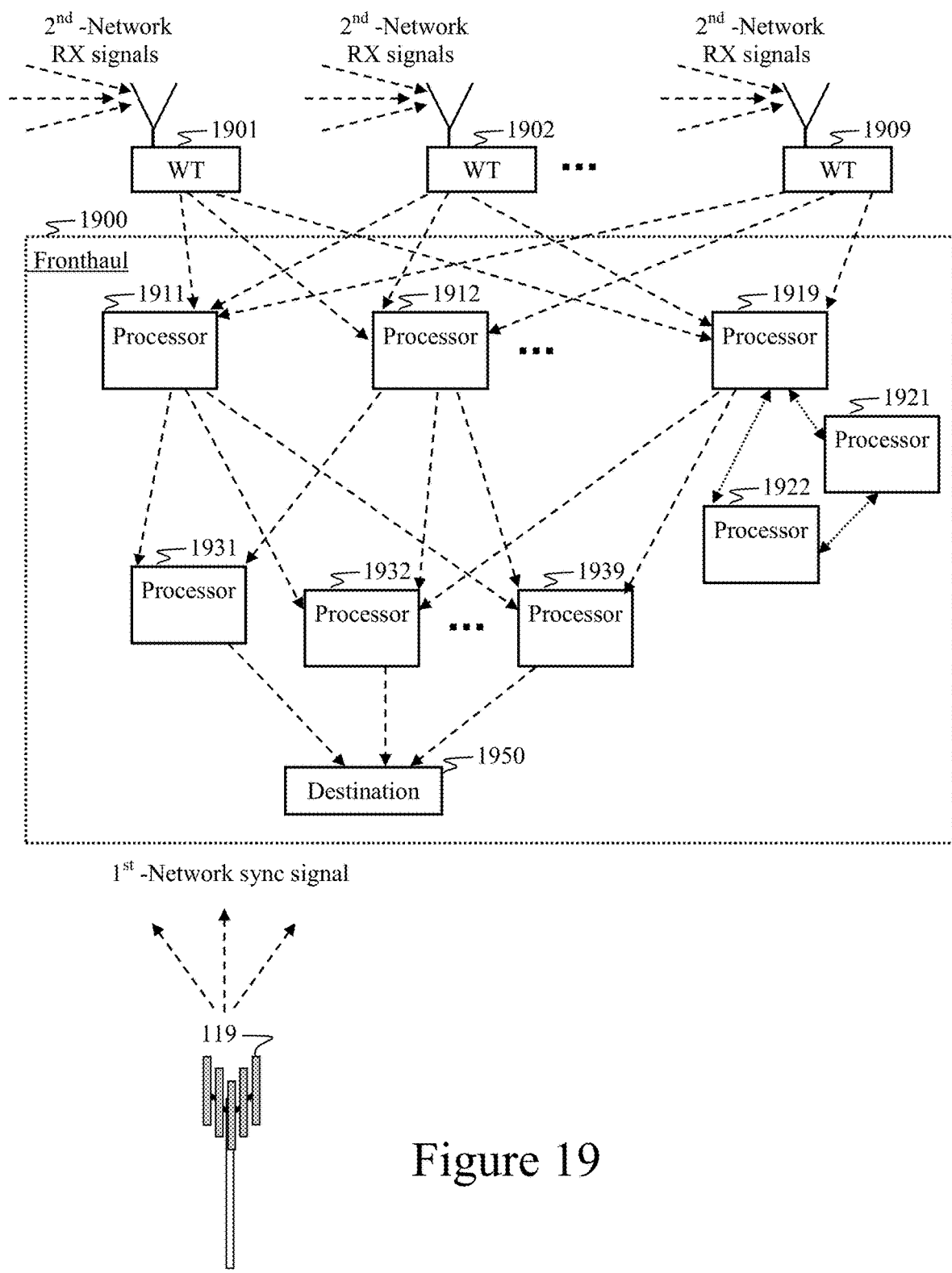
FIG. 19 is a block diagram that depicts distributed-computing systems and methods in accordance with aspects of the disclosure.

As depicted in the block diagram of FIG. 19, in some aspects of the disclosure, distributed computing is provided along network/communication paths. Unlike traditional distributed computing in which one accesses computing assets remotely, varies aspects of the "problem" can be distributed across processing nodes along the data path.

A plurality of WTs 1901-1909 are configured to receive signals transmitted by the second network. A first tier of processors 1911-1919 communicatively coupled together by fronthaul network 1900 are configured to perform first distributed processing of the digitized baseband signals. In some aspects, processing can be further partitioned. For example, processor 1919 can partition its processing to additional processing nodes 1921 and 1922, which are connected via the fronthaul 1900 and/or via some other network. The results of processing by the first tier 1911-1919 are coupled to a second tier of processors 1931-1939 (such as via the fronthaul 1900) along a path to a destination node 1950. In another aspect, the flow between the nodes depicted in FIG. 19 can be reversed, such as to provide transmission of precoded data. In this case, the node 1950 can be a source node or a central processor.

For example, in the coordinated-multipoint model, aspects of the disclosure provide for performing some or all of the necessary computing processes from the network edge (e.g., remote radio heads where data is collected with possibly local processing), through intermediate devices (e.g., eNodeBs, gateways, etc.) where some computing can be available, through a central processor (which may employ a cloud data center), and possibly on to a destination node (which may have some local computing capability). In another Cooperative-MIMO aspect, relays couple received RAN signals to a destination node, which can be a WT. For example, RAN transceivers may be coupled to the destination node via intermediate nodes. The RAN transceivers might provide local processing. In some aspects, the RAN transceivers distribute the problem (such as via local area network(s)) to nearby transceivers for distributed processing, and then the results of the processing are forwarded to the destination node, to a relay, and/or back to the RAN transceiver(s) for additional processing. In some aspects, the RAN transceivers distribute the problem to one or more relays, which may process the problem and/or distribute the problem to other processors (e.g., network nodes) before the problem is delivered to the destination node. The destination node may perform some combination of local processing of the problem and distributed processing whereby it enlists the resources of nearby nodes or other processing resources connected via a low-latency network.

As the number of antennas increases, the computation requirement of MU-MIMO grows multiplicatively, and can far exceed the capability of a single computing device. Thus, in accordance with certain aspects of the disclosure, a scalable MU-MIMO system is provided that exploits parallelism in signal processing and employs an architecture to distribute computations among a number of simple processing units.

Aspects of Cooperative-MIMO can parallelize MU-MIMO processing across a large number of general-purpose computing devices programmed to perform specialized processing in accordance with aspects of the invention. A Cooperative-MIMO system can incrementally scale to support more MIMO antennas by adding more processing units. When the fronthaul is implemented with broadband wireless and/or optical links, the interconnecting bandwidth can be sufficient to support distributed computing for MU-MIMO operations. To reduce the overall processing latency, aspects of the disclosure parallelize the MU-MIMO processing with a distributed pipeline based on computational and communication patterns. By way of example, routing tables for distributed computing can be configured according to round-trip latency, queue backlog at each processor, link reliability (e.g., CQI, BER, SNR, etc.), as well as other measured parameters. At each stage of the pipeline, data partitioning and/or computation partitioning can be used to exploit parallelism across multiple units, as well as inside a processing unit.

Figure 20A:
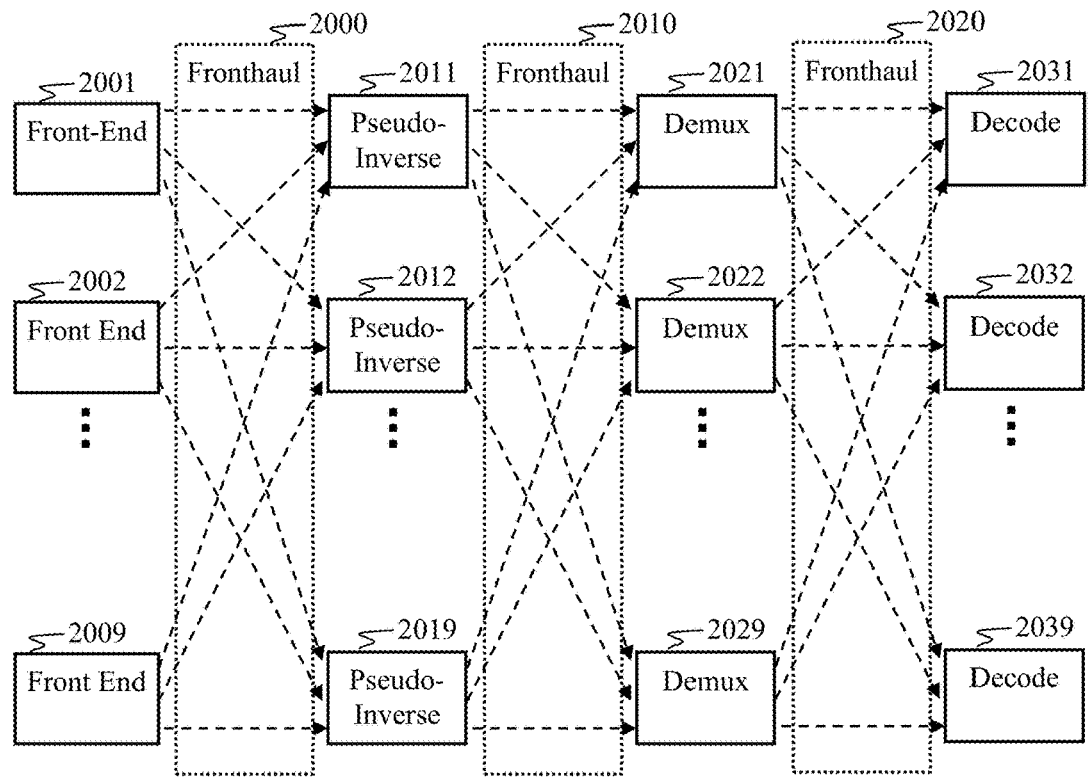
FIGS. 20A and 20B are block diagrams that depict distributed pipeline architectures in accordance with various method and apparatus aspects of the disclosure.

FIG. 20A is a block diagram of a distributed pipeline architecture in accordance with one aspect of the disclosure. A first stage comprises front-end processing modules 2001-2009 configured to receive RAN signals and provide frequency down-conversion and digitizing to produce digital baseband signals. The modules 2001-2009 perform time synchronization to find the starting point of a frame, identify each OFDM symbol, and remove the cyclic-prefix. An FFT translates the time-domain symbols into frequency-domain. This may be performed in a first time interval measured by a number of clock cycles. Measurements of known reference signals (e.g., pilots) in the digital baseband signals are communicatively coupled to a second stage of processors 2011-2019 during a second time interval. The processors 2011-2019 calculate a pseudo-inverse of the channel matrix H during a third time interval. For example, in the case of ZF processing, the pseudo-inverse $H^+ = (H^*H)^{-1}H^*$. The pseudo-inverses can be communicatively coupled to a third stage of processors 2021-2029 during a fourth time interval. During a fifth time interval, the third stage 2021-2029 reads data signals from the front-end processing modules 2001-2009 and multiplies each received signal vector with the pseudo-inverse to produce estimates of the transmitted symbols. The symbol estimates may be communicatively coupled to a fourth stage of processors 2031-2039 during a sixth time interval. The processors 2031-2039 are configured to map the symbols to soft bits and decode the original information bits (and optionally perform other operations, such as CI decoding) during a seventh time interval.

Figure 20B:
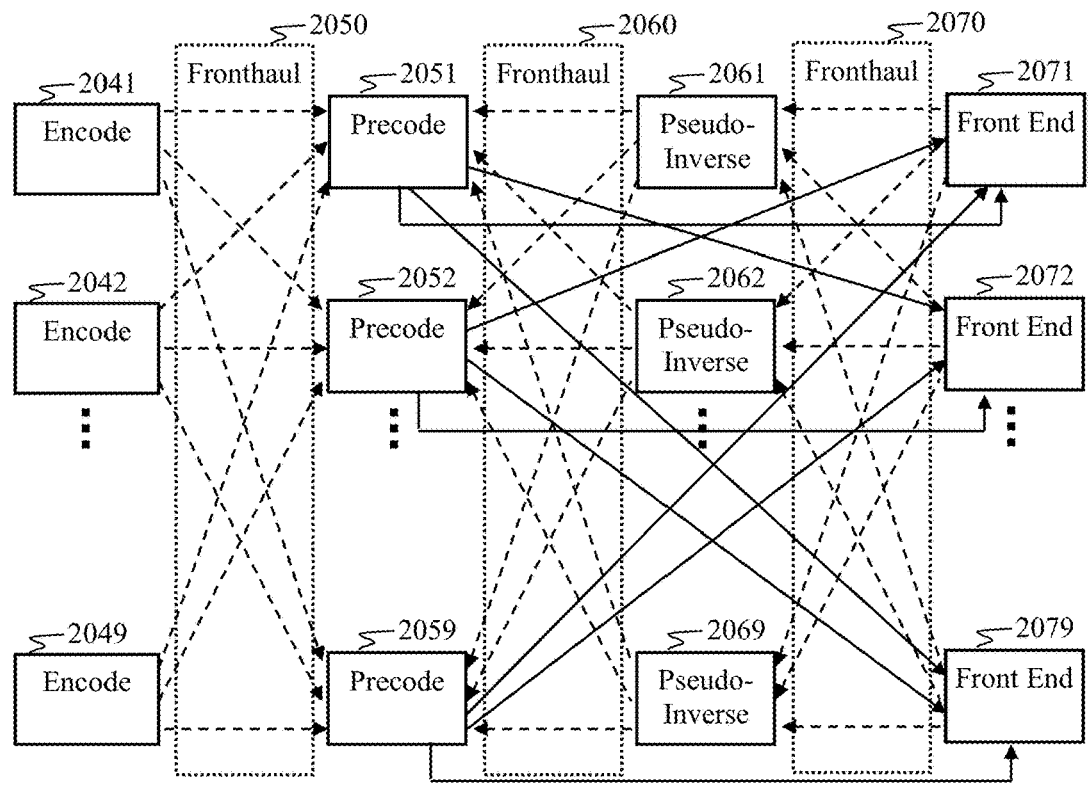

In a reverse direction, such as depicted in FIG. 20B, processors 2041-2049 encode information bits, such as with a forward error correction (FEC) code, followed by CI coding (e.g., SC-OFDM). A pseudo-inverse of the channel matrix H is calculated at processors 2061-2069 from reference signals received by front-end processors 2071-2079. Data symbols from the encoders 2041-2049 and pseudo-inverses calculated by the processors 2061-2069 are communicatively coupled to precoders 2051-2059, which performs precoding by multiplying the symbols with the pseudo inverse. The precoded symbols are coupled to the front-ends 2071-2079, which perform an IFFT and add a cyclic prefix to generate the time-domain OFDM symbols. The front-ends 2071-2079 control the radio interfaces to transmit the waveforms simultaneously on all antennas.

In one aspect, encoding can be performed concurrently with at least one of front-end processing and pseudo-inverse calculation. Coupling of the pseudo-inverse and the encoded data to the precoders 2051-2059 can be performed in the same time interval.

With respect to FIGS. 20A and 20B, in some instances, the processing in a stage requires the results of a previous stage. In some cases, a stage is idle while waiting for processing to be completed by a previous stage. In some cases, a stage is idle while waiting for processing to be completed by a following stage. One strategy to reduce or eliminate these idle times is to parallelize the MU-MIMO processing in a manner that minimizes the idle times. For example, at least some of the problems can be divided into sections that take approximately equal amounts of time to process so processors in one stage are not waiting for processors in another stage to finish their task. Problems can also be divided according to the processing capability of the processor(s) to which they are assigned. Thus, an impaired processor (e.g., a slower processor, a processor in a link with high round-trip latency, a processor with a nearly full buffer, etc.) can be assigned an easier task in accordance with its abilities. Such implementations can be advantageous in heterogeneous stages comprising different processing devices and/or links of varying quality. Thus, in one aspect, methods and apparatuses are configured to parallelize MU-MIMO processing (and, optionally, other RAN processing) into multiple small pieces, each of which is sized according to the capability of its assigned computing device.

Each stage (and each module in each stage) may further comprise multiple modules for parallel processing. The actual number of modules can be configurable, depending on the computational load (which can be a function of the MU-MIMO configuration and the signal processing algorithms), the processing capability of each module, the fronthaul link quality, and/or the need for redundancy in the processing. The number of modules can be selected according to the aforementioned parameters specifically for the purpose of reducing latency in the processing and/or optimizing the utilization of processing resources (e.g., reducing idle periods). Therefore, the architecture is highly scalable and agnostic to implementation choices. Each stage can scale horizontally as the number of antennas or clients change, and/or as the MU-MIMO algorithms are adapted.

In one aspect, data partitioning can leverage parallelism among multiple servers. Data partitioning divides the digital samples into multiple independent data sets. Each data set can then be sent to a distinct unit to be processed individually. The results from all sets are then synchronized at the next pipeline stage. In some aspects, data partitioning in a stage is balanced across processors relative to each processor's capability (including associated latency) to reduce idle time before the next stage. In some aspects, data partitioning in a stage is balanced to match processing time in another stage, such as to reduce idle time due to processing-time differences across different stages.

In a MU-MIMO system, there are many opportunities to exploit parallelism through data partitioning. For example, the pseudo-inverse and spatial multiplexing can be performed separately for each subcarrier. At the decoding stage, symbols belonging to each spatial stream can be grouped together and processed by a separate decoder.

Data partitioning itself can provide enough parallelism as long as the individual data set can be processed in one processing unit in real time. However, if the computation for one data unit is too large, computational partitioning can be performed for further parallelization.

Aspects of the invention can employ techniques to parallelize matrix multiplication. One approach is to divide the matrices into small blocks and assign the multiplication of each block to a different processor. For example, to compute $H^*H$, we can define $H = (H_1 H_2)^T$. The result matrix is $$R = H^*H = (H_1^* H_2^*)\begin{pmatrix} H_1 \\ H_2 \end{pmatrix} = (H_1^*H_1 + H_2^*H_2),$$

and each $H_i*H_i$ operation can be assigned to a different processor.

Aspects of the invention can employ techniques to parallelize matrix inversion. The direct way to invert a square matrix is to use the Gauss-Jordan method, which has complexity $O(N^3)$, where N is the dimension of the matrix. This computation is partitioned by assigning different sets of rows to different processors and each processor can perform Gaussian elimination on these rows independently. With N processors, the computational complexity can be reduced to $O(N^2)$.

The parallel matrix inversion algorithm described above can be used across servers, wherein subsets of rows are sent to different servers and each server performs Gaussian elimination in parallel. However, in Gaussian elimination, pivoting requires two rows to be exchanged so that the diagonal entry used in elimination is nonzero and preferably has a large magnitude. Pivoting across servers can significantly increase overhead in the fronthaul network. However, since the channel matrix in MU-MIMO is Hermitian, pivoting is not necessarily needed [D. P. Bertsekas and J. N. Tsitsiklis, "Parallel and Distributed Computation: Numerical Methods." Athena Scientific, 2003]. The servers only need to broadcast the row that is used for elimination for each iteration. Since each row is sent (at most) once for one elimination iteration, the communication overhead is bounded by the size of the matrix.

Another concern for parallelizing matrix inversion across servers arises from the need to synchronize among all servers at each elimination iteration. Delays could cause blocking in some servers and hold up the completion of channel inversion. This can be mitigated by employing redundant servers. In another aspect, the delays can be mitigated by using a multi-threaded algorithm. Thus, a server can process a matrix for the next frame if it is blocked on the current frame. Thus, the aggregate throughput might not be significantly affected.

A distributed-computing coordinator, which can comprise a centralized processor and/or a distributed network-management operator, receives an updated listing of available computer-processing resources that are suitable for processing signals from a set of WTs. In some aspects, the list can be ordered by suitability. Suitability can be defined as a function of latency, which can be a function of the network path that data flows between a source node(s) and a destination node(s).

Figure 21:
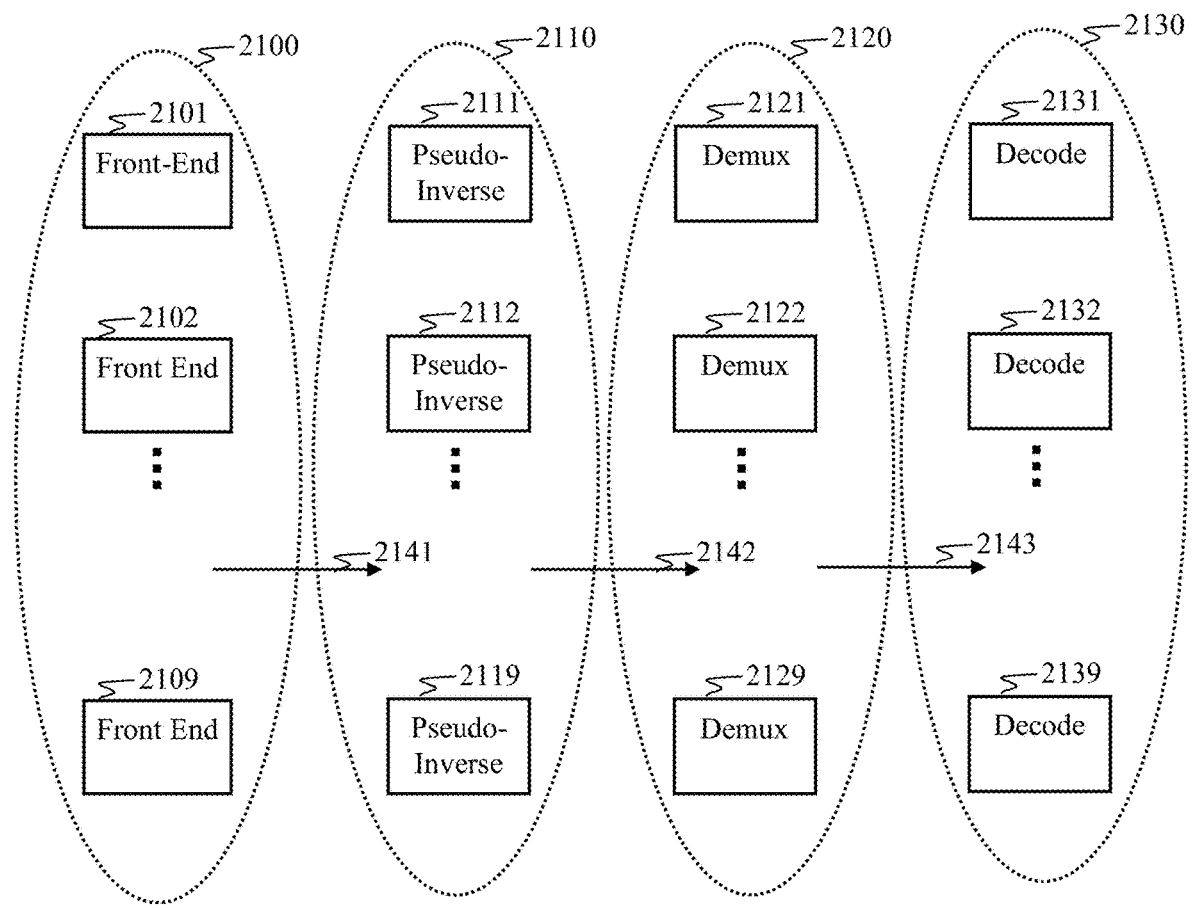
FIGS. 21 and 22 depict distributed computing method and apparatus aspects of the disclosure.

As shown in FIG. 21, a network path can comprise a data flow 2141-2143 between at least one RAN receiver and at least one destination node. In one aspect, receiver front-end processing 2100 can be performed by a set of processors 2101-2109 that are "near" the at least one RAN receiver, wherein nearness can be a measure of delay relative to the at least one RAN receiver and/or at least one processor in another set of processors (e.g., processors 2111-2119) along the data flow 2141-2143. Thus, the measure of suitability for a processor in set 2100 can be an estimated or measured total delay comprising network delay between receiving a problem from the at least one RAN receiver, delay for processing the problem, and network delay for transmitting the solution from the processor to at least one processor in a next set (e.g., set 2110 or 2120) in the data path 2141-2143.

In some instances, suitability can be based on the type of fronthaul network connecting the processors. For example, optical line-of-sight links provide much larger bandwidth than radio links. Thus, processors that are communicatively coupled by such optical links can be preferable to processors that consume limited radio resources. The processors can comprise WT's and/or other types of processors communicatively coupled to the fronthaul network. In one aspect, a suitable processor can comprise a processor in a remote data center that is communicatively coupled to the fronthaul via a high-bandwidth, low-latency link.

The distributed-computing coordinator can be configured to select the processors in each set according to nearness. Various factors can affect nearness, such as network congestion (measured and/or estimated), performance of fronthaul wireless links (such as may be determined by CQI, BER, SNR, and/or other quality metrics), data processing load on each processor (such as may be measured by queue backlog), etc. The distributed-computing coordinator can select and allocate processors to perform each of the processing tasks (e.g., 2100, 2110, 2120, and 2130) in a manner that optimizes distributed processing efficiency, such as may be measured by total delay, total idle time, or some other efficiency metric(s). The distributed-computing coordinator can dynamically adapt processor selections and/or allocations, as well as adapt data partitioning and/or computational partitioning, such as to optimize performance and/or adapt to changing network topologies, network load patterns, processing loads, wireless channel conditions, and data services.

In one aspect, a distributed processing pipeline configured to perform spatial demultiplexing is provisioned by the distributed-computing coordinator into discrete processing sections 2100, 2110, 2120, and 2130. It should be appreciated that processing can be configured according to alternative designs.

Following front-end processing 2100, the distributed-computing coordinator divides pilot symbols into groups (e.g., subcarrier groups) and sends each group to a respective pseudo-inverse processor 2111-2119. This data partitioning can be performed in a manner that assigns processing tasks to each processor 2111-2119 according to the processor's ability and availability to process the pilot symbols. The processors 2111-2119 perform channel matrix inversion (e.g., calculates pseudo-inverse) and send the results to a set 2120 of spatial demultiplexing processors 2121-2129. The distributed-computing coordinator can employ computational partitioning to divide the processing tasks among the processors 2121-2129.

Following the front-end processing 2100, the distributed-computing coordinator divides data symbols into groups (e.g., subcarrier groups) and sends each group to the spatial demultiplexing set 2120. A combination of data partitioning and computational partitioning can be employed across the processors 2121-2129 to enhance processing efficiency (e.g., reduce latency, reduce idle time, etc.).

It should be appreciated the distributed-computing coordinator can reassign a processor in one group to function as a processor in another group. For example, since spatial demultiplexing 2120 needs the results from the pseudo-inverse 2110 before it can process the received data symbols, rather than sitting idle, at least some of the processors 2121-2129 can be configured to perform in the set 2110. Also, since the pseudo-inverse 2110 might only be performed periodically, the processors 2111-2119 can be allocated to set 2100 or 2120 during the pseudo-inverse set's 2110 idle period. The distributed-computing coordinator can dynamically adapt the processor allocations, such as to enhance processing efficiency (e.g., reduce latency, reduce idle time, etc.). The distributed-computing coordinator can dynamically adapt the processor allocations, such as to respond to changing network topologies, network load patterns, processing loads, wireless channel conditions, and data services The spatial-demultiplexing set 2120 separates the spatial streams from incoming symbol streams and symbols in each spatial stream are sent for further processing by processors 2131-2139 in set 2130, which performs decoding. It should be appreciated that the at least one destination node can comprise one or more of the processors 2131-2139. Similarly, it should be appreciated that the at least one RAN receiver can comprise one or more processors, such as any of the front-end processors 2101-2109.

Figure 22:
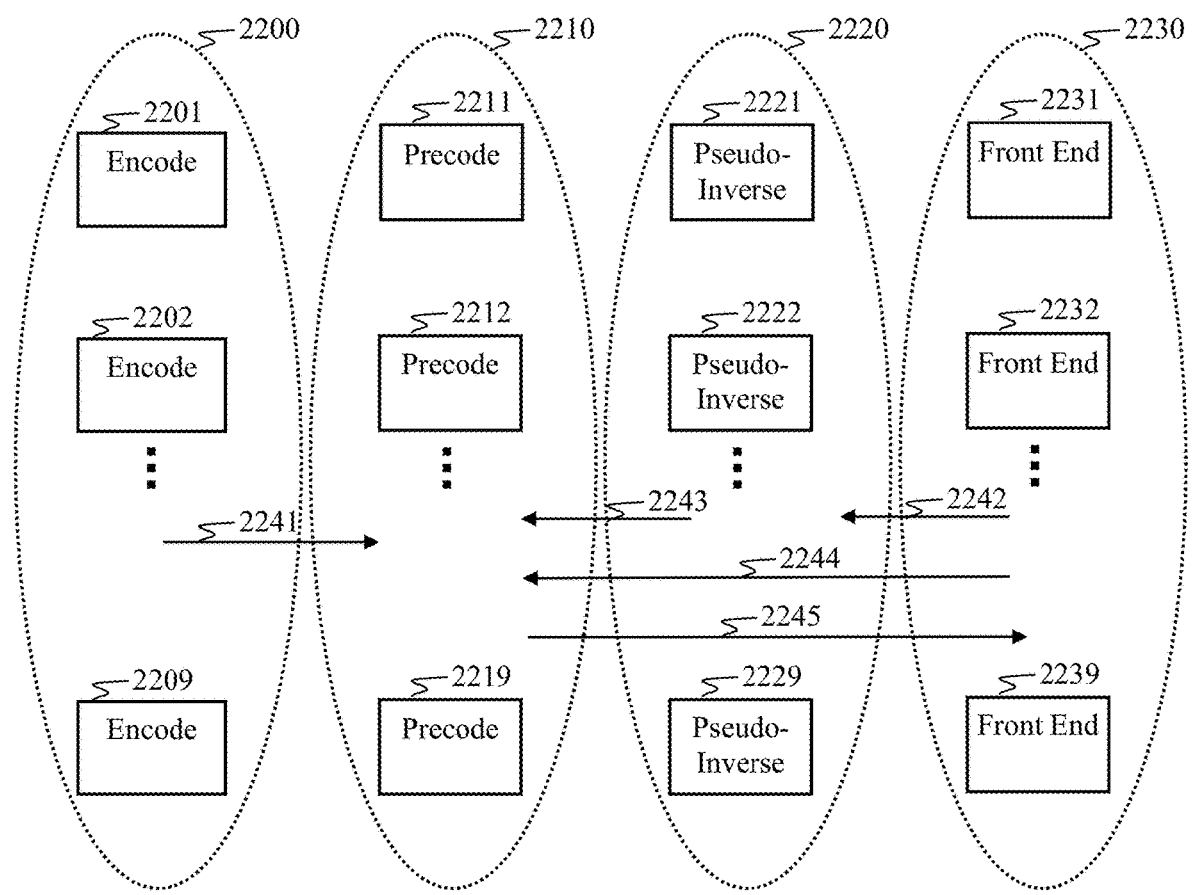

In an aspect of the disclosure shown in FIG. 22, a network path can comprise a data flow 2241-2245 between at least one source node and at least one RAN transmitter. In one aspect, encode processing 2200 can be performed by a set of processors 2201-2209 that are "near" the at least one source node. As described above, nearness can be a measure of delay relative to the at least one source node and/or at least one processor in another set of processors (e.g., processors 2211-2219) along the data flow 2241.

Each encoder 2201-2209 generates channel coded bits, which are mapped to symbols on each subcarrier. In one aspect, a distributed-computing coordinator divides subcarriers into groups and sends each group of symbols to a precoding processor 2211-2219. CSI, which can be determined from received pilots or feedback, is divided into CSI groups, and each group is sent to a pseudo-inverse processor 2221-2229. Pseudo-inverse processing 2220 performs channel inversion on the CSI and produces precoding vectors, which are sent to the precoding processors 2211-2219. Each precoding processor 2211-2219 precodes the data streams from the encoders 2201-2209, which are then sent to RAN front-end processors 2231-2239, which simultaneously transmit the precoded data signals.

As described in the related applications, Cooperative-MIMO can be implemented via SDR on a distributed-computing platform. In some aspects, the distributed-computing coordinator comprises one or more SDR instances, wherein each SDR instance serves a particular destination antenna(s) (such as a UE antenna(s)) by employing precoding across a plurality of transmitting WTs to produce a coherence zone localized at the destination antenna(s). An SDR instance can implement the seven layers of the OSI protocol stack for a corresponding RAN transmission protocol used to serve the destination antenna(s). In accordance with some aspects, the distributed-computing coordinator allocates distributed computing resources for each of the SDR instances. For example, precoding processors 2211-2219 can be selected to provide precoding using any of various techniques. In one aspect, the distributed-computing coordinator determines the needed resources for multiple SDR instances employing a common group of transmitting WTs and then provisions a sufficient number of the precoding processors 2211-2219 to supply the required amount of processing. In another aspect, each SDR instance (or set of SDR instances) can have its own distributed-computing coordinator, and wherein the distributed-computing coordinators broker the distributed-computing resources among themselves. In some cases, a round-robin technique or some other resource-partitioning methodology can be performed. Coordination and allocation of processing resources between SDR instances can be adapted according to changing propagation conditions, demand, fronthaul loads, and destination antennas. In some aspects, precoding is provided to second-network RAN control signals such that each destination antenna receives its own dedicated control information.

In some instances, multiple SDR instances (and in some aspects, multiple distributed-computing coordinators) can overlap. Thus, distributed-computing coordinators can share information, such as to mitigate any cross-interference in spatial multiplexing and/or spatial demultiplexing between adjacent and/or overlapping sets of WTs. Similarly, resource sharing can be provisioned by cooperating distributed-computing coordinators.

As described previously, the distributed-computing coordinator can be configured to select the processors in each set according to nearness. Various factors can affect nearness, such as network congestion (measured and/or estimated), performance of fronthaul wireless links (such as may be determined by CQI, BER, SNR, and/or other quality metrics), data processing load on each processor (such as may be measured by queue backlog), etc. The distributed-computing coordinator can select and allocate processors to perform each of the processing tasks (e.g., 2200, 2210, 2220, and 2230) in a manner that optimizes distributed processing efficiency, such as may be measured by total delay, total idle time, or some other efficiency metric(s). The distributed-computing coordinator can dynamically adapt processor selections and/or allocations, as well as adapt data partitioning and/or computational partitioning, such as to optimize performance and/or adapt to changing network topologies, network load patterns, processing loads, wireless channel conditions, and data services.

A combination of data partitioning and computational partitioning can be employed across the processors to enhance processing efficiency (e.g., reduce latency, reduce idle time, etc.). For example, in cases where a single processor is unable to handle the computation for a single subcarrier, the processor can be replaced by a deeper pipeline of processors.

In some aspects, a network management operator (NMO) comprises a scheduler configured to schedule uplink and downlink RAN resources. In some aspects, the NMO comprises a synchronization node. For example, the NMO, which can comprise the distributed-computing coordinator, can sync to a transmitted reference from another node (or even another network) and then clock the distributed processors. The distributed-computing coordinator can employ a transmitted reference and thereby function as a master to which the other nodes (e.g., processors) synchronize. The distributed-computing coordinator can perform other network control functions, since it can be advantageous to provision a single device to perform multiple coordination functions in a distributed network. The NMO can further comprise a mobility management entity configured to manage identity, authentication, and mobility of WTs in the second network.

In one aspect of the disclosure, a UE requests a session in the second network, and the request is routed to a nearby NMO. The NMO receives the UE's unique identification. This may comprise a MAC address, an IP address, a second-network identity, and/or an identity corresponding to at least one other network, such as a first network or some other network. The identity may comprise a globally unique temporary identifier, a radio network temporary identifier, a packet data network identifier, a static or dynamic IP address, and/or some other identifier or combination thereof. In some aspects, a UE identifier can be derived from the unique channel conditions associated with its location. For example, a UE's CSI can uniquely identify the device, such as where the CSI is measured and reported by the UE and/or measured by the RAN.

The NMO can be configured for assigning a second-network identity to the UE. In one aspect, the second-network identity can comprise a temporary identifier (similar to those described above). In some aspects, the second-network identity comprises precoding (or may otherwise be related to a spatial-multiplexing code), such as employed by an SDR instance configured to serve the UE.

In one aspect, the NMO comprises a security and anonymity manager (SAM). Security can comprise a broad class of properties, including confidentiality (which can be provided via encryption), authentication, integrity, and reliability.

Security can comprise encryption for link security between the NMO and the UE. On the downlink, physical-layer encryption can be provided by precoding, which produces a constructive coherence zone with high SNR localized at the intended UE while producing low SNR elsewhere. This enhances LPI/LPD of the link. Data encryption can be employed for additional security.

Authentication can include anti-spoofing protection. For example, in one aspect, TDD is employed and the reciprocal nature of the uplink and downlink channels is relied upon to provide accurate CSI for precoding. If CSI is calculated at both sides of the reciprocal channel, then agreement between those CSI measurements can be used for physical-layer authentication and integrity. In other aspects, alternative authentication and integrity-verification techniques can be implemented. Reliability can relate to the availability of services, even when the network is being attacked. Techniques that enhance LPI/LPD, such as Cooperative-MIMO, can enhance reliability.

The NMO can include the SDR platform and the distributed-computing coordinator. For example, the SDR platform can produce an SDR instance for each UE, each instance comprising a set of WTs that serves the associated UE, and computing resources (such as may be managed by the distributed-computing coordinator) to serve the UE. In one aspect, each SDR instance comprises a RAN protocol stack that translates data into a RAN transmission format for transmission to its UE. In one aspect, the NMO comprises a scheduler which schedules uplink and downlink RAN resources for the UEs. Each SDR instance comprises a baseband processing module (which can comprise an FEC coder/decoder, modulator/demodulator, and other baseband processing). The SDR platform can comprise a Cooperative-MIMO processing module (which can be configured to provide for precoding and/or spatial demultiplexing). It should be appreciated that Cooperative-MIMO processing can be implemented in a distributed manner. For example, the distributed-computing coordinator can coordinate the allocation of distributed-computing resources for Cooperative-MIMO processing. In precoding mode, Cooperative-MIMO processing precodes data streams from a plurality of the SDR instances to produce a plurality of precoded data streams that are transmitted from a plurality of WT antennas on multiple ones of a plurality of WTs. In some aspects, each WT comprises a processor configured to perform additional baseband processing.

While anonymity can be related to security, there are some differences. For example, source anonymity can conceal a source's identification and/or address from being revealed to an attacker. Destination anonymity conceals a transmission's final destination. Correlation anonymity conceals whether multiple anonymous links are related, such as by destination or source. Aspects of the disclosure provide for network configurations and signal processing, such as via implementations of an NMO, that can provide for anonymity.

The NMO can provide encapsulation of the computing resources it manages in accordance with principles inspired by those of Object-Oriented Programming (OOP). For example, via a TOR-like network, the allocation of processing resources, such as computer processing nodes and WTs (and possibly other resources), is hidden from the UEs and other external entities. Such restrictions are similar to the effect of designating methods, data, and services as "Private" in the context of OOP. In aspects of the disclosure, services and the devices that perform those services are hidden. In another aspect, NMOs can cooperate with each other. Thus, it can be useful to enable access of an NMO's internal methods, data, and/or other resources by another NMO or some other cooperating entity. Such resources can be designated as "Protected" to enable access by members of the same class. For example, a class can comprise NMOs.

In one aspect, the UE encrypts its original data in such a way that only the NMO can decrypt it. The data transmission from the UE passes through multiple nodes (e.g., middle relays), each of which may encrypt the data in such a manner that only the next node (e.g., another middle relay, or the NMO) can decrypt it. By encrypting each link, information about the network topology and the participating nodes can be compartmentalized. Thus, some aspects of the invention enable resources within the NMO's control to be hidden services.

Figure 23:
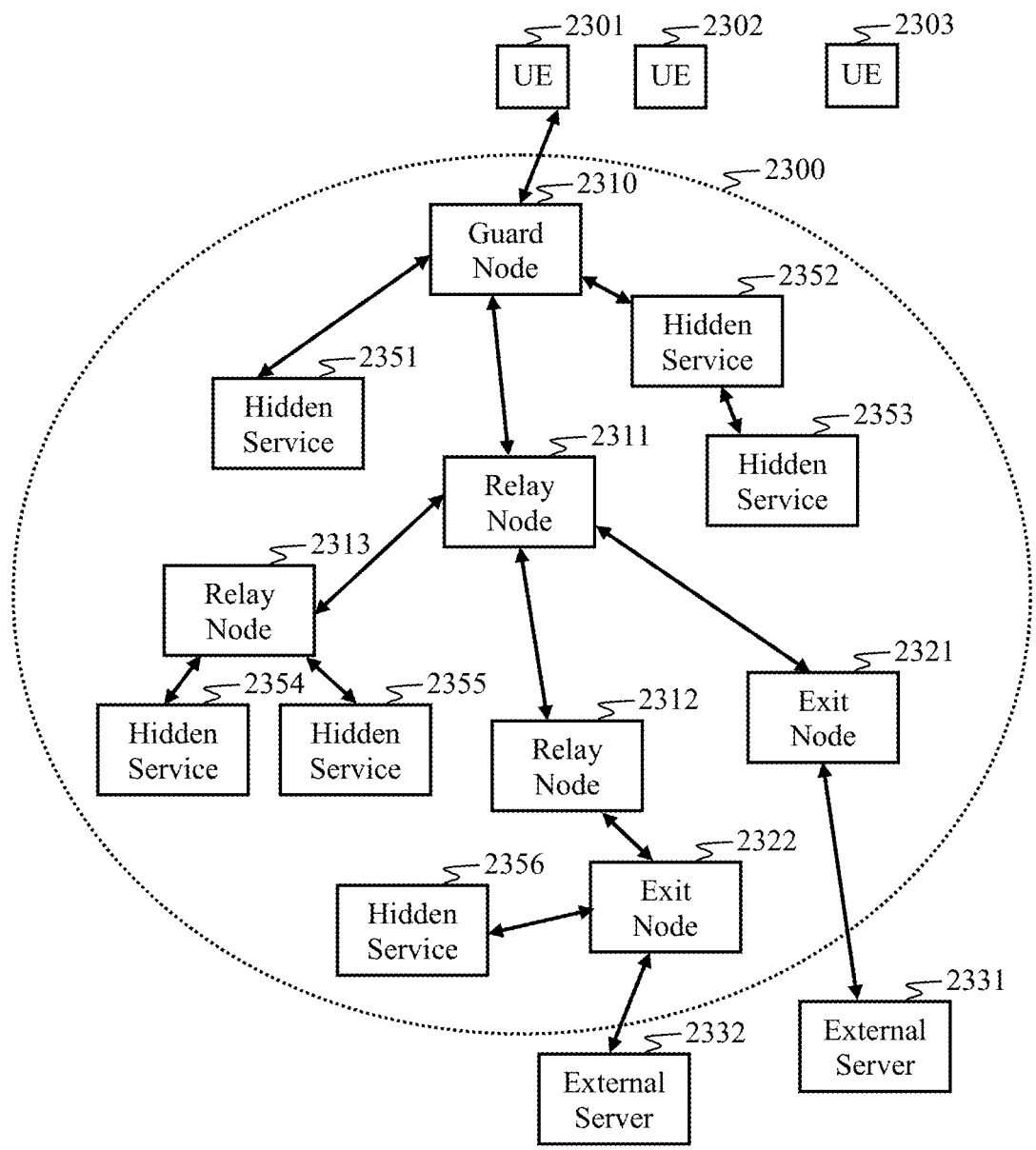
FIG. 23 is a diagram of a network topology in accordance with certain aspects of the disclosure. A wireless Tor network can be provisioned to encapsulate the fronthaul of a Cooperative-MIMO network to provide security and anonymity to devices operating in the network.

FIG. 23 is a diagram of a network topology in accordance with certain aspects of the disclosure. In some aspects, a Cooperative-MIMO network comprises a Tor network (or a Tor-like network) 2300 configured to encapsulate control and processing resources. The Tor network can provide anonymity to devices that participate in Cooperative-MIMO processing, provide second-network resources, and/or provide other types of resources (e.g., backhaul access, fronthaul connectivity, etc.) to the second-network devices. The Tor network 2300 can hide implementation details of the second network from UEs, as well as third parties.

Servers configured to receive inbound connections only through the Tor network 2300 are referred to as hidden servers. Rather than revealing the server's identity via an IP address, a MAC address, a globally unique identifier, or some other identifier that can be used by a third party to identify and track a device, a hidden service is accessed via its onion address. By way of example, a hidden service may be accessed by a UE once it connects to the Tor network 2300, and only through its second-network onion address. In some aspects, only certain nodes inside the second-network Tor can access 2300 certain hidden services.

By way of example, a WT (such as one or more UEs 2301-2303) can access the second-network RAN via a guard node 2310 of the Tor network 2300. In some aspects, this entry point can be selected based on a function of its reliability and trustworthiness. While the guard node 2310 and other nodes in the Tor are referred to in the singular sense, it should be appreciated that the guard node 2310 (and/or the other nodes) can comprise multiple devices configured to cooperatively perform their respective functions. Furthermore, aspects of the disclosure differentiate between logical nodes and physical nodes. For example, the guard node 2310 may be a second-network controller, such as an NMO or some other controller device, which the UEs 2301-2303 connect to via one or more WTs (e.g., access points and/or other UEs) in the second-network RAN. In some aspects, implementation details (such as which WTs are used to communicate with the UEs 2301-2303, the identities of the WTs, locations of the WTs, network configuration parameters, etc.) are hidden from the UEs 2301-2303. Thus, in some aspects, RAN interface resources (such as may be employed by the guard node 2310) can comprise hidden services, such as hidden services 2351-2353. In some aspects, a hidden service 2352 can access another hidden service 2353. Various hierarchies of hidden services can be employed in accordance with the aspects of the disclosure described herein.

In Cooperative-MIMO processing, the use of relay nodes is well known. For example, coordinated base transceiver stations coupled to a central processor can be regarded as rely nodes. In other types of Cooperative-MIMO networks, mesh, ad-hoc, peer-to-peer (e.g., D2D), multi-hop, cellular hierarchies, and other network configurations include relay nodes that can be provisioned inside a Tor network in accordance with aspects of the disclosure. By way of example, relay nodes 2311-2313 can be employed to route traffic from the guard relay to hidden services (e.g., hidden services 2354 and 2355) and/or exit nodes (e.g., exit nodes 2321 and 2322). The exit nodes 2321 and 2322 are the exit points at the edge of the Tor network, and these nodes send traffic to (and receive traffic from) external services (e.g., servers 2331-2332).

In one aspect of the disclosure, UE 2301 encrypts original data in a manner such that only the exit node 2322 can decrypt it. In some aspects, the exit node 2322 sends the unencrypted data to its destination without revealing the source (e.g., UE 2301). In such aspects, the exit node 2322 can function as a proxy server, wherein it uses its own address and/or one or more other addresses, including addresses that could be assigned to other ones of the UEs 2301-2303. Furthermore, for each link, the data can be encrypted such that each relay has only the information it needs to perform its own processing, such as routing the data to the next node. The encrypted data can comprise control information, such as addresses, routing information, and other control data used to configure the second network.

While Tor can be implemented by encryption in the application layer of a protocol stack, some aspects of the disclosure can provide encryption at one or more other layers. In one aspect, precoding provides physical-layer encryption by exploiting unique channel conditions (e.g., CSI) associated with each wireless node. Some aspects of the disclosure provide for complex-valued physical-layer encryption and decryption at each link in a virtual circuit comprising successive relay nodes. Each relay can decrypt a layer of encryption to reveal the next relay in the circuit. This can hide the route before the previous relay and after the next relay. The final relay or destination server might decrypt the innermost layer of encryption so data can be processed at the destination without revealing the source's address. By way of example, the '854 application discloses successive encryption and decryption techniques through a multi-hop network, including encryption based on channel information at each link.

A method for establishing Cooperative-MIMO communications can employ a Tor network, such as to ensure secure and anonymous communications and protect the identities of users, services, and contributors of network resources. In one aspect, the UE 2301 establishes a link with an NMO, which can comprise the guard node 2310, a hidden service, a relay node, or multiple ones of any combination of the aforementioned nodes.

In some aspects, the guard node 2310 implements hidden services 2351-2353 to communicate with the UE 2301 via a RAN. For example, the UE 2301 might send its first-network identity to the NMO, which can then employ that identity to acquire RAN resources from the first network. Other information about the UE 2301, such as processing capability, memory, battery power, nearby WTs, etc., might be sent to the NMO if the UE 2301 might be enlisted to function as part of the second network's infrastructure. Thus, in some aspects, the UE 2301 may be incorporated into the Tor network 2300.

In one aspect, the first-network identities of each of a plurality of UEs are collected by the NMO. A pool of these first-network identities can be used by the NMO to acquire RAN resources from the first network. Furthermore, the NMO can employ the first-network identities of one set of UEs to request services (such as data services) for use by another set of UEs. Thus, the NMO could employ multiple IP addresses, multiple first-network UE identities, and/or other identity types to serve each UE.

In one aspect, a hidden service comprises RAN processing resources, such as the physical devices that serve as access points (e.g., base transceiver stations) and/or other UEs configured to function as a cooperative antenna array. In some aspects, the hidden services may be hidden from the UE 2301. Thus, the UE 2301 may transmit to and receive from WTs without knowing identities of the WT, or even which WTs are employed. Hidden services can comprise distributed computing resources. For example, an SDR instance serving the UE 2301 can reside on one or more UEs, on one or more access points, or possibly in a remote data center accessible by a hidden service. In one aspect, the distributed-computing coordinator is implemented as a hidden service by the NMO. If the NMO resides in the guard node 2310, hidden service 2352 can comprise the distributed-computing coordinator, which accesses distributed computing resources represented by hidden service 2353. In some aspects, at least some of the resources employed by the NMO may be external to the Tor network 2300. For example, access to data center servers may be available via the Internet.

In some aspects, communications between the UE 2301 and the Tor network are made secure. In one aspect, data encryption is employed. In another aspect, physical-layer encryption is employed. For example, Cooperative-MIMO precoding by the Tor network produces a spatial coherence zone located at the UE 2301 while producing low SNR elsewhere, which makes it difficult for the precoded transmission to be intercepted by an unintended receiver. In some aspects, the UEs 2301-2303 can cooperate to produce precoded transmissions. In other aspects, transmissions by the UEs are coordinated to occur synchronously, thus producing interference at an eavesdropper's receiver. However, another effective method to provide secure communications for the second network is to simply transmit in the clear using a first-network-compatible format such that the second-network communications resemble the first-network communications.

In some aspects of the disclosure, the NMO is a hidden service (such as hidden service 2354), which can be accessed via one or more relay nodes 2311 and 2313. The UE 2301 may employ multiple relay nodes, including multiple relay paths that converge (not shown) at the NMO. For example, the UE 2301 may employ multiple guard nodes that provide paths to a node on which the NMO resides. In some aspects, the multiple guard nodes comprise a group of WTs configured to communicate with the UE 2301 via the RAN.

In one aspect, the NMO implemented as hidden service 2354 can access other hidden services, such as the distributed-computing coordinator, a RAN resource coordinator, distributed computing resources, etc. In another aspect, the NMO can reside on one or more of the exit nodes 2331 and 2332.

Exit nodes 2321 and 2322 provide access to external resources, such as external services 2331 and 2332. In some aspects, the exit nodes 2321 and 2322 provide access to broadband data services, which may include a backhaul network (e.g., a fiber backhaul), an Internet Service Provider network, a broadband radio network, and/or other types of networks that can provide content delivery services. In some aspects, the exit nodes 2321 and 2322 can access hidden services. For example, hidden service 2356 can include access information for external services 2331 and 2332, such as may be provided by UEs 2301-2303 to the NMO. The exit nodes 2321 and 2322 can be configured to function as proxy servers. In one aspect, the exit node 2321 and 2322 can employ the identity of an authorized user of an external service in order to conceal access of the service on behalf of a different user. Thus, if UE 2302 is authorized to use service 2332, the exit node 2322 might use the UE's 2302 credentials to access external services (e.g., content delivery) for use by UE 2301.

Figure 24:
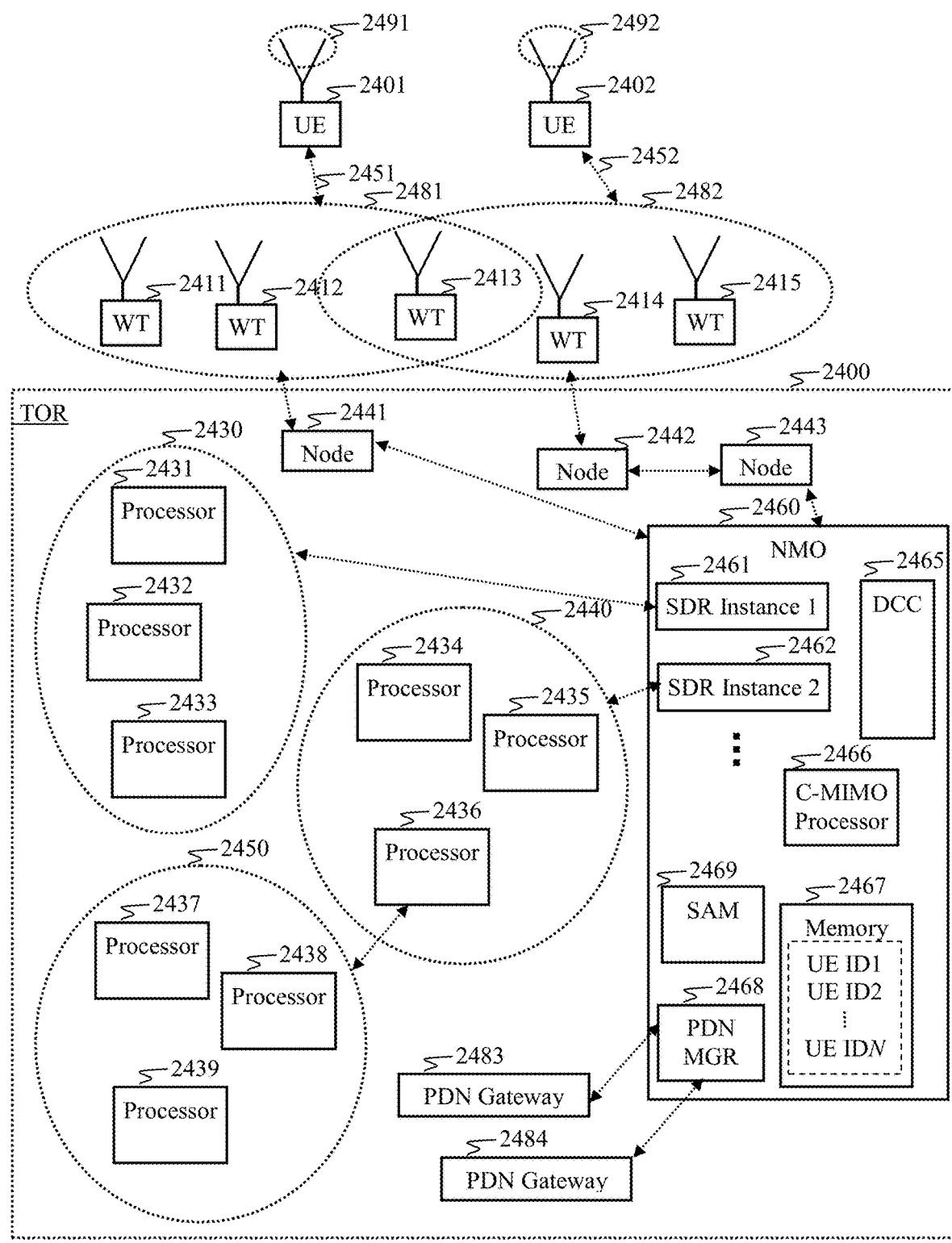
FIG. 24 is a diagram of a network topology in which a Tor network is provisioned to encapsulate distributed-computing resources in accordance with certain aspects of the disclosure.

FIG. 24 is a block diagram of a network topology configured in accordance with aspects of the disclosure. One or more wireless terminals, such as UEs 2401 and 2402, can request to join a second network. In one aspect, the UEs 2401 and 2402 are configured to communicate via second-network RAN signaling 2451 and 2452 with a plurality of WTs 2411-2415 communicatively coupled to a Tor network 2400. By way of example, a first group 2481 comprising WTs 2411-2413 is configured to communicate with UE 2401, and a second group 2482 comprising WTs 2413-2415 is configured to communicate with UE 2402.

In one aspect, each WT 2411-2415 serves as an RF front end for an NMO 2460, wherein the NMO 2460 has a packet data network address known by the UEs 2401 and 2402. For example, the NMO 2460 can have an address(es) (e.g., a second-network packet data network address or some other identifier) used by the UEs 2401 and 2402 for packet data communications, and the address can take any of various forms described herein. While the WTs 2411-2415 can have addresses for packet data communications, these addresses can be concealed from the UEs 2401 and 2402, since the WTs 2411-2415 process the RAN signals and may engage in routing and possibly other signal-processing operations that are transparent to the UE's 2401 and 2402 data processing operations. In one example, the WTs 2411-2415 can be configured to transmit and receive RAN waveforms with the UEs 2401 and 2402 and perform associated physical-layer radio processing, but the WTs 2411-2415 do not otherwise communicate (such as via a packet data network) with the UEs 2401 and 2402, whereas the WTs 2411-2415 can communicate with the NMO 2460 via a packet data network in the Tor 2400. For example, the WTs 2411-2415 can exchange UE data and second-network control information in the Tor 2400 with the NMO 2460, and the exchanges can be encrypted, such as to provide security and anonymity to both the WTs 2411-2415 and the device(s) hosting the NMO 2460 program.

In some aspects, a distributed computing coordinator 2465 (which may be a component of the NMO 2460 or one or more modules accessible by the NMO 2460) can be configured to select and employ processing resources on any of the WTs 2411-2415 for processing UE 2401 and 2402 signals, such as to perform channel estimation, spatial multiplexing operations (e.g., matrix inverse, matrix multiplication, etc.), and/or coding/decoding. In some aspects, the NMO 2460 compiles a directory of second-network services and resources in the Tor that can be accessed using corresponding Tor addresses. While some addresses can be made available to UEs 2401 and 2402, other addresses are concealed from user devices, other networks, and possibly other devices operating in the second network. Some addresses may be used only by specific modules and/or devices in the second network, and their communications can be secured by the Tor 2400. In one aspect, a directory of available distributed computing resources, such as processors and data storage, is made available to the distributed computing coordinator 2465. In some cases, the directory can be configured to include any of various measures of availability and performance of the available resources. By way of example, each processing node can send a report to the NMO 2465 that comprises information regarding computing resources at the respective node. This information can also include link information, such as latency, congestion, reliability, channel quality, and/or other link quality metrics. This information might also include queue size, job backlog, CPU usage, maintenance schedules, and/or other information that can affect the availability of and access to the resources. The distributed computing coordinator 2465 can determine a current or future resource need (such as from requests for resources from an NMO, a Cooperative-MIMO processor 2466 and/or other operations), select resources based on the need and their availability as indicated from the directory, and then configure each processing node hosting the resource(s) to provide the resource(s).

It should be appreciated that WTs 2411-2415 can include UEs, access points, and/or other types of wireless terminal equipment, and such equipment may be employed in other networks (such as in the first network). Techniques to conceal identity and provide secure communications can be performed to prevent the first network or other devices from discovering that a particular WT is participating in an unauthorized second network. The Tor 2400 can also be used to conceal certain operations and their participants from unrelated devices in the second network. For example, WTs performing only RAN front-end processing might be prevented from accessing information about which processors are performing Cooperative-MIMO operations.

A route between the WTs 2411-2415 and the NMO 2460 might comprise one or more relay nodes (e.g., nodes 2441-2443) protected by the Tor 2400. In one aspect, the WTs 2411-2415 may serve as guard nodes in the Tor 2400. In other aspects, the relay nodes 2441 and 2442 can function as the Tor's guard nodes.

The NMO 2460 can reside on one or more nodes in the Tor 2400. In one aspect, the NMO 2460 resides on at least one of the WTs 2411-2415. In another aspect, the NMO 2460 resides on at least one relay node inside the Tor. In some aspects, the NMO 2460 comprises a hidden service. In some aspects, the NMO 2460 resides on at least one exit node of the Tor. It should be appreciated that the NMO 2460 can be a distributed program residing on multiple processing cores, possibly residing on multiple network devices in the Tor.

The NMO 2460 can comprise a plurality of SDR instances (e.g., 2461 and 2462), each configured to communicate with a corresponding UE (e.g., UEs 2401 and 2402, respectively) via the second-network RAN. By way of example, SDR instance 2461 can be implemented on one or more cores of processors 2431-2433, and signal processing associated with UE 2401 can be routed through the Tor 2400 to a first group 2481 of WTs configured to serve the UE 2401. Similarly, SDR instance 2462 can be implemented on one or more cores of processors 2434-2436, and signal processing associated with UE 2402 can be routed through the Tor 2400 to a second group 2482 of WTs configured to serve the UE 2402. The SDR instance 2461, via Cooperative-MIMO 2466 precoding, can produce a secure RAN transmission that is detectable in a small zone of coherence centered at the UE 2401, but is substantially undetectable elsewhere. Similarly, SDR instance 2462 can produce a small coherence zone via Cooperative-MIMO precoding that is centered at the UE 2402. User data and any user-specific control data can be precoded such that it is received only by the intended UE.

In some aspects, the NMO 2460 can be moved from one node to another. For example, as the UE moves through a geographical area, the network can respond by reconfiguring the selection of access points (e.g., WTs) in the group serving the UE. In some aspects, the NMO 2460 can reside on one of the WTs, and when the CQI diminishes, the NMO 2460 can move to another WT with better CQI. For example, the CQI can include at least one of an SNR, a Signal to Interference plus Noise Ratio (SINR), a Carrier to Noise Ratio (CNR), a Carrier to Interference plus Noise Ratio (CINR), and a Received Signal Strength Indication (RSSI). The NMO 2460 can then adjust resource allocations and resolve any collisions between WTs.

In some aspects, a WT (e.g., 2413) can simultaneously belong to a plurality of WT sets (e.g., 2481 and 2482). For example, each SDR instance 2461 and 2462 can manage a group 2481 and 2482, respectively. The NMO 2460 manages scheduling of resources for the SDRs 2461 and 2462. In some aspects, NMOs can cooperate with each other to manage network resources.

Some aspects of the disclosure include systems and methods for distributing processing in a cascaded manner. For example, a system and method provides for a distributed network of processors that can produce solutions to respective segments and/or sub-segments of a problem posed by one of the processors.

In a single-tiered configuration, a problem is sent from a first processor to one or more other processors where it is to be solved (or otherwise processed), such as processors 2431-2433 in group 2430. In the single-tiered configuration, the processor group 2430 typically cannot divide the problem into multiple segments and redistribute those segments to respective additional processors to solve (or otherwise process) the respective segments. The typical single-tiered configuration is not capable of providing a cascaded (or multi-tiered) distribution of objects or other problems or tasks to be processed. Nor are these single-tiered configurations capable of subdividing segments of the problem into sub-segments to be distributed to other processors in the network.

Aspects of the disclosure can dynamically scale-up the network to compensate for particularly difficult problems, network loading (e.g., the number of solutions and competing resource demands), and/or the overall availability of resources. For example, at least one of the processors 2436 in group 2440 can be configured to subdivide a problem to be processed by another tier of processors 2437-2439 in group 2450. Configuration details, such as addresses and/or identities of the processors 2437-2439 might be hidden from the NMO 2465, and/or other nodes in the Tor. In some aspects, the processor 2436 reports the availability of resources in its sub-group 2450 to be included in the directory organized by the NMO 2460.

The directory can include external services that can be accessed, for example, by a packet data network (PDN) manager 2468. The PDN manager 2468 can be configured to access one or more PDN gateways 2483 and 2484, which may comprise exit nodes or external services. In some aspects, information used by one or more of the UEs 2401 and 2402 to access external services can be managed by the PDN manager 2468 to access those services on behalf of the UEs 2401 and 2402. In some aspects, access to external services for multiple UEs can be pooled at the PDN manager 2468, and in some instances, the available external services may be included in the directory provided to the UEs 2401 and 2402.

In one aspect, a software application is provided that can be executed by each of a plurality of the processors 2431-2439. The plurality of processors 2431-2439 are interconnected by one or more networks (e.g., a WLAN, a WWAN, an optical fiber fronthaul, a backhaul, the Internet, and/or the like). The network connections can be achieved using any of the many well-known means and protocols, including wireless communications and/or "wired" communications. The software application, when executed by the processors, provides a system for distributing processing among the various processors in a cascaded manner. Provided along with the system is a method for cascaded distribution of the processing among the processors. The system and method are "cascaded" in that at least some of the processors distribute a problem to be solved, or parts thereof, to other processors. Solutions to segments and/or to sub-segments of the problem posed by one of the processors can be solved (e.g., calculated or otherwise suitably developed) by processors in the same tier and/or in different tiers. The use of a cascade approach allows the resources applied to a problem to rapidly, and exponentially, scale up to the level needed to efficiently solve the problem.

In some aspects, this approach also enables a system in which the provision of contingent resources to solve a problem can be commoditized and subjected to retainer and spontaneous transactions (e.g., auctioned, subcontracted, bid and shop). This commoditization of processing resources enables the efficient leasing of excess data processing resources, as well as other transactional structures. Some aspects provide a suitable method or means for efficiently compensating clients in the network for contributing processing resources to the network. For example, UEs that contribute processing resources may be given higher priority access in exchange for cooperating.

Figure 25A:
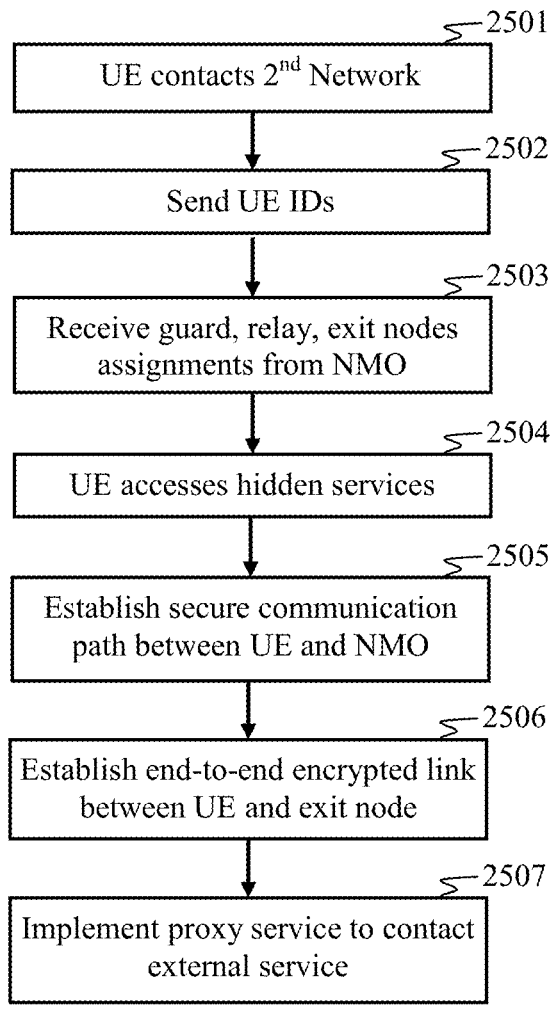
FIGS. 25A and 25B are flow diagrams that depict Tor communication processes in a wireless communication system configured according to aspects of the disclosure.

FIG. 25A is a flow diagram illustrating a Tor communication process in a wireless communication system configured according to an aspect of the disclosure. Each UE (or some other WT) contacts a second network 2501 to initiate communications in the second network. Each UE can optionally send its identity to the second network 2502. For example, if the UE is a first-network device, the UE can send its first-network identity. As disclosed previously, the second network can use first-network identities to obtain RAN resources from the first network. The UE is provided with guard, relay, and/or exit node assignments in a Tor network configured to provide Cooperative-MIMO processing. The allocation of such processing resources (which can include distributed computing resources) can be implemented via hidden services 2504 available to the UE and/or an NMO. A secure communication path is established between the UE and the NMO 2505, such as via onion routing encryption. An end-to-end encrypted link is established between the UE and an exit node in the Tor 2506. In some aspects, end-to-end encryption for communications between the UE and an external service may be provided. Optionally, the exit node is configured as a proxy server when contacting an external service 2507.

Figure 25B:
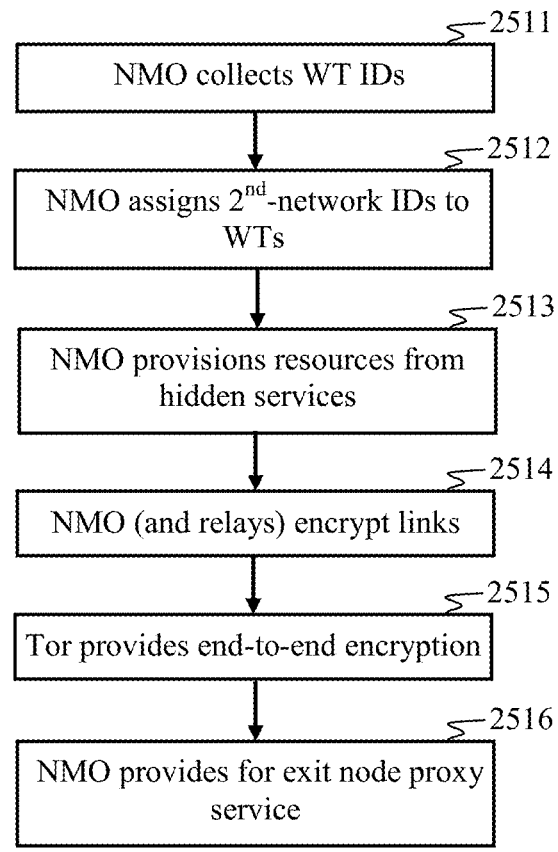

FIG. 25B is a flow diagram illustrating a Tor communication process in a wireless communication system configured according to an aspect of the disclosure. An NMO collects information about WTs to identify each WT 2511. In some aspects, the NMO assigns second-network identifiers to the WTs 2512, which can help conceal each WT's true identity from other devices. The NMO provisions resources from hidden services 2513, such as to implement a second-network RAN. The provisioning of resources 2513 can include providing for routing paths within the Tor. The NMO and other nodes in the Tor encrypt each link 2514. The Tor provides end-to-end encryption for messages between the WTs and the exit nodes 2515. The WTs may be provided with end-to-end encryption to external services. The exit nodes may optionally implement a proxy service 2516, such as to anonymize communications in the Tor.

The various blocks shown in the figures may be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the invention may be practiced in various components such as integrated circuit chips and modules, and that the exemplary aspects of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary aspects of this invention.

Various modifications and adaptations to the foregoing exemplary aspects of this invention may become apparent to those skilled in the relevant arts in view of the foregoing description, when read in conjunction with the accompanying drawings. However, any and all modifications will still fall within the scope of the non-limiting and exemplary aspects of this invention.

The invention claimed is:

1. A method of wireless communication, comprising:
communicating, by a first wireless communication device with a second wireless communication device, a communication that indicates scheduling of a shared spectrum resource,
wherein the shared spectrum resource is shared by a first network management operator (NMO) and a second NMO,
wherein the first wireless communication device and the second wireless communication device are associated with the first NMO,
wherein the first NMO employs a first set of spatial channels in the shared spectrum resource, and
wherein a second set of spatial channels in the shared spectrum resource is made available for use by the second NMO, the second set being different from the first set;
communicating, by the first wireless communication device with the second wireless communication device, data over the first set of spatial channels; and
communicating, by the first wireless communication device with a third wireless communication device that is associated with the second NMO, data over the second set of spatial channels.

2. The method of claim 1, wherein the scheduling indicates a first schedule for communicating the data with the second wireless communication device over one or more of the first set of spatial channels.

3. The method of claim 1, wherein the scheduling further indicates a transmission link direction comprising an uplink or a downlink, and wherein the communicating the data includes communicating the data in the transmission link direction.

4. The method of claim 1, further comprising: receiving, by the first wireless communication device from the second wireless communication device, a first set of reference signals corresponding to one or more of the first set of spatial channels, wherein the data is pre-coded based on at least the first set of reference signals.

5. The method of claim 1, further comprising: detecting, by the first wireless communication device, a second set of reference signals from the second NMO corresponding to one or more of the second set of spatial channels, wherein the data is pre-coded based on the second set of reference signals.

6. The method of claim 1, further comprising: obtaining, by the first wireless communication device, scheduling information from the second NMO; and employing, by the first wireless communication device, the one or more of the second set of spatial channels for communication with the second wireless communication device based on at least the scheduling information from the second NMO.

7. A first wireless communication device, comprising:
a transceiver configured for communicating with a second wireless communication device;
a memory; and
at least one processor in communication with the memory and configured for:
communicating with the second wireless communication device, a communication that indicates scheduling of a shared spectrum resource,
wherein the shared spectrum resource is shared by a first network management operator (NMO) and a second NMO,
wherein the first wireless communication device and the second wireless communication device are associated with the first NMO, wherein the first NMO employs a first set of spatial channels in the shared spectrum resource, and wherein a second set of spatial channels in the shared spectrum resource is made available for use by the second NMO, the second set being different from the first set;

communicating, by the first wireless communication device with the second wireless communication device, data over the first set of spatial channels; and communicating, by the first wireless communication device with a third wireless communication device that is associated with the second NMO, data over the second set of spatial channels.

8. The first wireless communication device of claim 7, wherein the scheduling indicates a first schedule for communicating the data with the second wireless communication device over one or more of the first set of spatial channels.

9. The first wireless communication device of claim 7, wherein the scheduling further indicates a transmission link direction comprising an uplink or a downlink, and wherein the communicating the data includes communicating the data in the transmission link direction.

10. The first wireless communication device of claim 7, wherein the at least one processor is further configured for: receiving, by the first wireless communication device from the second wireless communication device, a first set of reference signals corresponding to one or more of the first set of spatial channels, wherein the data is pre-coded based on at least the first set of reference signals.

11. The first wireless communication device of claim 7, wherein the at least one processor is further configured for: detecting, by the first wireless communication device, a second set of reference signals from the second NMO corresponding to one or more of the second set of spatial channels, wherein the data is pre-coded based on the second set of reference signals.

12. The first wireless communication device of claim 7, wherein the at least one processor is further configured for: obtaining, by the first wireless communication device, scheduling information from the second NMO; and employing, by the first wireless communication device, the one or more of the second set of spatial channels for communication with the second wireless communication device based on at least the scheduling information from the second NMO.

13. A non-transitory computer-readable medium having program code recorded thereon, the program code comprising instructions executable by one or more processors of a computer system for:

causing a first wireless communication device to communicate, with a second wireless communication device, a communication that indicates scheduling of a shared spectrum resource, wherein the shared spectrum resource is shared by a first network management operator (NMO) and a second NMO, wherein the first wireless communication device and the second wireless communication device are associated with the first NMO, wherein the first NMO employs a first set of spatial channels in the shared spectrum resource, and wherein a second set of spatial channels in the shared spectrum resource is made available for use by the second NMO, the second set being different from the first set;

communicating, by the first wireless communication device with the second wireless communication device, data over the first set of spatial channels; and communicating, by the first wireless communication device with a third wireless communication device that is associated with the second NMO, data over the second set of spatial channels.

14. The non-transitory computer-readable medium of claim 13, wherein the scheduling indicates a first schedule for communicating the data with the second wireless communication device over one or more of the first set of spatial channels.

15. The non-transitory computer-readable medium of claim 13, wherein the scheduling further indicates a transmission link direction comprising an uplink or a downlink, and wherein the communicating the data includes communicating the data in the transmission link direction.

16. The non-transitory computer-readable medium of claim 13, wherein the program code further comprises instructions executable by the one or more processors of the computer system for receiving, by the first wireless communication device from the second wireless communication device, a first set of reference signals corresponding to one or more of the first set of spatial channels, wherein the data is pre-coded based on at least the first set of reference signals.

17. The non-transitory computer-readable medium of claim 13, wherein the program code further comprises instructions executable by the one or more processors of the computer system for detecting, by the first wireless communication device, a second set of reference signals from the second NMO corresponding to one or more of the second set of spatial channels, wherein the data is pre-coded based on the second set of reference signals.

18. The non-transitory computer-readable medium of claim 13, wherein the program code further comprises instructions executable by the one or more processors of the computer system for obtaining, by the first wireless communication device, scheduling information from the second NMO; and employing, by the first wireless communication device, the one or more of the second set of spatial channels for communication with the second wireless communication device based on at least the scheduling information from the second NMO.

* * * * *